(12) United States Patent
Aggarwal et al.

(10) Patent No.: US 9,860,368 B2
(45) Date of Patent: Jan. 2, 2018

(54) ADVANCED TOOLS FOR UNIFIED COMMUNICATION DATA MANAGEMENT AND ANALYSIS

(71) Applicant: Unify Square, Inc., Bellevue, WA (US)

(72) Inventors: Sudhanshu Aggarwal, Bellevue, WA (US); Arun Raghavan, Seattle, WA (US); Robert Osborne, Redmond, WA (US)

(73) Assignee: Unify Square, Inc., Bellevue, WA (US)

( * ) Notice: Subject to any disclaimer, the term of this patent is extended or adjusted under 35 U.S.C. 154(b) by 157 days.

(21) Appl. No.: 14/179,476

(22) Filed: Feb. 12, 2014

(65) Prior Publication Data

US 2014/0229614 A1   Aug. 14, 2014

Related U.S. Application Data

(60) Provisional application No. 61/763,919, filed on Feb. 12, 2013.

(51) Int. Cl.
*H04M 3/22* (2006.01)
*H04W 68/00* (2009.01)
(Continued)

(52) U.S. Cl.
CPC ...... *H04M 3/2227* (2013.01); *G06Q 30/0203* (2013.01); *H04L 41/5038* (2013.01);
(Continued)

(58) Field of Classification Search
CPC ... H04L 43/50; H04L 41/5038; H04M 3/2227
(Continued)

(56) References Cited

U.S. PATENT DOCUMENTS 6,078,953 A * 6/2000 Vaid .................... H04L 12/2856
370/235
6,370,572 B1   4/2002 Lindskog et al.
(Continued)

FOREIGN PATENT DOCUMENTS

WO         01/33831 A2      5/2001

OTHER PUBLICATIONS

Office Action dated Oct. 7, 2015, from U.S. Appl. No. 14/178,228, filed Feb. 11, 2014, 15 pages.
(Continued)

*Primary Examiner* — Nicholas Taylor
*Assistant Examiner* — Chong G Kim
(74) *Attorney, Agent, or Firm* — Christensen O'Connor Johnson Kindness PLLC

(57) ABSTRACT

The present disclosure includes descriptions of various aspects of unified communication (UC) systems, including UC management and analysis systems and related tools and techniques. Described systems, tools, and techniques are adapted for enhanced UC data capture, analysis, and reporting; enhanced UC monitoring services; and a user survey service that can be used for conducting user surveys related to UC services. Embodiments disclosed herein include a process for determining location-based quality metrics; a process for calculating weighted availability in a computer system (e.g., a UC system); a process for generating a set of test rules based on automatic inspection of a UC topology; a process for setting a response priority for a rule failure based on classification of the failure; and process for executing a survey instance for users of a UC system based on presence information.

21 Claims, 28 Drawing Sheets

(51) Int. Cl.

| | | |
|---|---|---|
| H04M 15/00 | (2006.01) | |
| H04L 12/24 | (2006.01) | |
| G06Q 10/00 | (2012.01) | |
| H04L 29/08 | (2006.01) | |
| G06Q 30/02 | (2012.01) | |
| H04L 12/26 | (2006.01) | |
| H04L 12/58 | (2006.01) | |

(52) U.S. Cl.
CPC ............. *H04L 51/36* (2013.01); *H04L 67/22* (2013.01); *H04M 3/2236* (2013.01); *H04M 15/58* (2013.01); *H04W 68/005* (2013.01)

(58) Field of Classification Search
USPC ........................................................ 709/224
See application file for complete search history.

(56) References Cited

U.S. PATENT DOCUMENTS

| | | |
|---|---|---|
| 6,594,277 B1 | 7/2003 | Chiang et al. |
| 6,748,433 B1 | 6/2004 | Yaakov |
| 6,993,494 B1 | 1/2006 | Boushy et al. |
| 7,212,988 B1 | 5/2007 | Feldten |
| 7,500,143 B2 | 3/2009 | Buia et al. |
| 7,974,212 B2 | 7/2011 | Leung |
| 8,095,665 B1 | 1/2012 | Bau |
| 8,121,049 B2 | 2/2012 | Lidstrom et al. |
| 8,165,109 B2 | 4/2012 | King |
| 8,472,323 B2 | 6/2013 | Kallio |
| 8,503,318 B2 | 8/2013 | Leung et al. |
| 9,118,751 B2 | 8/2015 | Kolbegger et al. |
| 2002/0116460 A1* | 8/2002 | Treister ................. H04W 84/20 709/204 |
| 2003/0112933 A1 | 6/2003 | Snelgrove |
| 2003/0149919 A1 | 8/2003 | Greenwald et al. |
| 2004/0019688 A1 | 1/2004 | Nickerson et al. |
| 2005/0064874 A1 | 3/2005 | Beacken |
| 2005/0120259 A1* | 6/2005 | Aoki ................... G06F 11/2051 714/4.11 |
| 2005/0141493 A1 | 6/2005 | Hardy et al. |
| 2005/0159982 A1* | 7/2005 | Showalter ............. G06F 19/366 705/2 |
| 2006/0111092 A1 | 5/2006 | Harris et al. |
| 2006/0240803 A1 | 10/2006 | Valeriano |
| 2006/0250955 A1* | 11/2006 | Kallio ..................... H04L 47/10 370/229 |
| 2006/0277550 A1 | 12/2006 | Williams et al. |
| 2006/0291641 A1 | 12/2006 | Barclay et al. |
| 2007/0133403 A1* | 6/2007 | Hepworth ........... H04L 12/2602 370/229 |
| 2007/0233865 A1* | 10/2007 | Garbow .............. G06F 11/0796 709/226 |
| 2007/0286351 A1 | 12/2007 | Ethier et al. |
| 2008/0063149 A1* | 3/2008 | West .................... H04L 41/5087 379/1.03 |
| 2009/0201824 A1 | 8/2009 | Leung et al. |
| 2009/0225670 A1* | 9/2009 | Leung .................... H04L 41/022 370/252 |
| 2009/0237240 A1* | 9/2009 | Leung ................. H04L 41/5009 340/540 |
| 2009/0245115 A1* | 10/2009 | Krishnaswamy ... H04L 41/5025 370/242 |
| 2010/0070345 A1 | 3/2010 | Abelow |
| 2010/0074417 A1* | 3/2010 | Eslambolchi ........... H04L 12/66 379/33 |
| 2010/0211817 A1* | 8/2010 | Yang ................... H04L 41/0663 714/4.1 |
| 2010/0324971 A1 | 12/2010 | Morsberger |
| 2011/0009707 A1 | 1/2011 | Kaundinya et al. |
| 2011/0019570 A1* | 1/2011 | Leung ................. H04L 41/5009 370/252 |
| 2011/0137696 A1 | 6/2011 | Meyer et al. |
| 2011/0137808 A1 | 6/2011 | Meyer |
| 2011/0254961 A1* | 10/2011 | Putnam .................. H04L 43/08 348/180 |
| 2012/0151009 A1* | 6/2012 | Bouazizi ............. H04L 41/5067 709/219 |
| 2013/0094371 A1 | 4/2013 | Vallath et al. |
| 2013/0132854 A1 | 5/2013 | Raleigh et al. |
| 2013/0148531 A1* | 6/2013 | Moisan ............... H04L 41/5009 370/252 |
| 2013/0219053 A1* | 8/2013 | Quade ................. H04L 41/0604 709/224 |
| 2013/0250786 A1* | 9/2013 | Balasaygun ........ H04L 41/5032 370/252 |
| 2013/0279325 A1* | 10/2013 | Dunne ................ H04L 41/5025 370/228 |
| 2014/0053013 A1* | 2/2014 | MacQuarrie ........ G06F 11/0793 714/4.1 |
| 2014/0064137 A1 | 3/2014 | El-Hennawey et al. |
| 2014/0310564 A1* | 10/2014 | Mallige ............... G06F 11/0781 714/47.1 |
| 2015/0138994 A1* | 5/2015 | Dadheech ........... H04L 41/5067 370/249 |
| 2015/0142970 A1* | 5/2015 | Callaghan ............... H04L 1/244 709/224 |
| 2015/0195174 A1* | 7/2015 | Kogami .............. H04L 41/0695 709/224 |

OTHER PUBLICATIONS

Office Action dated Nov. 19, 2015, from U.S. Appl. No. 14/178,238, filed Feb. 11, 2014, 60 pages.
Office Action dated Mar. 16, 2016, from U.S. Appl. No. 14/178,238, filed Feb. 11, 2014, 66 pages.
International Search Report and Written Opinion dated Mar. 18, 2015, issued in corresponding International Application No. PCT/US2014/016124, Filed Feb. 12, 2014, 22 pages.
Calev, J., "Lync Server Topologies—on Sites Pools and Services," Joe Calev's WebLog, Sep. 16, 2010, <http://blogs.msdn.com/b/jcalev/archive/2010/09/16/lync-server-topologies-on-sites-pools-and-services.aspx> [retrieved Feb. 11, 2014], 2 pages.
"Cisco Prime Network Analysis Module Software 5.1 User Guide," Text Part No. OL-24410-01, Cisco Systems, Inc., San Jose, Calif., Apr. 2011, Table of Contents, pp. iii-x.
"Cisco Prime Network Analysis Module Software 5.1 User Guide," Text Part No. OL-24410-01, Cisco Systems, Inc., San Jose, Calif., Apr. 2011, Chap. 2, "Setting Up the Cisco NAM," pp. 2-1-2-88.
"Cisco Prime Network Analysis Module Software 5.1 User Guide," Text Part No. OL-24410-01, Cisco Systems, Inc., San Jose, Calif., Apr. 2011, Chap. 3, "Monitoring and Analysis," pp. 3-1-3-42.
"Cisco Prime Network Analysis Module Software 5.1 User Guide," Text Part No. OL-24410-01, Cisco Systems, Inc., San Jose, Calif., Apr. 2011, Chap. 6, "NAM Deployment," pp. 6-1-6-26.
"PowerView 3.0 Is a Scalable and Comprehensive Microsoft Lync Server 2010 Enterprise Reporting Solution for Driving Usage and Adoption, Optimizing Infrastructure Investments, Implementing Departmental Billing, and Tracking Return on Investment," Partner Solution Brief (Partner: Unify[2]), Case Study Summary, Microsoft, Oct. 2010, 2 pages.
"PowerView by Unify Square, Inc.," Office 365 Marketplace App Overview, © 2014 Microsoft Corporation, Redmond, Wash., <http://lynconline.pinpoint.microsoft .com/en-au/applications/powerview-12884915178> [retrieved Feb. 6, 2014], 3 pages.
Rasmussen, J.T., "What Is the Basis for Classifying a Call as Poor in Lync 2013 QoE?" Jens Trier Rasmussen TechNetBlogs, Sep. 20, 2013, <http://blogs.technet.com/b/jenstr/archive/2013/09/20/what-is-the-basis-for-classifying-a-call-as-poor-in-lync-2013-qoe.aspx> [retrieved Feb. 6, 2014], 2 pages.
"Sample Size Calculator," © 2004 Raosoft, Inc., Seattle, <http://www.raosoft.com/samplesize.html> [retrieved Feb. 8, 2014], 2 pages.
"Supported Lync Server 2013 Topologies," © 2014 Microsoft, Redmond, Wash., Jan. 14, 2014, <http://technet.microsoft.com/en-us/library/gg425833(d=printer).aspx> [retrieved Feb. 11, 2014], 5 pages.

(56) References Cited

OTHER PUBLICATIONS

Invitation to Pay Additional Fees and, Where Applicable, Protest Fee dated May 16, 2014, issued in corresponding International Application No. PCT/US2014/016124, filed Feb. 12, 2014, 3 pages.
Office Action dated Aug. 7, 2014, from U.S. Appl. No. 14/178,209, filed Feb. 11, 2014, 13 pages.
Final Office Action dated Jun. 6, 2016, from U.S. Appl. No. 14/178,228, filed Feb. 11, 2014, 22 pages.

\* cited by examiner

POOR CALLS NETWORK BREAKDOWN

| NETWORK | GEOGRAPHY | 12 JAN % POOR AUDIO CALLS FROM TOTAL | 12 FEB % POOR AUDIO DISTRI- BUTION CALLS | 12 MAR % POOR AUDIO CALLS FROM TOTAL | 12 APR % POOR AUDIO DISTRI- BUTION CALLS | 12 MAY % POOR AUDIO CALLS FROM TOTAL | 12 JAN % POOR AUDIO DISTRI- BUTION CALLS | 12 FEB % POOR AUDIO CALLS FROM TOTAL | 12 MAR % POOR AUDIO DISTRI- BUTION CALLS | 12 APR % POOR AUDIO CALLS FROM TOTAL | 12 MAY % POOR AUDIO DISTRI- BUTION CALLS |
|---|---|---|---|---|---|---|---|---|---|---|---|
| ALL NETWORKS | ALL | 0.2 | 0.3 | 0.2 | 0.3 | 0.2 | 0.2 | 0.3 | 0.2 | 0.3 | 0.2 |
| USER | ALL | | | | | | | | | | |
| + WIRELESS/ INTERNAL | EMEA | 0 | 0.3 | 0 | 0.3 | 0 | 0.2 | 0.3 | 0.2 | 0.3 | 0.2 |
| | GERMANY + MUNICH | 0 | 0.5 | 0 | 0.5 | 0 | 0 | 0.5 | 0 | 0.5 | 0 |
| | APAC | 0.2 | 0.3 | 0.2 | 0.3 | 0.2 | 0.2 | 0.3 | 0.2 | 0.3 | 0.2 |
| | US | 0 | 0.5 | 0 | 0.5 | 0 | 0 | 0.5 | 0 | 0.5 | 0 |
| | FEDERATED | 0.2 | 0.3 | 0.2 | 0.3 | 0.2 | 0.2 | 0.3 | 0.2 | 0.3 | 0.2 |
| + WIRELESS/ EXTERNAL | ALL | 0.2 | 0.3 | 0.2 | 0.3 | 0.2 | 0.2 | 0.3 | 0.2 | 0.3 | 0.2 |
| + VPN | ALL | 0 | 0.5 | 0 | 0.5 | 0 | 0 | 0.5 | 0 | 0.5 | 0 |
| CORPORATE | ALL | 0.2 | 0.3 | 0.2 | 0.3 | 0.2 | 0.2 | 0.3 | 0.2 | 0.3 | 0.2 |
| + PC-PC | ALL | 0 | 0.5 | 0 | 0.5 | 0 | 0 | 0.5 | 0 | 0.5 | 0 |
| + CONFERENCE | ALL | 0 | 0.5 | 0 | 0.5 | 0 | 0 | 0.5 | 0 | 0.5 | 0 |
| + PC-MS | ALL | 0.2 | 0.3 | 0.2 | 0.3 | 0.2 | 0.2 | 0.3 | 0.2 | 0.3 | 0.2 |
| + MS-GW | ALL | 0 | 0.5 | 0 | 0.5 | 0 | 0 | 0.5 | 0 | 0.5 | 0 |
| EXTERNAL | ALL | 0.2 | 0.3 | 0.2 | 0.3 | 0.2 | 0.2 | 0.3 | 0.2 | 0.3 | 0.2 |
| + FEDERATED | ALL | 0 | 0.5 | 0 | 0.5 | 0 | 0 | 0.5 | 0 | 0.5 | 0 |
| + EDGE | ALL | 0.2 | 0.3 | 0.2 | 0.3 | 0.2 | 0.2 | 0.3 | 0.2 | 0.3 | 0.2 |

FIG. 4.

POOR CALLS GEOGRAPHY BREAKDOWN

| GEOGRAPHY | NETWORK | 12 JAN % POOR AUDIO CALLS FROM TOTAL | 12 JAN % POOR AUDIO DISTRIBUTION CALLS | 12 FEB % POOR AUDIO CALLS FROM TOTAL | 12 FEB % POOR AUDIO DISTRIBUTION CALLS | 12 MAR % POOR AUDIO CALLS FROM TOTAL | 12 MAR % POOR AUDIO DISTRIBUTION CALLS | 12 APR % POOR AUDIO CALLS FROM TOTAL | 12 APR % POOR AUDIO DISTRIBUTION CALLS | 12 MAY % POOR AUDIO CALLS FROM TOTAL | 12 MAY % POOR AUDIO DISTRIBUTION CALLS |
|---|---|---|---|---|---|---|---|---|---|---|---|
| ALL | ALL | 0.2 | 0.3 | 0.2 | 0.3 | 0.2 | 0.3 | 0.2 | 0.3 | 0.2 | 0.3 |
| ALL | ALL | 0.2 | 0.3 | 0.2 | 0.3 | 0.2 | 0.3 | 0.2 | 0.3 | 0.2 | 0.3 |
| EMEA | ALL | 0 | 0.5 | 0 | 0.5 | 0 | 0.5 | 0 | 0.5 | 0 | 0.5 |
| GERMANY | ALL | 0 | 0.5 | 0 | 0.5 | 0 | 0.5 | 0 | 0.5 | 0 | 0.5 |
| MUNICH | ALL | 0.2 | 0.3 | 0.2 | 0.3 | 0.2 | 0.3 | 0.2 | 0.3 | 0.2 | 0.3 |
|  | USER | 0 | 0.5 | 0 | 0.5 | 0 | 0.5 | 0 | 0.5 | 0 | 0.5 |
|  | +WIRELESS/INTERNAL | 0.2 | 0.3 | 0.2 | 0.3 | 0.2 | 0.3 | 0.2 | 0.3 | 0.2 | 0.3 |
|  | +WIRELESS/EXTERNAL | 0.2 | 0.3 | 0.2 | 0.3 | 0.2 | 0.3 | 0.2 | 0.3 | 0.2 | 0.3 |
|  | +VPN | 0 | 0.5 | 0 | 0.5 | 0 | 0.5 | 0 | 0.5 | 0 | 0.5 |
|  | CORPORATE EXTERNAL | 0.2 | 0.3 | 0.2 | 0.3 | 0.2 | 0.3 | 0.2 | 0.3 | 0.2 | 0.3 |
| APAC | ALL | 0 | 0.5 | 0 | 0.5 | 0 | 0.5 | 0 | 0.5 | 0 | 0.5 |
|  |  | 0 | 0.5 | 0 | 0.5 | 0 | 0.5 | 0 | 0.5 | 0 | 0.5 |
| US | ALL | 0.2 | 0.3 | 0.2 | 0.3 | 0.2 | 0.3 | 0.2 | 0.3 | 0.2 | 0.3 |
| FEDERATED | ALL | 0 | 0.5 | 0 | 0.5 | 0 | 0.5 | 0 | 0.5 | 0 | 0.5 |

*FIG. 5.*

| CALLER | CALLEE | CALLER GEO | CALLEE GEO | CALLER NETWORK | CALLEE NETWORK | TYPE OF CALL | START DATE/ TIME | DURATION (MINS/ SECS) | NMOS SCORE | NMOS DEG | PACKET LOSS | JITTER | LATENCY |
|---|---|---|---|---|---|---|---|---|---|---|---|---|---|
| USER1 | USER2 | BELLEVUE | LONDON | INTERNAL / WIRED | EXTERNAL / WIRELESS | PC-PC | THURS 1ST FEB 10:01AM UTC | 0:54.22 | 3.4 | 0.2 | 1000 | 0.5 | 5 |

Comments

← → C  2e64856b47cb400697564867aad13177.cloudapp.net:8080/Comments.aspx

Welcome U2_AllAccess
[ Log Out ] [ Change Password ]
Select Company: Company ABC ▼

☰ Graphs  ☐ Comments  🔍 Search  ☐ Export

Display details for: NSAT Survey ▼

| | Week | Comments | User | Response | NSAT Rating | QoE Calculated Rating |
|---|---|---|---|---|---|---|
| Select | 10/31/2011 | 6 | amy@email.com | Voice was unreliable a couple of times last week | Somewhat Dissatisfied | 3.2 (Fair) |
| Select | 12/12/2011 | 7 | bob@email.com | No issues this week! | Very Satisfied | 4.0 (Good) |
| Select | 08/29/2011 | 10 | alice@email.com | Had a really bad couple of conference calls this week. | Very Dissatisfied | 2.0 (Annoying) |
| Select | 11/21/2011 | 14 | | | | |
| Select | 09/19/2011 | 11 | | | | |
| Select | 01/23/2012 | 2 | | | | |
| Select | 03/26/2012 | 4 | | | | |
| Select | 07/18/2012 | 2 | | | | |
| Select | 10/17/2011 | 9 | | | | |
| Select | 11/28/2011 | 9 | | | | |
| Select | 07/25/2012 | 3 | | | | |
| Select | 05/21/2012 | 4 | | | | |
| Select | 02/13/2012 | 2 | | | | |
| Select | 08/15/2011 | 21 | | | | |
| Select | 11/07/2011 | 12 | | | | |
| Select | 12/19/2011 | 5 | | | | |
| Select | 06/13/2012 | 3 | | | | |
| Select | 09/06/2011 | 11 | | | | |
| Select | 08/15/2012 | 3 | | | | |
| Select | 03/12/2012 | 4 | | | | |

1 2 3

Notes: Click on user to view per-user metrics (Poor calls, QoE Aggregate scores) against enterprise and industry benchmarks. User QoE Calculated Rating is calculated based on Qoe data for the User during the NSAT survey time interval.

PowerMon Detected Low MOS Score on 01/31/2013 03:48:50 PM UTC

Name: APAC – US Inbound: user07 -> user01

Caller NMOS  2.88
user07@email.com

| Streams | Inbound | Outbound |
|---|---|---|
| Packet Loss | 0.05 | N.A. |
| Jitter | 1 | N.A. |
| Latency | - | 190 |
| Degradation | 0.82 | - |

Callee NMOS  2.90
user01@email.com

| Streams | Inbound | Outbound |
|---|---|---|
| Packet Loss | 0.06 | N.A. |
| Jitter | 2 | N.A. |
| Latency | - | 193 |
| Degradation | 0.81 | - |

*FIG.15.*

FIG.21.
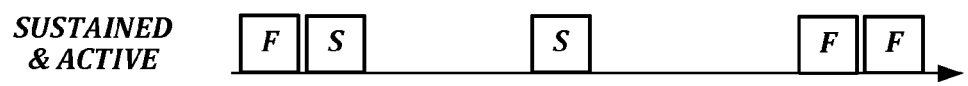
FIG.22.

FIG. 25.

Creating New Survey

| Survey Details | Users | Survey Instances |

Survey Template: [No Template ▼]   Survey Langauage: [English ▼]

Anonymous ⓘ   Positive Answers ⓘ   Negative Answers ⓘ
☐   [yes, yeah]   [no, nope]

Initial Question ⓘ
[Would you like to take a survey?]

NSAT Question ⓘ
[How would you rate our Lync system on a scale from 1 (very bad) to 4 (very good)?]

Leave Comment ⓘ
[Would you like to leave a comment?]

Comment Prompt ⓘ
[Please leave a comment]

Final Statement ⓘ
[Thank you for your input!]

[Cancel] [Save]

ADVANCED TOOLS FOR UNIFIED COMMUNICATION DATA MANAGEMENT AND ANALYSIS

CROSS-REFERENCE TO RELATED APPLICATION

This application claims the benefit of U.S. Provisional Patent Application No. 61/763,919, filed Feb. 12, 2013, the disclosure of which is hereby incorporated by reference in its entirety.

BACKGROUND

In general, unified communication (UC) systems provide UC services. UC services include communication services (e.g., e-mail services, instant messaging services, voice communication services, video conference services, and the like) and UC data management and analysis services.

UC platforms allow users to communicate over internal networks (e.g., corporate networks) and external networks (e.g., the Internet). This opens communication capabilities not only to users available at their desks, but also to users who are on the road and even to users from different organizations. With such solutions, end users are freed from limitations of previous forms of communication, which can result in quicker and more efficient business processes and decision making.

However, the quality of communications in such platforms can be affected by a variety of problems, including software failures, hardware failures, configuration problems (e.g., system-wide or within components (e.g., firewalls, load balancers)), and network performance problems. The potential impacts of these and other problems include immediate impact upon end users (both internal and roaming) and inefficient use of functionality that increases overall costs.

Further, given the unprecedented level of consolidation/centralization that UC platforms may enable, a 100,000 user enterprise may accumulate on the order of 1 billion call records and 1 terabyte of data per year. Formally maintaining this data as an accurate and persistent long-term repository for reference and analysis can help an enterprise to meet its technical, business, and compliance needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments disclosed herein include computer implemented methods and computer systems configured to perform such methods. In one aspect, one or more aggregate metrics (e.g., an average packet loss metric, an average latency metric, etc.) are computed for calls associated with a location. The location is associated with one or more geographic markers (e.g., an IP address, a network identifier, etc.). An aggregate call score is determined for the location based on the one or more aggregate metrics. Based on the aggregate call score for the location, a notification is sent to one or more users associated with the one or more geographic markers.

In another aspect, workloads are tested within a computer system. The testing of each workload is performed according to a corresponding test rule. A calculation of weighted availability values is performed for the workloads based on user impact ratings for the corresponding test rules. The weighted availability values can be further based on business impact ratings for the corresponding test rules. A weighted impact score can be calculated (e.g., as an intermediate value in an availability calculation) based on user impact ratings and business impact ratings. An aggregate service availability value can be calculated for the system based on the weighted availability values for the workloads of the system.

In another aspect, workloads are tested within a UC system, and the testing of each workload is performed according to a corresponding test rule. A rule failure is detected that is associated with at least one of the test rules. The rule failure is classified as sustained or intermittent. The sustained or intermittent rule failure is further classified (e.g., based on whether the failure is frequent or isolated, based on user impact, etc.). A response priority is set for the rule failure based at least in part on the classification of the rule failure.

In another aspect, an automatic inspection of a UC topology is performed. A set of usage scenarios is determined based on the automatic inspection. A set of test rules is generated. The test rules are configured to test workloads corresponding to the set of usage scenarios. The workloads can be tested according to the corresponding test rules. The test rules may be associated with metrics such as user impact ratings or business impact ratings. Test rules that may be generated in this way include, for example, audio conference test rules, dial-in conference test rules, outbound call test rules, inbound call test rules, and peer-to-peer audio call test rules.

In another aspect, a set of survey candidates is identified for an instance of a user survey. The survey candidates are users of a UC system. The survey instance is executed by establishing a connection with the UC system, receiving presence information of the survey candidates, and processing the survey instance for the survey candidates based on the presence information. Identification of the set of survey candidates can include applying user filters to a list of users of the unified communication system to obtain a filtered population, and adding users from the filtered population to the set of survey candidates. Adding users from the filtered population can include determining a sample size for the set of survey candidates, and adding users from the filtered population at least until the sample size is reached. The sample size may vary based on, for example, an adjustable confidence level and/or an adjustable expected response rate.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 shows an example of a detailed report titled "Poor Calls Network Breakdown";

FIG. 5 shows an example of a detailed report titled "Poor Calls Geography Breakdown";

FIG. 6 shows a table with information relating to a call;

FIG. 7 shows a user interface for accessing responses to a survey relating to voice quality;

FIG. 15 shows an alert generated by a monitoring service;

FIGS. 21 and 22 are diagrams of timelines illustrating rule failure scenarios;

FIG. 25 is a screenshot of a graphical user interface that provides a survey question creation dialog;

FIG. 26 is a screenshot of a graphical user interface that provides a tool for selecting filters to be applied to a user population for a conducting a survey;

FIG. 27 is a screenshot of a graphical user interface that provides an editor tool for assigning a schedule to a survey instance;

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present disclosure includes descriptions of various aspects of unified communication (UC) systems, such as UC management and analysis systems, tools, and techniques. In general, UC systems (such as UC systems based on the Lync platform available from Microsoft Corporation) provide UC services. As described herein with respect to various embodiments of the present disclosure, UC services include communication services (e.g., e-mail services, instant messaging services, voice communication services, video conference services, and the like) and UC data management and analysis services, or other services. Representative UC management and analysis services are described in detail below.

Figure 1:
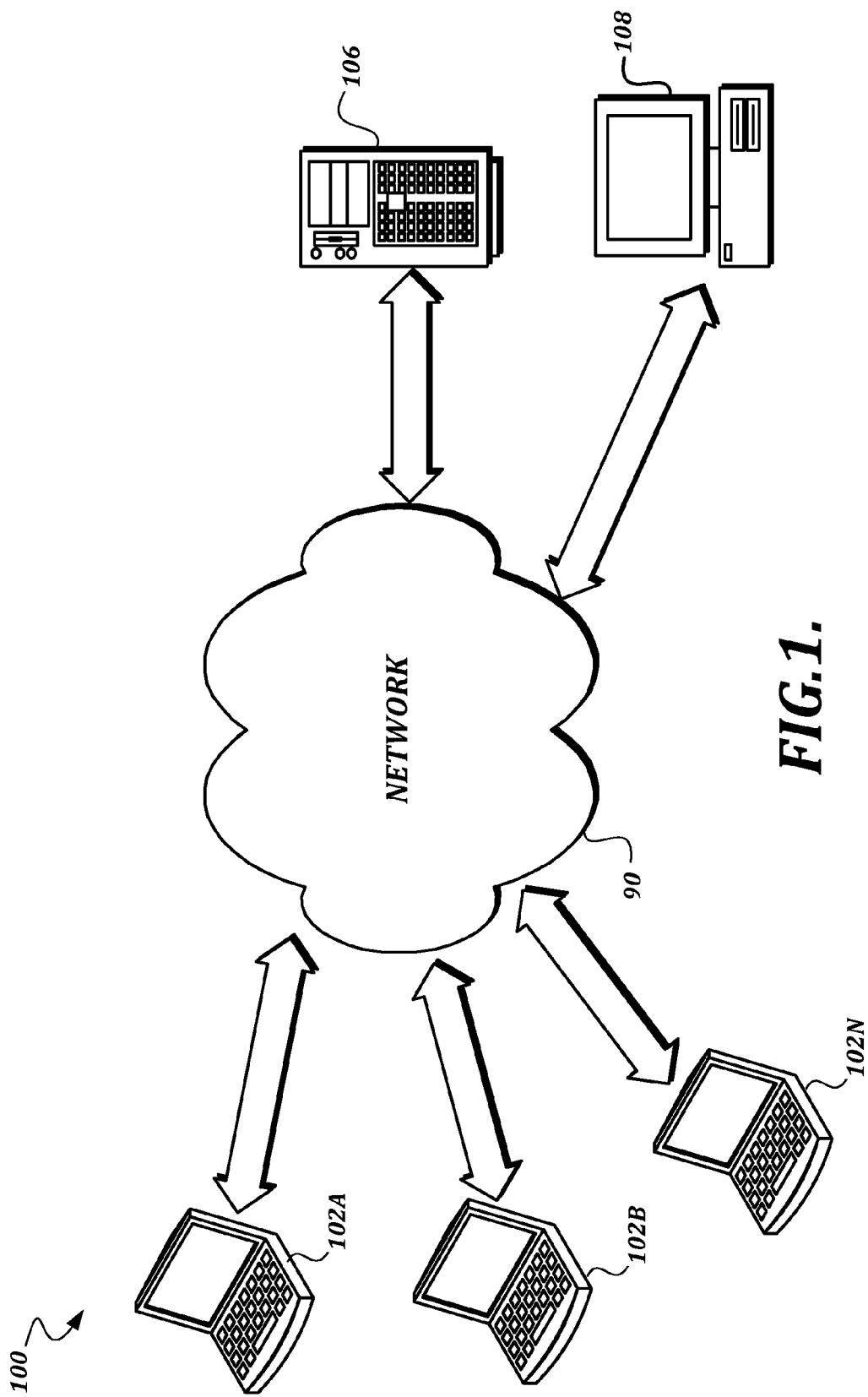
FIG. 1 is a block diagram that illustrates a generalized UC management and analysis system according to various aspects of the present disclosure.

FIG. 1 is a block diagram that illustrates a generalized UC management and analysis system 100 according to various aspects of the present disclosure. In this generalized example, the system 100 includes client computing devices 102A-N, a server 106, and an administrator computing device 108. The components of the system 100 may communicate with each other via a network 90. For example, the network 90 may comprise a wide-area network such as the Internet. The network 90 may comprise one or more sub-networks (not shown). For example, the network 90 may include one or more local area networks (e.g., wired or wireless local area networks) that may, in turn, provide access to a wide-area network such as the Internet. The client devices 102A-N may be computing devices operated by end users of a UC system. A user operating the administrator device 108 may connect to the server 106 to, for example, manage and analyze use of the UC system.

Figure 2:
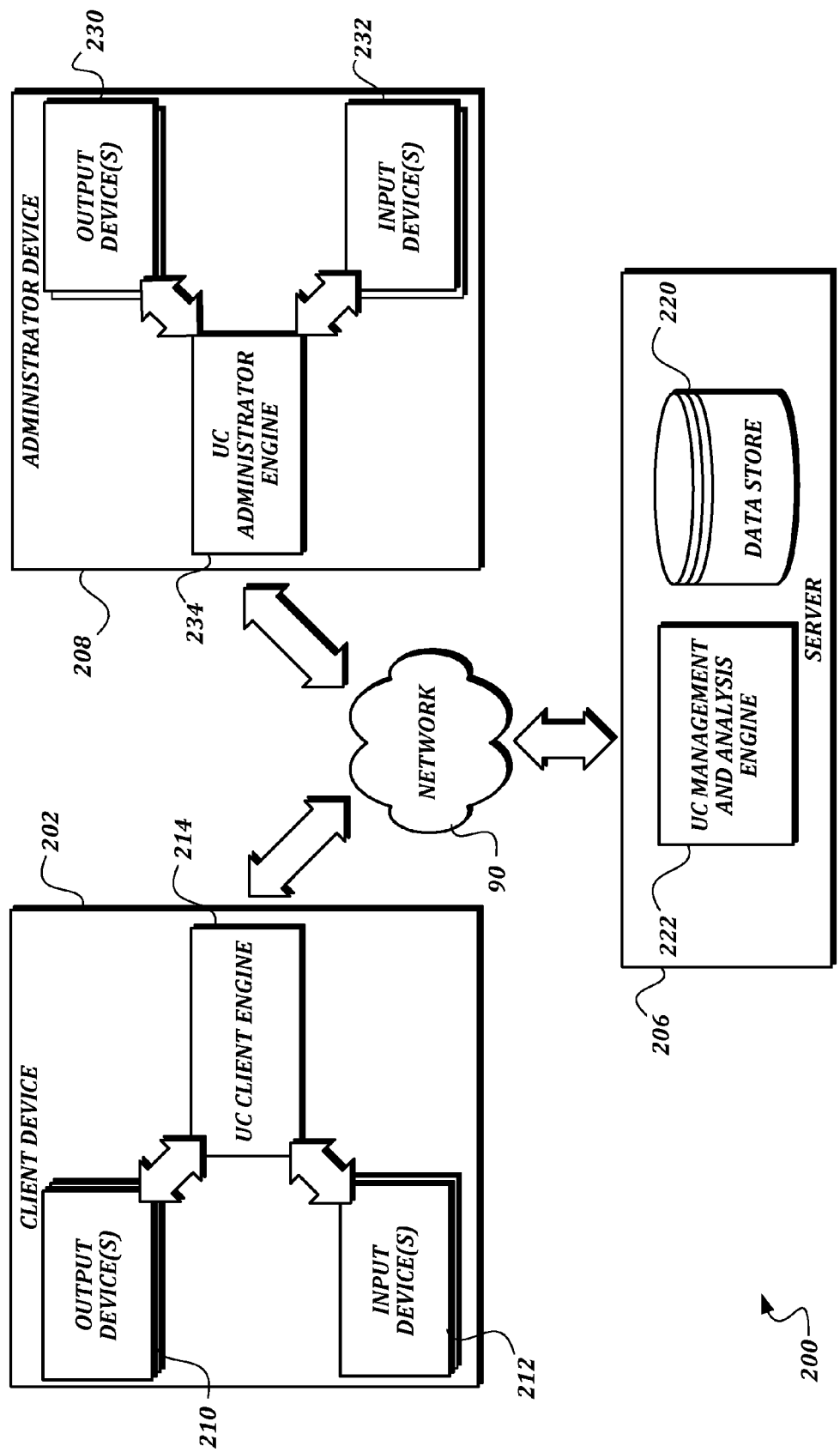
FIG. 2 is a block diagram that illustrates another example of a unified communication management and analysis system.

FIG. 2 is a block diagram that illustrates another example of a unified communication management and analysis system. As shown in FIG. 2, the system 200 comprises a client computing device 202, a server 206, and an administrator computing device 208. In the example shown in FIG. 2, the server 206 comprises a data store 220 and a UC management and analysis engine 222. The data store 220 stores data that relates to operation and use of UC system, as will be further described below. The management and analysis engine 222 interacts with the data store 220.

In the example shown in FIG. 2, the data store 220 can store data and definitions that define elements to be displayed to an end user on a client device 202 or administrator device 208. For example, the data store 220 can store data that describes the frequency, quality, and other characteristics of communications (e.g., voice communications) that occur across an enterprise via a UC system. As another example, a definition defining a set of interface elements can be used to present a graphical user interface at administrator device 208 that can be used by a system administrator that is seeking to diagnose the cause of a reported problem in the UC system, as explained in detail below. As another example, a definition defining a set of interface elements can be used to present a graphical user interface at client device 202 to guide an end user to respond to a survey relating to the end user's experience with the UC system, as explained in detail below. Interface elements, such as text boxes, soft buttons, checkboxes, drop-down boxes, multimedia interface elements (e.g., audio or video players), and/or the like, may receive input from or present output (e.g., to an end user or system administrator).

In the example shown in FIG. 2, the client device 202 includes output device(s) 210, input device(s) 212, and a UC client engine 214. The UC client engine 214 is configured to process input and generate output related to UC services and content (e.g., services and content provided by the server 206). The UC client engine 214 also is configured to cause output device(s) 210 to provide output and to process input from input device(s) 212 related to UC services. For example, input device(s) 212 can be used to provide input (e.g., text input, video input, audio input, or other input) that can be used to participate in UC services (e.g., instant messages (IMs), voice calls), and output device(s) 210 (e.g., speakers, a display) can be used to provide output (e.g., graphics, text, video, audio) corresponding to UC services.

In the example shown in FIG. 2, the administrator device 208 includes output device(s) 230, input device(s) 232, and UC administrator engine 234. The UC administrator engine 234 is configured to receive, send, and process information relating to UC services. The UC administrator engine 234 is configured to cause output device(s) 230 to provide output and to process input from input device(s) 232 related to UC services. For example, input device(s) 232 can be used to provide input for administering or participating in UC services, and output device(s) 230 can be used to provide output corresponding to UC services.

The UC client engine 214 and/or the UC administrator engine 234 can be implemented as a custom desktop application or mobile application, such as an application that is specially configured for using or administering UC services. Alternatively, the UC client engine 214 and/or the UC administrator engine 234 can be implemented in whole or in part by an appropriately configured browser, such as the Internet Explorer® browser by Microsoft Corporation, the Firefox® browser by the Mozilla Foundation, and/or the like. Configuration of a browser may include browser plug-ins or other modules that facilitate instant messaging, recording and viewing video, or other functionality that relates to UC services.

In any of the described examples, an "engine" may include computer program code configured to cause one or more computing device(s) to perform actions described herein as being associated with the engine. For example, a computing device can be specifically programmed to perform the actions by having installed therein a tangible computer-readable medium having computer-executable instructions stored thereon that, when executed by one or more processors of the computing device, cause the computing device to perform the actions. An exemplary computing device is described further below with reference to FIG. 30. The particular engines described herein are included for ease of discussion, but many alternatives are possible. For example, actions described herein as associated with two or more engines on multiple devices may be performed by a single engine. As another example, actions described herein as associated with a single engine may be performed by two or more engines on the same device or on multiple devices.

In any of the described examples, a "data store" contains data as described herein and may be hosted, for example, by a database management system (DBMS) to allow a high level of data throughput between the data store and other components of a described system. The DBMS may also allow the data store to be reliably backed up and to maintain a high level of availability. For example, a data store may be accessed by other system components via a network, such as a private network in the vicinity of the system, a secured transmission channel over the public Internet, a combination of private and public networks, and the like. Instead of or in addition to a DBMS, a data store may include structured data stored as files in a traditional file system. Data stores may reside on computing devices that are part of or separate from components of systems described herein. Separate data stores may be combined into a single data store, or a single data store may be split into two or more separate data stores.

I. Unified Communication Data Management and Analysis System

In this example, various examples of features that may be included in or associated with a UC data management and analysis system are described. The individual features described in this section may be implemented together, independently, or in various subsets, as may be appropriate for a particular application. The features described in this section may be implemented along with or independent of any of the other features described herein, such as the features described in Section II, below.

A. Techniques and Tools for Enhanced UC Data Capture, Analysis, and Reporting

Examples in this section describe features of an end-to-end solution for enterprise-level unified communication (UC) data capture, analysis, and reporting. As with other examples described herein, the examples in this section can be used with enterprise-level UC systems.

Overview of UC System with Enhanced Data Capture, Analysis, and Reporting

A UC system with enhanced data capture, analysis, and reporting capabilities as described herein can include one or more of the features described with reference to Examples 1-10 below. More generally, a comprehensive UC system with enhanced data capture, analysis, and reporting capabilities can provide the following functionality:

When used together with an enterprise-level UC platform, a UC system with enhanced data capture, analysis, and reporting capabilities can facilitate cost savings through consolidation, such as by (1) consolidating/replacing hundreds or thousands of disparate PBXs into one centralized global infrastructure; (2) consolidating multiple communications infrastructure components such as audio conferencing, instant messaging, application sharing, video conferencing, etc., into a single infrastructure; and (3) consolidating both internal and remote/external communications by employees, customers, partners, and suppliers into a single infrastructure. Productivity gains can be realized through an increase in collaboration and the speed of business, via an innovative and intuitive end-user experience.

Given the unprecedented level of consolidation/centralization that UC platforms may enable, a 100,000 user enterprise may accumulate on the order of 1 billion call records and 1 terabyte of data per year. Formally maintaining this data as an accurate and persistent long-term repository for reference and analysis can help an enterprise to meet its technical, business, and compliance needs.

A comprehensive UC system with enhanced data capture, analysis, and reporting capabilities can include:

- A highly scalable data warehouse built on SQL Server Analysis Services/OLAP "cubes" to permanently store massive volumes of accurate CDR and quality of experience (QoE) data. The warehouse is scalable up to a million active users or more, for up to ten years or more. This provides a robust and highly scalable business intelligence foundation for the enterprise for its business, technical, and compliance needs.
- A collaboration portal with features to provide access to all of the above reports, with the ability to support detailed queries that may, for example, enable interactive drill-down to analyze UC system performance in areas such as global voice quality. In some embodiments, the collaboration portal is a SharePoint service with a PerformancePoint component, available from Microsoft Corporation.
- Defining, measuring, tracking, and trending KPIs, and aggregating such KPIs into scorecards best suited for the enterprise. Examples of KPIs include active user trends, call counts, and average mean opinion score (MOS) relating to audio quality. A scorecard can be assembled comprising relevant KPIs for the organization. User adoption statistics can be reviewed, and data can be tracked against success metrics, allowing for "course-correction" in a platform deployment, if needed. The return on investment (ROI) of a UC system deployment tends to be directly correlated with the extent of user adoption—the more users use the system, the more the cost savings and the incremental productivity generated by the enterprise. Tracking and precisely measuring actual user adoption is therefore key to estimating cost savings and productivity gains; key relevant statistics include the number of active users, call counts, conference minutes, on-net minutes, etc. Other statistics such as remote usage, communications with federated partners, modality-specific statistics (e.g. video and application sharing), and response groups also can help measure performance. User adoption statistics also play a key role in identifying "problem areas" in an actionable manner. Poor adoption—either across the enterprise or across a specific site or functional unit—could point to a variety of remediation or proactive steps such as training, device selection, voice quality, or other site- or region-specific considerations. Similarly, IT needs to know if adoption is much better than expected, which would often point to success of the deployment.
- Functionality for enterprise-grade billing and CDR for unified communications. Traditional time-division multiplexing (TDM) telephony deployments have tended to have stringent needs around billing. However, significant reduction in domestic and international long-distance charges over the last twenty years, as well as the service consolidation and ability to shift phone calls to "on-net" calls provided by UC platforms, have dramatically changed enterprise approaches to billing needs. Instead of carrier-grade billing for call accounting, enterprises now tend to do a rough reconciliation (e.g. to within 5-10%) of their public switched telephone network (PSTN) phone charges, comparing the carrier bills they receive with internally-generated data based on CDRs and carrier rates. Some enterprises need to charge back their toll costs to appropriate internal cost centers and/or to specific clients. Finally, many enterprises need the ability to track individual CDRs for legal compliance purposes, as well as to detect fraud (e.g., unauthorized external use of enterprise resources or PSTN channels), etc. These needs require a robust enterprise-grade infrastructure for capturing authoritative CDR and billing-related data on a per-call basis, for retrieval and analysis at any point in the future.
- Voice quality metrics and trends. Voice quality is often perceived as "mission-critical" when evaluating communications infrastructure. Enterprises often define, measure, track, and attempt to identify trends in performance in voice quality, and compare them against service level agreements (SLAs). SLAs often apply both at a global level as well as a regional and site level, across the entire enterprise.
- Reports that help to illustrate trends over time in various areas, such as remote usage/"work from home"; collaboration among customers, suppliers, and partners; business activity over the work week, etc.
- Powerful and easily accessible class customization capabilities for creating user interface dashboards and reports, significantly reducing the need to have custom reports externally developed to meet enterprise specific business needs.
- Cost savings through optimization. Cost reduction can be realized, for example, by tracking actual device usage patterns (e.g., headsets vs. desk phones), site-level remote usage utilization for office space consolidation purposes, and consolidating trunks over large collections of sites into centralized SIP trunks, analyzing calling patterns across business units and geographies, to name just a few examples. Each of these examples can provide significant cost savings, especially for large enterprises.

The following examples illustrate some of the key features relating to the techniques and tools described herein for enhanced UC data capture, analysis, and reporting:

Example 1: Data Warehouse for Analyzing Global Communications Activity

An enterprise-wide data warehouse is described that consolidates communications activity in an enterprise into a single data store that provides insights into an enterprise's communication patterns.

In this example, the data warehouse includes the following features:

- ability to store multiple sets of CDR/QoE data from different databases by keeping track of which database server instance the data is imported from;
- removing duplicates ("de-duping") of call records based on the session initiation protocol (SIP) dialog ID (in the event that the same calls are logged to different databases);
- ability to control data import size to minimize load on the source databases and the UC data management system;
- configurable scheduling of data import processes;
- data cleansing (e.g., when analyzing conference participants, distinguishing true user participants from services); and
- calculated charges on person-to-person (P2P) calls and conference usage.

In this example, the data warehouse can pull data from the following sources:

- call details record (CDR) data;
- quality of experience (QoE) data;
- enterprise user data (active directory);

carrier rates data;
custom configuration files to enhance UC platform data (e.g., gateway detail information such as gateway groups and number of channels); and
a data model for business intelligence analytics.

Example 2: KPIs, Metrics, and Financial Reporting Based on Communications Activity Reporting on various business outcomes based on enterprise user communications activity is described. Reports are built on business models and algorithms that map user communication activity and other inputs (location, media) to financial metrics (cost, savings, etc.).

In this example, features relating to instant and real-time updates (e.g., via mobile device applications) to enterprise communications KPIs (e.g., a selection of three or some other number of important KPIs) are described. For example, a set of reference base KPIs can be used to measure success of a UC platform. KPIs can indicate overall effectiveness and efficiency of a UC platform deployment, and trends that inform the projected effectiveness and efficiency of the deployment. KPIs can be used to identify "problem spots" in the deployment, track user adoption (which affects cost savings as well as user productivity), and identify opportunities to optimize return on investment in the deployment.

In one embodiment, a KPI is used to help determine compliance with SLAs. Further details on SLA compliance are provided in the example below.

Example 3: Analyzing Service Level Objectives for Call Quality

In this example, a technique is described for classification of calls using location/subnet information, call metrics and algorithms for determining SLA intervals, and time slices based on configurable thresholds. The example technique may include following processing steps:
the UC data management system rates audio call quality by evaluating quality metrics against a defined set of acceptable threshold values (e.g., the quality metrics of each call of a set of many calls is evaluated against the acceptable threshold values);
the UC data management system discretizes calls into time intervals (e.g., by hour) and aggregates this data by site (e.g., grouping based on call endpoint subnet);
an SLA compliance algorithm evaluates the number of calls rated as "poor" within each site/time interval combination against SLA compliance requirements; and
SLA compliance is reported by the site and rolled up by time intervals. For example, if a time interval (e.g. from 2 p.m. to 3 p.m.) on a certain day is considered to not be compliant, then this will be rolled up into the relevant longer period, such as a month period. Therefore, if 2 p.m. to 3 p.m. on January 17th is non-compliant, the month of January would be considered non-compliant. In other words, a non-compliant time interval within a time period will result in non-compliance for the entire period.

Example 4: Controlled Access to Communications Activity Based on User Personas In this example, communications activity and reports are secured centrally and made selectively available to users based on various "personas" (e.g., business function or organizational/administrative functions). Access can be scaled from a group level to an individual level. Permissions settings can be used to define different levels of access. Data access also can be restricted based on personas. For example, a user may be restricted to only viewing data controlled by his department, and not other departments, within an organization.

Example 5: Classification of Communication Quality

In this example, techniques are described for classifying calls (video, audio, and multimedia) into distinct categories. These categories are then analyzed using heuristics and probabilistic methods to further map/transform data sets into actionable and prioritized recommendations. The prioritization is computed based on algorithms that consider various factors such as user location, user devices, network conditions, etc. User site information can be used in a heuristic for analyzing call patterns based on organization and/or geography. Example reports also are described for tracking overall voice quality with associated metrics within an organization's environment.

A quality assessment and classification tool can include the following functionality:
A user can identify factors that impact voice quality.
Cube mechanisms can be used to allow for identifying via a custom report less common scenarios of voice quality issues.
A user can filter the potential information to organizational geography.
A user can drill down into specific sets of all calls, filtered "poor calls," etc., to see the actual individual calls and associated key metrics.
A user can see trends of metrics over a period of time, to allow the viewer to identify potential improvements or reduction in voice quality.
A user can determine whether existing investments have been valuable and made a return on investment or not.
A user can identify that potential additional investments will have a return on the investment by addressing a set of identifiable issues.

a. Voice Quality Overview

Maintaining acceptable audio quality requires an understanding of UC system infrastructure and proper functioning of the network, communication devices, and other components. An administrator will often need to be able to quantifiably track overall voice quality in order to confirm improvements and identify areas of potential difficulty (or "hot spots") that require further effort to resolve. There may be a hierarchy of issues, ranging from network issues (typically being both common and important to fix), to issues that are specific to local users, to issues that are specific to remote users, over which an administrator may have little control.

b. Voice Quality Reporting Overview

One way to track audio quality is through reports. By utilizing reports, an administrator can identify hot spots to address and also convey (e.g., to senior management) information that supports broader conclusions about the system (e.g., that a system deployment is being successful over time, or that more investment is required).

Different systems and components may have different ways of classifying whether a call is classified as "poor." In addition, organizations may have differing requirements for call quality, and may wish to have some control over the standards by which a call will be classified as "poor" or not. SLA reporting may focus on sites as defined by subnet. However, not all customers may define subnets, or have the information to configure sites. Additionally, it is a complex process to keep subnet mapping accurate and up to date. However, there is a different set of information which is available, which could provide a very close approximation to users location, and that is geography information. Therefore, to provide an easier deployment model which allows for quicker SLA reports, it can be useful to allow for customers to utilize this same information.

SLA reports also can be used to break down call quality into different aspects which may have impacted the quality of those calls. Examples of factors that could impact audio quality are: (a) the split of wired vs. wireless calls (potentially, audio quality impacts can be due to wireless issues); (b) device characteristics (devices can impact audio quality as perceived by the end user, especially unsupported devices or those without the correct drivers); (c) the effects of gateways between devices; (d) remote users vs. users local to known sites (e.g., if most of the audio quality issues are driven by remote users, this information can be very useful). Identifying situations that may apply with respect to factor (b), above, may require not utilizing network QoE metrics, but other metrics such as Sending MOS (quality of audio stream being sent from user).

c. Example Information for Enhanced Voice Quality Analysis and Reporting

This section describes examples of information that can be used for enhanced voice quality analysis and reporting.

Classification of Poor Calls:

In order to isolate a grouping of calls with poor voice quality, it is important to have consistent and meaningful classification of calls. For example, wireless calls which have poor voice quality are important to group together to identify common patterns (e.g., whether the calls involve the same user) and to take appropriate action (e.g., educate the user to not use wireless, upgrade the wireless infrastructure).

Additionally, some problems may have more impact on voice quality than others, even within the same call. For example, a user who is using a wireless connection and is roaming outside the user's usual network may be calling another user who is on the corporate network using a wired connection. In this case, the overall experience may be impacted by the first user's wireless connection. An analysis of the conditions at the two endpoints can be conducted to determine which endpoint is more likely to impact a call and highlight one or more items to consider addressing (e.g., by encouraging a user to switch from a wireless connection to a wired connection for the next call).

Table 1 below includes examples of expected classifications of calls within the UC system. In this example, a call with two endpoints is classified based on the endpoint with the lowest quality classification. For example, if a first endpoint uses a wireless connection and a second endpoint has similar conditions except that the second endpoint uses a wired, corporate connection, the call will be classified based on the first endpoint. The following table is ordered with worst case being listed first:

TABLE 1

Classification of poor calls.

| Classification | Scenario | Types of issues |
|---|---|---|
| User (P-U) | VPN | Incorrectly utilizing VPN to access the network and, by consequence, using audio over TCP. May be wired or wireless; until VPN is addressed it is hard to assess other impacts. Admin needs to determine the number of calls and whether this is associated with a certain set of users, and allow for user education. |
| User (P-U) | Wireless/External: User is external to the main network and is using wireless. | Though potentially there are issues (e.g., with an edge server) independent of wireless, admin first needs to address users use of wireless. Admin needs to determine the number of calls and whetherthis is associated with a certain set of users, and allow for user education. |
| User (P-U) | Wireless/Internal: User is on internal network, but is using wireless. | Admin needs to determine the number of calls and whether this is associated with a certain set of users, and allow for user education. |
| External (P-E) | Federated | Federation allows users in one enterprise (or organization) to communicate with users in another enterprise (or organization). Users in the "Federated" enterprise are called "Federated partners." Calls to/from a specific federated partner may be poor because of internal challenges or a specific federated partner's network/infrastructure. Being able to identify if all federated partners are having issues (e.g., with a set of internal users) or a specific partner is important. Can break down by user/organization to identify potential groups of users with federated users, as well break down based on individual federated partners. |
| External (P-E) | Edge | Potentially, a single edge server or an array of edge servers has bandwidth problems, is being overloaded, or is incorrectly configured. Being able to identify which edge servers are having issues, and which sets of users maybe having issues (because they are using TCP as an ex- |

TABLE 1-continued

Classification of poor calls.

| Classification | Scenario | Types of issues |
|---|---|---|
| | | ample) is important. Can break down based on user/organization to identify potential group of users with issues and/or based on individual groupings of edge servers. |
| Corp-Net (P-C) | PC-PC: User is making a call to another user, in same or different location. | Depending on network links, the audio may be impacted. Identifying which network links are impacted is important. By being able to break down which organization/geographic area is seeing degraded audio, the admin is able to see which locations are impacted. |
| Corp-Net (P-C) | Conference | Calls from users to multipoint control units (MCUs) are impacted, potentially because of the users' locations on a network, or because of the data center network, the actual MCU being overloaded, or a bad configuration. Can break down based on user organization/geographic area to identify potential locations that are having bad audio quality due to local network issues. In addition, the grouping of MCUs are also shown, to allow for potentially a single MCU or a pool of MCUs to be highlighted as impacting audio quality. |
| Corp-Net (P-C) | UC <–> GW (bypass): Calls between a user's PC and the gateway (GW) which are bypassing the mediation server (MS). | Similar to conference calls, the audio quality may be impacted by the users' locations on the network, the GW data center network, the GW being overloaded, or a bad configuration. Can break down based on user organization/geographic area to identify potential locations that are having bad audio quality due to local network issues. In addition, the grouping of MS's are also shown, toallow for potentially a single MS or pool of MS's tobe highlighted as impacting audio quality. |
| Corp-Net (P-C) | UC <–> MS (non-bypass): Calls between a user's PC and the mediation server. | Similar to conference calls, the audio quality may be impacted by the users' locations on the network, the MS data center network, the MS being overloaded, or a bad configuration. Can break down based on user organization/geographic areato identify potential locations that are having bad audio quality due to local network. In addition, the grouping of MS's are also shown, to allow for potentially a single MS or pool of MS's to be highlighted as impacting audio quality. |
| Corp-Net (P-C) | MS <–> GW (non-bypass): Calls between an MS and the GW. | Similar to conference calls, the audio quality may be impacted by the MS locations on the network or data center, or GW locations on the network or data center network, or by either being overloaded, or a bad configuration. Can break down based on server site of the MS or GW. |

Grouping of Related Calls:

The table above highlights classification of calls with certain general common characteristics, but this could result in a large number of calls across the organization that are not actionable. For example, if a certain amount of low voice quality is expected but there is real hot spot of issues within a certain set of users (e.g., a particular office), those poor calls could be hidden by the wider organization's good calls. Therefore, breaking down the classification to focus on a specific area can be useful.

Although the breakdown could be based on any of several factors (e.g., time of day, specific site, etc.), in at least one embodiment the break down is based on geography. This has the advantage of being generally aligned with users' inter-activity (e.g., users who are in the Singapore geography are likely using the Singapore network more often) and any future training requirements. If geography information is not available or reliable, the value of breaking down the classification in this way is reduced.

In addition to current user geographies, there is a need for several classifications to have additional groupings that do not exist in current user geographies. These are for infrastructure components (MCUs, MS, GWs) which are potentially not in the same locations as users, data centers, etc., as well as for federated partners whose actual geography is not accurately known. Therefore, on top of user geographies, additional elements can be added into the geography hierarchy for voice quality purposes, as follows:

Existing Geography Hierarchy
    Region→Country→Site/Province
      Office
        1. Users
        2. <Infrastructure Components>
      <Infrastructure Site>
        1. <Infrastructure Components>

Federation
<Domain 1>
<Domain 2>

Additional infrastructure components may exist within the same geographies as users, and can be within the same offices or, potentially, in unique locations (e.g., data centers). It is possible to have additional locations added to the existing geography hierarchy, with the potential to break these down to the calls associated with particular users or infrastructure components.

For federation, it is expected that although federated partners may share some of the same locations as an organization's geography, it may not be possible to confirm the location, since additional geographical information is not available. Therefore, federation can be a new element in the top level hierarchy with the ability to break down to each individual partner.

Classification of Poor Calls and Thresholds:

In order to determine what potential problems exist, it is vital to have a clear definition of what a poor call is, and what is an acceptable amount of poor calls. The definition of a poor call can be provided by a UC platform, by a customer, or in some other way. Some example thresholds for acceptable amounts of poor calls are as follows:

P-U calls: 0.5%;
P-E calls: 1.5%;
P-C calls: 0.1%; and
All calls: a sum of the percentages above.

These thresholds can be set by default, and can be overridden if desired.

Call Counts:

Not all classifications/geographies with poor audio quality will require the same level of attention. For example, a geography which is having 1 poor call out of 10, is likely worth investing more time in than a geography with 1 poor call out of 100. Therefore, it is important that wherever information is being displayed, the size of the voice quality problem can be compared. To this end, the following metrics can be shown:

Percentage of Poor Audio Calls from Total: the percentage of poor calls of a specific classification compared to the total of all calls in all classifications (e.g., APAC (Asia-Pacific) user calls with a poor wireless classification is 10 out of 1000 total calls in the enterprise—hence 1%);

Percentage of Poor Audio Calls: the percentage of poor calls of a specific classification compared to the total of classification calls (e.g., APAC user calls with a poor wireless classification is 10 out of 50 total calls—hence 20%);

Percentage of Poor Audio Calls Distribution: the percentage of poor calls of a specific classification compared to the total of all poor calls in all classifications (e.g., APAC user calls with a poor wireless classification is 10 out of 100 total poor calls in the enterprise—hence 10%);

Poor Audio Calls: the actual number of poor calls for that classification (e.g., the number of APAC user calls with a poor wireless classification is 10); and Audio Calls: the actual total number of calls for that break down (e.g., the number of APAC user calls is 50).

Classification Call Summary:

For each grouping of poor calls, it can be useful to see details of the associated poor calls, e.g.:

"To" (target of call);
"From" (source of call);
Time of day & length of call;
Source location (geography, organization, site);
Target location (geography, organization, site);
Type of call (P2P, Conference, PSTN, etc.);
Infrastructure used (MCU, GW, etc.); and/or
QoE information (e.g., network MOS (NMOS), jitter, latency, packet loss).

Depending on factors such as the selected grouping of poor calls, other information may be more relevant than the examples provided above.

Using information described herein, a customer can:

view trends of the overall system and specific call classifications/geographies to identify any improvements or degradation in overall voice quality;

where necessary, break down an overall superset of information (e.g., global voice quality) and drill down into specific areas to see if there is a hotspot of problems (e.g., a specific office using wireless connections);

find the top X classifications/geographies that likely require the immediate attention without the need to manually drill down;

if certain networks are consistently providing low quality audio, focus attention on determining a solution;

if a certain range of users is utilizing unsupported devices, determine a path for these users to utilize correct devices;

if certain users are experiencing bad quality audio while working remotely, determine if any technical solution is available (such as better networks) or provide better education to end users;

if certain gateways are providing bad audio quality, confirm whether those gateways are appropriate or need to be upgraded; and/or use trends to be able to identify that relevant prior actions have been successful or if additional actions are required.

d. Example Dashboards

In this example, a user (also called a "viewer" in this context) has access to dashboards that provide information.

Global Trends Dashboard:

The viewer is interested in understanding global or call categorization/geography trends to determine if there has been an improvement in overall voice quality. A global trends dashboard can provide a top level summary of information and trends. This can be at the global level or with the ability to select (via filters and hierarchies) trends for a certain classification/geography pairing. A global trends dashboard can provide the following filters and reports:

Filter 1—Trailing Period (e.g., 7 days, 6 weeks, 12 weeks, 6 months, 12 months)—by default, this can be 12 weeks;

Filter 2—Geography hierarchy;

Filter 3—Call Classification hierarchy;

Report 1—Poor Call Summary Table: shows the percentage of Poor Audio Calls from Total, Poor Call Threshold, % Poor Audio Calls Distribution, Poor Audio calls, and Audio calls. An example of this table is shown below in Table 2:

TABLE 2

Poor Call Summary Table (last 12 months)

| Network Type | % Poor Audio Calls from Total | Threshold | % Poor Audio Calls Distribution | Poor Audio Calls | Audio Calls |
|---|---|---|---|---|---|
| All | 2.05% | 2.00% | 100% | 184 | 8972 |
| Corporate | 1.2% | 0.10% | 62.5% | 115 | 7182 |
| External | 0.4% | 1.40% | 21% | 38 | 1428 |
| User | 0.3% | 0.50% | 17% | 31 | 362 |

Figure 3:
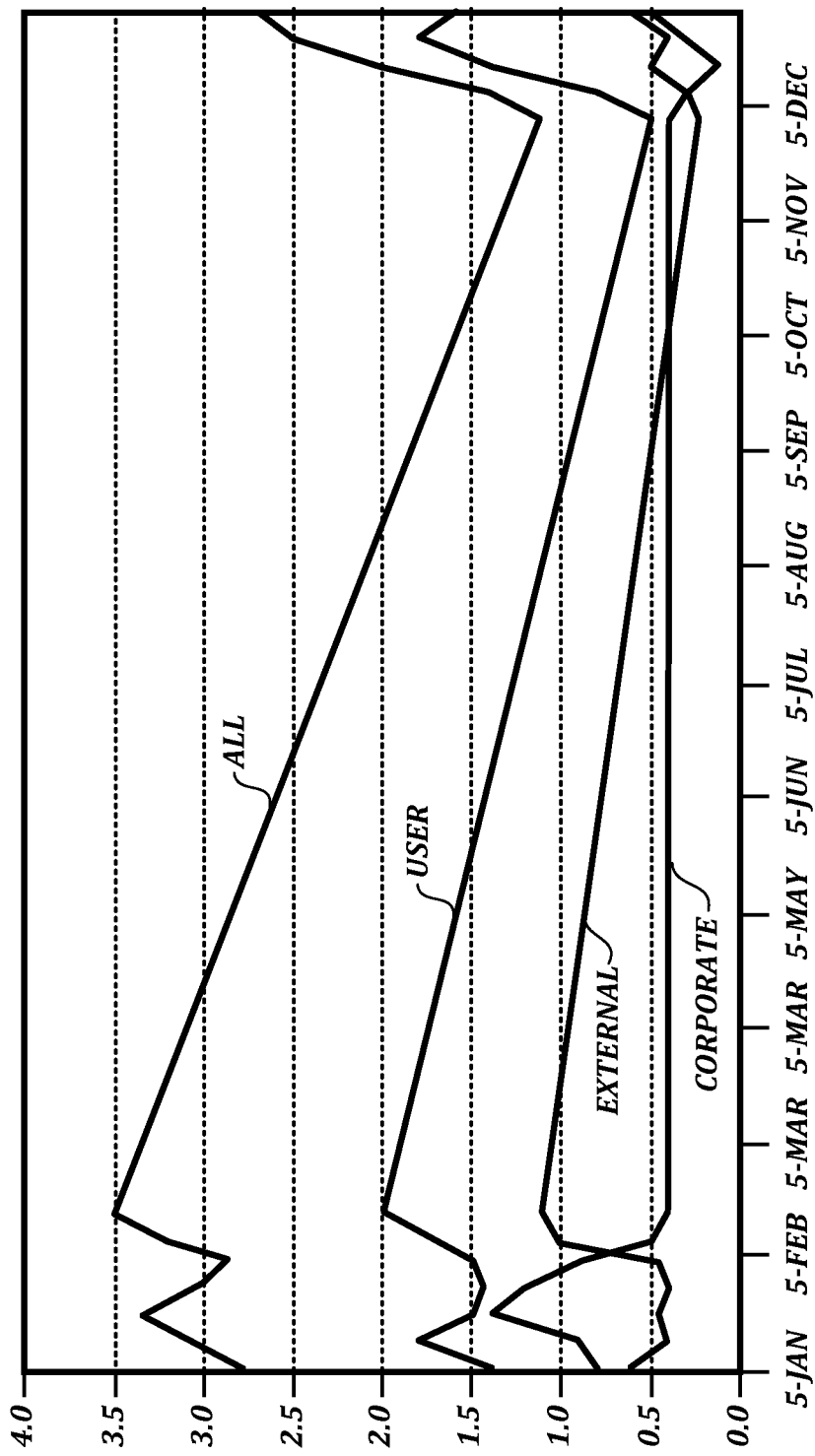
FIG. 3 is a line graph that shows a percentage of poor calls for a relevant trailing period.

Report 2—Line graph: for the relevant trailing period, shows the percentage of Poor Calls for P-U, P-E, P-C. For example, if looking at training for the last 12 months, then this will show the scores in that period. An example of this line graph is shown in FIG. 3.

Top/Specific Problems Dashboard:

The viewer is interested in knowing the biggest problem areas that require more investigation across all possible areas. In this case, the viewer does not want to browse all possible areas, but instead to be quickly directed to specific areas to focus on (e.g., when a lot of users are using VPN). Or, the viewer has a specific theory or potential problem that they wish to investigate. For example, a lot of users in a certain geography are complaining about poor voice quality, but no root cause is known. In this case, the viewer wishes to see all information about that specific geography, including all call classifications, and then carry out further investigations to identify what is common to the complaining users.

A top/specific problems dashboard can use call classification as a first level of the hierarchy that can be broken down by geography, or can use geography as a first level of the hierarchy that can be broken down by call classification. A top/specific problems dashboard also can use site/subnet mapping, which can then be broken down by call classification.

Call Classification Breakdown Dashboard (Top/Specific Problems):

Using this dashboard will allow an organization to select a date range that is appropriate and see information associated with the call classifications as the most important grouping. This allows the organization to theorize that, for example, users are using wireless too much, and then find out which geography or geographies of users are using wireless too much. In addition, to save the viewer from having to drill down into all possible combinations of call classification and geography, a report can show the top call classification/geographies that have the worst poor call percentage.

A call classification breakdown dashboard can provide the following filters and reports:

Filter 1—Trailing Period (e.g., 7 days, 6 weeks, 12 weeks, 6 months, 12 months)—by default, this can be 12 weeks;

Filter 2—Geography hierarchy;

Report 1—Top Problems (worst percentage of total poor calls) broken down by geography, examples of which are shown in Tables 3 and 4, below:

TABLE 3

Top Problems (worst percentage of total poor calls) by geography

| Geography | % Poor Audio Calls | Poor Call Threshold | Poor Quality Calls | Total Audio Calls |
|---|---|---|---|---|
| Singapore | 1.38% | 2.00% | 184 | 8972 |
| Adelaide | 0.76% | 0.10% | 115 | 7182 |
| New York | 0.39% | 1.40% | 38 | 1428 |
| Barcelona | 0.23% | 0.50% | 31 | 362 |

TABLE 4

Top Problems by geography, including same-site calls and inter-site calls

| Geography | % Poor Audio Calls | Poor Call Threshold | Poor Quality Calls | Total Audio Calls |
|---|---|---|---|---|
| Singapore | 1.38% | 2.00% | 184 | 8972 |
| Adelaide <−> New Zealand | 0.76% | 2.00% | 115 | 7182 |
| Singapore <−> Beijing | 0.39% | 2.00% | 38 | 1428 |
| Barcelona | 0.23% | 2.00% | 31 | 362 |

Report 2—Top Problems (worst percentage of poor calls for all calls within the User call classification) broken down by geography;

Report 3—Top Problems (worst percentage of poor calls for all calls within the Corporate call classification) broken down by geography;

Report 4—Top Problems (worst percentage of poor calls for all calls within the External call classification) broken down by geography; and Report 5—Specific Problems Table, which has the following columns for the trailing period:
   Column 1: Expandable call classification hierarchy (e.g. All, External/User/Corporate, User-Internal/Wireless, etc.);
   Column 2: Expandable geography hierarchy (e.g., Global, Region, Country, Office); and
   Column N+: Breakdown of both % Poor Audio Calls from total, and % Poor Audio Calls distribution.

A user can drill down into a specific period (e.g., if a user looks at a specific week and wants to see per day or per hour for that week).

Reports can be formatted for viewing in a variety of ways. For example, Reports 1-4 above can be presented side by side, with each report in a table format similar to the example table for Report 1 provided in Table 3, above, or in some other layout, to give a user a convenient view of the reported information (e.g., top problems).

Reports can include a significant amount of detail; the detail that is actually presented can depend on factors such as an administrator's preferences. FIG. 4 shows an example of a detailed report titled "Poor Calls Network Breakdown." The report in FIG. 4 shows network and geography information along with percentages of poor audio calls, by month. The shaded cells or data points in FIG. 4 are highlighted to indicate (e.g., to an administrator) that poor call thresholds have been exceeded.

From these reports, it will be possible to select a specific cell in a table and navigate to a Call Summary Report.

Geography Breakdown Dashboard (Top/Specific Problems):

Using this dashboard will allow an organization to select a date range that is appropriate and see information associated with the geography hierarchy as the most important grouping. This allows the organization to theorize that, for example, a geography of users is having a significant problem and drill down into the call classifications to see if this problem is consistent across all call types or for a specific type of call. In addition, to save the viewer from having to drill down into all possible combinations of geography and call classification, a report can show the top geographies/call classification that have the worst poor call percentage.

A Geography Breakdown dashboard can provide the following filters and reports:

Filter 1—Trailing Period (e.g., 7 days, 6 weeks, 12 weeks, 6 months, 12 months)—by default, this can be 12 weeks;

Filter 2—Call Classification hierarchy;

Report 1—Top Problems (worst percentage of total poor calls) broken down by call classification with geography information, an example of which is shown in Table 5, below:

TABLE 5

Top Problems by call classification, with geography information

| Classification | % Poor Audio Calls from Total (of Geography) | Threshold | % Poor Audio Calls Distribution (all Geographies) | Poor Audio Calls | Audio Calls |
|---|---|---|---|---|---|
| Wireless/Internal—Singapore | 1.38% | 2.00% | 15% | 184 | 8972 |
| Wireless/Internal—Munich | 0.76% | 0.10% | 10% | 115 | 7182 |
| VPN—Singapore | 0.39% | 1.40% | 5% | 38 | 1428 |

Report 2—Specific Problems Table, which has the following columns for the trailing period:
  Column 1: Expandable geography hierarchy (e.g., Global, Region, Country, Office);
  Column 2: Expandable call classification hierarchy (e.g. All, External/User/Corporate, User-Internal/Wireless, etc.); and
  Column N+: Breakdown of both % Poor Audio Calls from total, and % Poor Audio Calls distribution.

A customer can drill down into a specific period (e.g., if a user looks at a specific week and wants to see per day or per hour for that week).

Reports can include a significant amount of detail; the detail that is actually presented can depend on factors such as an administrator's preferences. FIG. 5 shows an example of a detailed report titled "Poor Calls Geography Breakdown." The report in FIG. 5 shows network and geography information along with percentages of poor audio calls, by month. The shaded cells or data points in FIG. 5 are highlighted to indicate (e.g., to an administrator) that poor call thresholds have been exceeded.

From these reports, it will be possible to select a specific cell in a table and navigate to a Call Summary Report or a Call Breakdown Report, as explained in further detail below.

Call Breakdown Report (Top/Specific Problems):

When a number of calls within a call classification/geography pairing is large, it can be difficult for the viewer to scan a list of calls and identify what may be a common problem. For example, there could be an extremely large number of users with occasional PC-to-PC issues, or a concentrated set of users who are having a large number of failures. Therefore, a call breakdown report can be useful for highlighting some of the likely common issues to investigate.

A Call Breakdown Report can provide the following filters and reports:

Filter 1—Start Date & End Date;

Filter 2—Geography Hierarchy;

Filter 3—Call Classification Hierarchy;

Report 1—Top X users: top X users who have the most poor calls, including the % Poor Audio Calls from Total, % Poor Audio Calls Distribution, and the relevant thresholds and call counts (see Table 6, below):

TABLE 6

Top Users (worst percentage of total poor calls)

| User | % Poor Audio Calls from Total | % Poor Audio Calls Distribution | Threshold | Poor Audio Calls | Audio Calls |
|---|---|---|---|---|---|
| User1 | 1.38% | 30% | 2.00% | 184 | 8972 |
| User2 | 0.76% | 20% | 0.10% | 115 | 7182 |
| User3 | 0.39% | 10% | 1.40% | 38 | 1428 |
| User4 | 0.23% | 10% | 0.50% | 31 | 362 |

Report 2—Top X infrastructure components: top X infrastructure components that are used within the calls and have the most poor calls, including % Poor Calls, % Total Poor Calls, and the relevant thresholds and call counts (similar to the user table shown in Table 6, above, with Infrastructure components in the first column);

Report 3—Counts: see example in Table 7, below:
  Total number of users that are impacted and having a poor call;
  % of users that are impacted;
  Total number of infrastructure components that are impacted and having a poor call;
  % of infrastructure components impacted;

TABLE 7

Overall Impact report

| Overall | # impacted | % of total impacted |
|---|---|---|
| Users | 100 | 25% |
| Infrastructure | 8 | 75% |

Report 4—Voice Quality Metrics: see example in Table 8, below:
  Average QoE Information across all calls (NMOS, Jitter, Latency, Packet Loss); and
  QoE Information across Top 10% of calls (NMOS, Jitter, Latency, Packet Loss).

TABLE 8

Voice Quality Metrics report

| Metric | NMOS Degradation | Jitter | Packet Loss | Latency |
|---|---|---|---|---|
| Average | 0.5 | 0.3% | 184 | 8972 |
| Top 10% | 1.6 | 0.4% | 115 | 7182 |

From each of these reports it will be possible to select a specific cell and navigate to the "Call Summary Report" which will show the calls associated with that metric.

Call Summary Report (Top/Specific Problems):

This report includes a table which displays a summary of all the poor calls that occurred within certain period.

A Call Summary Report can provide the following filters and reports:

Filter 1—Trailing Period (e.g., 7 days, 6 weeks, 12 weeks, 6 months, 12 months)—by default, this can be 12 weeks;

Filter 2—Organization hierarchy (e.g., Global, Region, Country, Office);

Filter 3—Network hierarchy (e.g., All, P-E/P-U/P-C, P-U-Internal/Wireless, etc.);

Filter 4—Type of call (e.g., All, MCU, GW, P2P); and

Report 1—shows all poor calls in sortable columns, such as: To (Callee), From (Caller), Organization info (Region/Country/Office), Caller/Callee Call Classification Hierarchy (e.g., geography, network), Type of call, Start Date/Time, Duration (mins/secs), NMOS Score, NMOS Degradation, Packet Loss, Jitter, Latency, Mediation Server (if applicable), Gateway (if applicable), MCU (if applicable), Edge Server (if applicable); an example of such a table is shown in FIG. 6.

From this report it is possible to select a call (e.g., by selecting a row in the table), and go to a call detail report.

Example 6: Analysis of Calls Using Correlations/Patterns

In this example, enterprise calls are analyzed based on simultaneous events or conditions within an environment (e.g., user's environment, user's network/site, enterprise environment) and heuristics are utilized to establish correlation or cause-effect information for various call conditions and scenarios. For example, poor quality calls may be correlated with a user adding video and application sharing while on a low bandwidth connection.

Example 7: Real-Time User Notification of Call Quality and Reliability Issues

In this example, features are described that facilitate proactively notifying users of conditions impacting call quality and reliability via instant messaging or other messaging channels (such as e-mail). Users are notified based on the configurable metrics/parameters (which can be tuned by system administrators) and provided with information mined from call detail and voice quality records. This information is used to provide feedback to the user (e.g., feedback relating to call conditions, as well as other remediation recommendations). A channel for users to provide feedback to operations teams is provided. Operational teams can be alerted to issues relating to specific user groups (e.g., executive users).

For example, a real-time user notification service can monitor QoE servers or a UC data manager database and run a query periodically. Based on the result of the query, the service notifies end users. Both the notification message and the channel (e.g., IM, e-mail) can be configured.

The screen shot in FIG. 7 shows a user interface for accessing responses to a survey relating to voice quality. The surveys themselves can be conducted using techniques and tools described in detail below.

In the example shown in FIG. 7, survey responses associated with specific users are shown in a table. Each row in the table includes a user ID (e.g., e-mail address), user comments, the user's overall voice quality rating (e.g., Very Satisfied, Somewhat Satisfied, Somewhat Dissatisfied, Very Dissatisfied, etc.), and a numeric QoE rating. The numeric QoE rating is calculated based on QoE data for the user during a survey time interval. The user interface allows clicking on the user ID to view additional information, such as per-user metrics (e.g., poor calls, QoE aggregate scores) compared against enterprise and/or industry benchmarks. The user interface also allows selection of results corresponding to different surveys, which can be identified, for example, by the date on which the survey was conducted. The user interface also provides information on how many comments a particular survey has generated. The user interface includes functionality for graphing, commenting on, searching, and exporting information. The user interface can be used for multiple organizations or companies, as shown in the "Select Company" drop-down box. The user interface can include features for securely viewing such information (see the "Log Out" and "Change Password" links). The user interface can be presented in a Web browser or as part of a dedicated, custom application.

Figure 8:
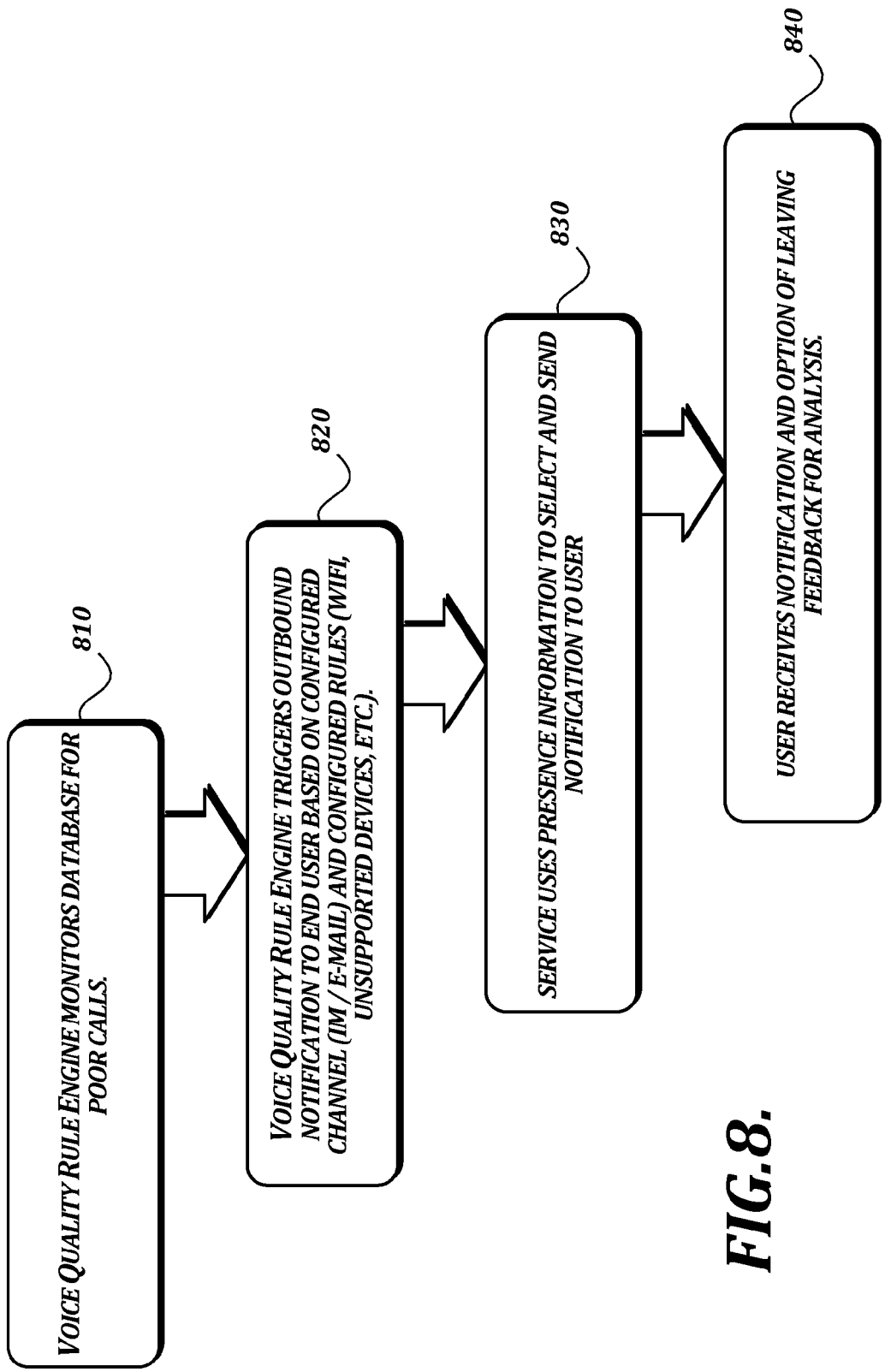
FIG. 8 is a flow chart that shows how targeted notifications and user feedback can be used to improve overall voice quality.

FIG. 8 is a flow chart that shows how targeted notifications and user feedback can be used to improve overall voice quality. The decision whether to send targeted notifications also can be based on a user's situation or a usage scenario. For example, a rules engine can detect if the user making a call was on Wifi and/or using unsupported devices, which can affect call quality. The notification can be tailored to be appropriate to the situation. This results in a more accurate communication outreach and actionable results. An operations team can maintain a record of users who have been contacted (or "pinged") to limit the possibility that users will become annoyed or overwhelmed with information, while also allowing the team to determine if a follow-up message might be helpful.

Call quality metrics are stored in databases (e.g., QoE and/or CDR databases). In the example shown in FIG. 8, in step 810 a voice quality rule engine monitors a database (e.g., a QoE database) for poor calls. In step 820, the voice quality rule engine triggers an outbound notification to an end user via a predetermined channel (e.g., IM, e-mail), in accordance with rules that apply to the conditions of a communication in which the user participated (e.g., rules related to WiFi communications, rules related to communications using unsupported devices, etc.). In step 830, the triggered outbound notification is handled by a message generation component of a service that uses presence information to determine whether use IM or e-mail for delivering the notification. For example, if a user is detected to be online and available, the component can send an IM. As another example, if the user is detected to be unavailable (e.g., offline, or online but busy), the component can send an e-mail. In step 840, the user receiving the notification is given the option (e.g., via a link in the notification) to provide feedback for analysis.

Figure 9:
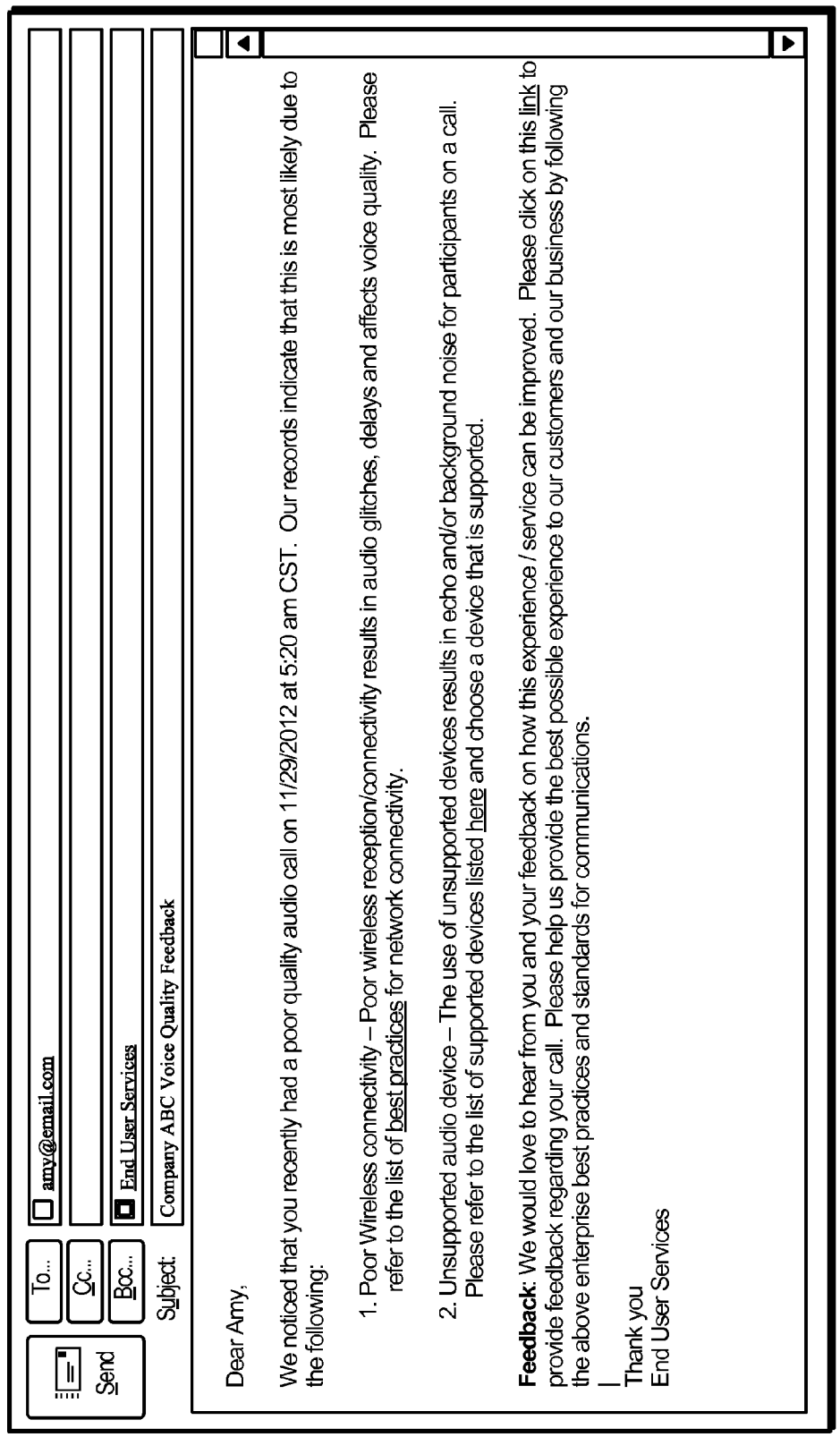
FIG. 9 is a screenshot of an e-mail generated by a message generation component.

FIG. 9 is a screenshot of an e-mail generated by a message generation component. The "To:" field of the e-mail includes a white indicator graphic next to the user's e-mail address that provides presence information. In this example, the white color of the graphic indicates that the user is offline. The "Bcc:" field includes a green indicator graphic that indicates that "End User Services" is online and available. (The green color is not shown in FIG. 9.) The text of the e-mail confirms that a call in which the user participated had poor voice quality, and suggests possible causes (poor wireless connectivity, unsupported audio device) of the poor voice quality. The e-mail provides underlined links (see items numbered "1." and "2." in the text of the e-mail message in FIG. 9) to help the addressee avoid similar problems in the future. The e-mail also requests feedback and provides an underlined link in the "Feedback" section of the e-mail for this purpose.

Figure 10:
FIG. 10 is a screenshot of an instant message (IM) generated by a message generation component.

FIG. 10 is a screenshot of an instant message (IM) generated by a message generation component. A green indicator graphic indicates that "Survey Bot" is online and available. (The green color is replaced with dark shading in FIG. 10.) The text of the IM confirms that a call in which the user participated had poor voice quality, and suggests possible causes (poor wireless connectivity, unsupported audio device) of the poor voice quality. The IM also requests feedback and provides a link (underlined in the "Feedback" section of the IM) for this purpose.

Example 8: Per-User Metrics, Voice Quality Metrics, and Scorecard with Benchmarking In this example, features are described that provide a per-user "score" for enterprise communications using an algorithm to compute a single score that takes into account the user's communication activity (based on various parameters and metrics), and that allow for benchmarking against a "peer group."

Figure 11:
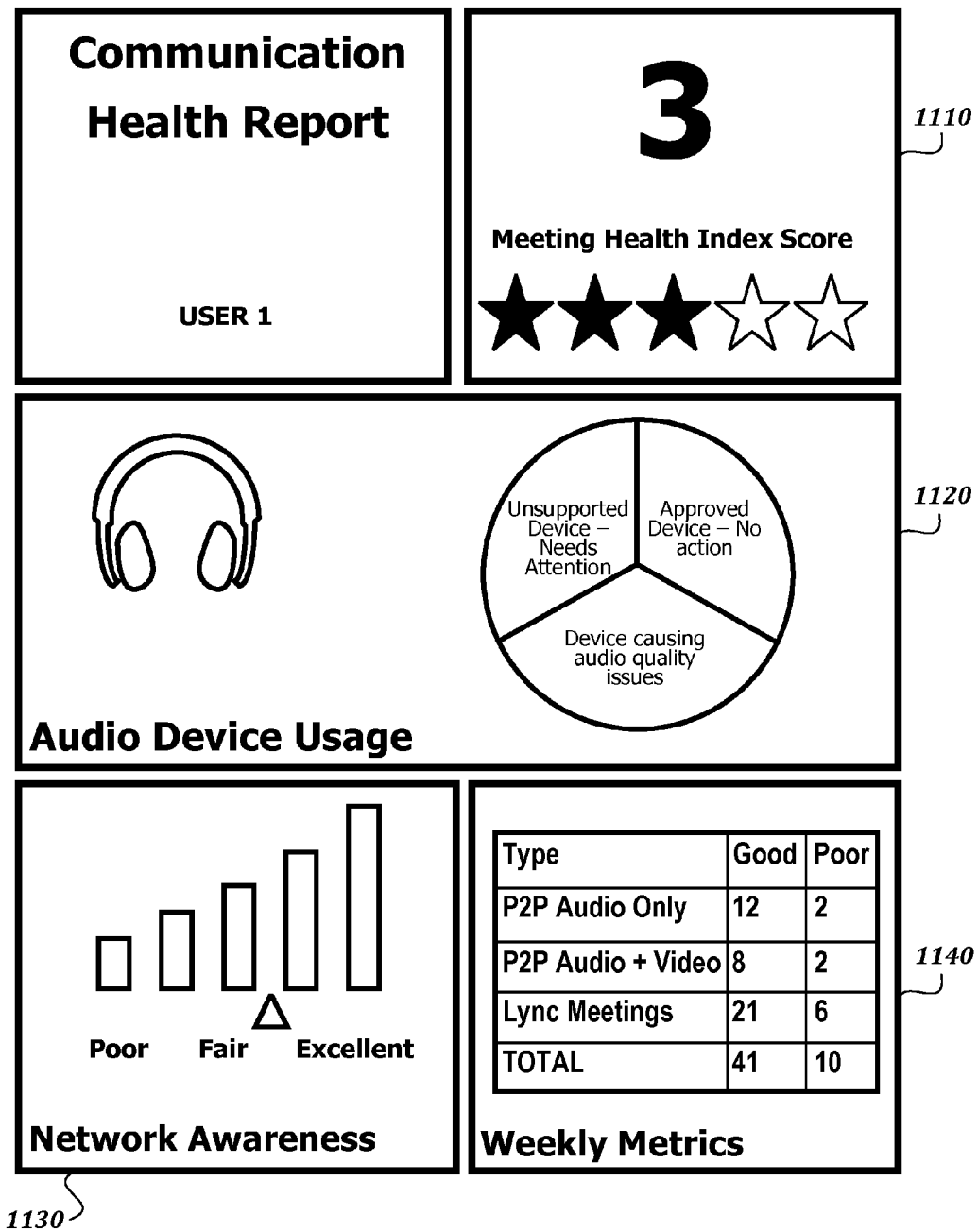
FIG. 11 is a screen shot of a main landing page titled "Communication Health Report" for a user.

FIG. 11 is a screen shot of a main landing page ("Communication Health Report") for a user ("User 1"). The main landing page also can include UC system availability, a user's open feedback items (e.g., if the user is connected to the UC system), and other messages about UC, such as training opportunities for offered UC services. The various elements shown in FIG. 11 are only examples. The elements shown in FIG. 11 can be arranged in different ways. Further, individual elements shown in FIG. 11 can be omitted, supplemented with additional elements, and/or replaced with different elements showing different information.

FIG. 11 shows a meeting health index score tile 1110. A user's meeting health index score is a composite score that includes the type of network being used when the user is communicating, the audio device being used (e.g., headset, handset, microphone, external speakers) as well as the network and device behaviors of those who participate in meetings or calls with the user. As shown, the maximum score is five stars, and the user's score for the time period (e.g., a week) is three stars. An average score (e.g., for other users within the user's organization) also can be provided to the user, but is omitted from FIG. 11. In one example scenario, the user can compare the user's individual score with the average score to get a better idea of how the user's meeting health index compares to the user's peers.

FIG. 11 also shows an audio device usage tile 1120. This tile includes a pie chart in which the fraction of calls that use approved devices and unsupported devices are shown, along with the fraction of calls in which the device being used actually caused audio quality issues.

FIG. 11 also shows a network awareness tile 1130, which can be used to rate the user's overall network usage (e.g., "poor," "fair," or "excellent") based on, for example, how often the user is participating in calls over communication channels (e.g., wireless channels) that tend to have lower voice quality.

FIG. 11 also shows a weekly metrics tile 1140 that includes counts of "good" and "poor" quality calls of different types. Alternatively, this tile can display different metrics and/or metrics for different time periods (e.g., monthly).

Example 9: Cost Saving Reports

In this example, features are described that provide a travel cost model for estimating travel cost savings based on an increase in web conferencing/online meetings. Conference travel and lost opportunity cost savings are determined based on a calculation of what the estimated cost would have been for each enterprise participant for on-site conference attendance. The model assumes that the location of the conference is the Organizer's location.

In particular, the UC data management system uses user geography information (e.g., region, country, state, and/or city) combined with a configurable travel probability matrix and associated travel and lost opportunity costs to determine cost savings. The probability of the user traveling to the physical meeting location is based on the conference attendee count and the duration of the conference, as shown in Table 9, below:

TABLE 9 probability of user traveling to a physical meeting location.

| Attendee Count Min | Attendee Count Max | % Probability based on Conference Duration | | | | |
|---|---|---|---|---|---|---|
| | | <=30 Min | <=1 Hour | <=2 Hours | <=4 Hours | >4 Hours |
| 1 | 3 | 2.0 | 2.0 | 5.0 | 20.0 | 30.0 |
| 4 | 5 | 2.0 | 3.0 | 6.0 | 25.0 | 40.0 |
| 6 | 9 | 3.0 | 4.0 | 8.0 | 30.0 | 50.0 |
| 10 | 24 | 3.0 | 6.0 | 12.0 | 37.0 | 60.0 |
| 25 | 999 | 3.0 | 9.0 | 14.0 | 40.0 | 65.0 |

An associated hourly travel and opportunity cost can be calculated based on a geographical difference (e.g., inter-region, inter-country) between the physical meeting location (which may be assumed to be the organizer's location) and the participant's location. For example, if a user in the United Kingdom is invited to a meeting in North America, the geographical difference is "inter-region," whereas if the meeting is in France, the geographical difference is "inter-country." These classifications can be adjusted, such as when a user is located in an isolated area of a large country, and inter-city travel is more expensive than for a user near a population center of a small country. Example calculations are shown in Table 10, below. The actual costs reflected in Table 10 can be adjusted. For example, costs may be increased over time as average travel costs increase. As another example, the opportunity cost of attending a meeting for a high-level executive may be significantly greater than the opportunity cost for the executive's assistant.

TABLE 10

Hourly travel and opportunity cost.

| Geographical Difference | Lost Opportunity Cost Per Hour ($US) | Travel Cost Per Hour ($US) |
|---|---|---|
| Inter-Region | 78.00 | 143.00 |
| Inter-Country | 58.00 | 96.00 |
| Inter-City | 45.00 | 50.00 |
| Inter-Building | 30.00 | 4.00 |
| Same Building | 0.00 | 0.00 |
| Dial-In/Enterprise | 0.00 | 0.00 |
| No Cost | 0.00 | 0.00 |
| Enterprise/Unknown | 45.00 | 50.00 |

Example 10: Intelligent Data Obfuscation for Protecting Privacy

In this example, a method is described for obfuscation and removal of PII (personally identifiable information) on call detail records in a configurable approach that protects privacy information but still allows for data analysis and insights.

In at least one embodiment, data obfuscation applies to all calls associated with a gateway (assumed to be PSTN calls), and the piece of data obfuscated is phone numbers. The UC data management system allows an enterprise to determine when to obfuscate data (e.g., when data is imported, or a given number of days after the call occurred). The format of the obfuscation can be, for example, as follows: +14253334444→+1425*******, where numerals represent numbers in a phone number, and * represents an obfuscated digit. The number of digits to obfuscate (e.g., by converting to *) is configurable. In the example above, a few leading digits are retained, allowing an enterprise to be able to report and group calls (e.g., by area code or zone). The UC data management system also can allow an enterprise to exclude specific phone numbers or groups of phone numbers from getting obfuscated.

B. Enhanced Monitoring for UC Services

In this section, a monitoring service is described that can help an enterprise understand how UC infrastructure is performing from an end user perspective. When described techniques and tools are used with a UC platform, the enterprise can gain the benefit of improved communications experience within and outside the enterprise by using a wide range of modalities and capabilities that were not available previously using dedicated legacy systems (such as a PBX).

UC platforms allow users to communicate over internal networks (e.g., corporate networks) and external networks (e.g., the Internet). This opens communication capabilities not only to users available at their desks, but also to users who are on the road, and even to users from different organizations. With such solutions, end users are freed from limitations of previous forms of communication, which can result in quicker and more efficient business processes and decision making.

However, the quality of communications in such platforms can be affected by a variety of problems, including software failures, hardware failures, configuration problems (e.g., system-wide or within components (e.g., firewalls, load balancers)), and network performance problems. The potential impacts of these and other problems include immediate impact upon end users (both internal and roaming) and inefficient use of functionality that increases overall costs.

Although there are some fixed costs associated with resolving an issue, there are some variable costs that can be reduced to help address the overall impact. One example of a variable cost is the time it takes for an issue to be reported and the time it takes to diagnose the problem. For example, a user may not report an issue immediately for a variety of reasons (e.g., the user may not realize that the issue is something that should be reported, may not be able to report the issue immediately, or may not know who to report to).

Another example of a variable cost is the time it takes to diagnose and resolve the problem after an issue has been reported. In some cases, such as hardware failure, it is simple to identify the root cause. In other cases, it can be difficult to diagnose the root cause of an issue, for a variety of reasons. For example, the individual carrying out the diagnosis may only have information that they receive from an end user, and such information may not be accurate, reliable, or actionable.

Another example of a variable cost is the time it takes to verify that an issue has been resolved. Issues may only exhibit themselves to individuals who are in a specific environment (e.g., connecting via the Internet), and it may not be possible for the individual that is attempting to resolve the issue to immediately verify whether a particular action has successfully resolved the issue.

Reducing variable costs can result in significant cost savings, and improving upon the processes (e.g., problem diagnosis) that can lead to increases in variable costs also can improve overall quality and user satisfaction. Accordingly, a dynamic monitoring service can add significant value to an organization.

Detailed Overview of an Example Monitoring Service

A monitoring service as described herein can include one or more of the features described with reference to Examples 11-15 below. More generally, a UC system with a comprehensive monitoring service can provide the following functionality:

automatic, regular verification of system functionality;

alerting individuals designated for resolving identified issues based on factors such as issue type, time of day, etc.;

providing detailed information on the issue, including logs, traces and details of the experience an end user would see;

providing a mechanism to automatically retry the problematic scenario and verify that the issue is resolved; and continued monitoring of the rest of the UC environment while the fault is being fixed, to reduce the chance of further problems.

Previous monitoring services have suffered from several drawbacks, including the need to deploy tools on a dedicated server, with associated deployment and maintenance costs; ability to detect only issues in the specific location the tools deployed, requiring the tools to be deployed in multiple locations; dependence on components such as Web reverse proxies and firewalls; and the inability of diagnosis and resolution tools to improve over time in a way that can be used by the customer directly.

The following scenario illustrates how a monitoring service can be used effectively.

Alice, a consultant working for ABC Consultants, is visiting a potential client. During negotiations, Alice realizes she needs Bob to help answer some questions and close the deal. Alice attempts to start a call with Bob using her laptop. Unfortunately, the call fails. After repeated attempts, Alice is able to connect, but the audio quality prevents any meaningful discussion with Bob. Alice is not able to close the deal in a timely manner. Later, Alice decides to report the issue, but she has to wait until she returns to the office, where she is able to look up the relevant administrator (Charlie) and report the issue.

Charlie asks Alice for as many details as possible. However, Alice did not have logging enabled on her laptop and is not possible to provide logs. Also, Alice is now able to make calls to Bob without any issues, and is not able to reproduce the problem. Charlie spends significant time to attempt to determine the root cause. During this time, Charlie receives calls from other users reporting similar problems. After a significant amount of time, and repeated trial and error, Charlie believes the problem is caused by a firewall configuration issue. Charlie makes the required update to address this configuration change, but has no reliable mechanism to verify that the update will address the issue seen by Alice and others.

Later, ABC Consultations decides to implement a monitoring service, as described herein. While Charlie is carrying out his normal tasks for the day, he receives an alert stating that the monitoring service has detected an issue which is causing calls to fail. Quickly reviewing the alert details, Charlie determines that this is a significant issue that requires immediate attention. He immediately returns to his desk where he checks his e-mail which shows he has received an e-mail alert containing the following information:

- the extent of end user impact across the enterprise;
- an indication that the fault is limited to audio connections and that IM conversations are working normally;
- logs that allow him to see both detailed and high-level information and compare this information to "last known good" information such as transaction time;
- a list of potential causes of the issue based on historical data, including number of times this issue has been discovered; and
- a link which allows him to utilize the service to replicate the failure that was previously detected.

Using the information that is made available within this e-mail, Charlie is able to diagnose the root cause quickly. After making the required update to the firewall configuration, Charlie is able to utilize the appropriate link within the e-mail to retry the problematic scenario and verify the fix. Once verified, Charlie visits a service portal and enters details of the root cause to help identify solutions for future similar issues, thereby adding to the knowledge base of the enterprise around this specific issue. Charlie is able to tell users that the issue had been identified previously and has been resolved.

Charlie works with the firewall administrator to ensure that the monitoring service is used to verify that firewall changes have not accidentally caused any new issues. By using this "run now" mechanism, unintended impacts can be identified immediately and not cascade into a lengthy outage for end users.

Depending on implementation, the monitoring service can be used monitor a variety communications, including one or more of the following:

- login to the UC infrastructure;
- set the users presence, and obtain presence for the users contacts;
- send and receive internal IMs;
- start and receive incoming P2P audio calls, with audio of acceptable quality;
- schedule/invite users to/join a conference, with audio of acceptable quality;
- send and receive conference data, such as shared whiteboards and application data;
- manage conference participants;
- dial and connect to standard telephones at various locations, with acceptable quality;
- receive calls from standard telephones various locations, with acceptable quality;
- forward and receive calls by unified messaging service, with acceptable quality;
- receive voicemail from roaming users, federated users, or standard telephone users;
- set local presence and receive presence information from an external IM service;
- send and receive IM via an external IM service;
- set local presence and receive presence information from a federated contact;
- send IMs to and receive IMs from a federated contact;
- join and participate in conference as an anonymous user, with acceptable quality;
- receive calls (including from RGS numbers) at standard telephones, with acceptable quality (RGS (Response Group Service) is an Automatic Call Distributor (ACD) feature of Microsoft Lync Server, and is similar to a small helpdesk application or reception desk capability, where customers, as an example, call the company number, are prompted for which department they wish to talk to, and are routed to a company employee in that department or receive a basic message if the call is occurring when no one is available (e.g., after business hours);
- call from standard telephones (including calling unassigned numbers, and receiving associated announcements);
- check for and download software updates at client devices;
- download client software for participating in meetings;
- park and retrieve calls;
- access Web-based services; and
- join group chats, send and receive group chat information, participate in group chat across federated boundaries.

A monitoring service can be deployed externally (outside an organization's network) or internally (on a server inside an organization's network). Although an external service that supports the end user scenarios described above is likely to discover many issues that are impacting internal end users, other cases may not be detected. To address these situations, an enterprise can deploy an internal monitoring service on a server inside the corporate network. This internal server could synch with an external monitoring service, which can reduce setup and maintenance costs, and have one location at which to configure settings and receive alerts and reports.

Having a monitoring service on an internal server can have additional advantages. For example, the ability to actually detect if gateways are up and running, even if load balanced, can only be carried out completely with an internal server. In addition, being able to completely inspect configuration information and/or access logs can only be carried out with internal servers.

In addition to handing end user scenarios that apply for roaming users and internal users, examples of validation that can be carried out using an internal server include the following:

- inspecting deployment configuration information and looking for anomalies (e.g., immediate impacts or minor impacts that grow over time);
- inspecting CDRs for potential trends and issues;
- inspecting a QoE database for potential trends and issues;
- validating the range and number of gateways that are available and working correctly; and
- validating version information of gateway firmware and providing alerts to an administrator if versions are out of date and need to be patched.

Stress Testing:

One of the key issues for an organization is determining how many users the system can handle. The monitoring service can provide administrators with the ability to not only test specific modalities, but to utilize a mix of these modalities and stress test the environment.

Table 11, below, includes a list of features that can be included in a monitoring service. Depending on implementation, a monitoring service may include more features, fewer features, or features that differ from those that are listed in Table 11.

TABLE 11

Example monitoring service features

| Feature | Description |
|---|---|
| Web Experience | This is a web site that an admin can visit. On this site, the admin can learn about the service, see tutorials, etc., and sign up for the service. When signing up, the admin can create an account (including billing information), and specify details about the end user services required. |
| Service Configuration | Once an admin has signed up, and periodically throughout the lifetime of utilizing the service, the admin can specify details about their deployment, which is stored in a secure manner. This specification can occur in several ways, e.g.: Admin utilizes the web experience of the service to view and modify details about their deployment. Admin utilizes a tool that when used in their deployment auto-matically detects changes, and provides these to the service. In addition to specifying details about the admin's deployment, the admin can also configure details such as the following: Determine end user services and identities within the enterprise that are to be used (e.g., validate the IM user experience using two identities—service1 and service2, which are deployed on two different pools). Determine frequency of end user experience verification (e.g. every 5 minutes). Determine what thresholds are acceptable to the deployment (e.g., acceptable for a single IM to fail, but not when 5 fail in an hour). Provide prioritized list of who should be alerted, and how, when an issue has been discovered. Inform the service when it is expected that issues should occur. For example, when a server is being patched (maintenance mode), then it is likely that more issues will arise. Make configuration changes and carry out test for each of the available end user experiences, in order to ensure that the configuration specified is accurate, and to allow the admin to verify any deployment changes and validate any issue resolutions. |
| Alerting Mechanism | Make alerts available using current mechanisms that the admin may utilize (such as SCOM, Tivoli and Openview). Provide a web portal view of the service alerts. Allow admin to be notified via other modalities, such as SMS, IM, e-mail, or interactive voice response (IVR) alerts. Confirm receipt of alerts, and if not confirmed, send alerts to a secondary set of recipients. Provide an incident log portal (identified by a unique ID in an alert), which provides more detailed view of the incident, including a summary of the issue, details of the logs, potential causes, and any previous solutions associated with that specific deployment. Provide access to community resources (e.g., FAQs, channels for real-time communication between multiple admins). Allow admin to re-try the problematic service and verify a fix. |
| Reporting | Report metrics per end user service. Report metrics for specific geographies. Report metrics for a specific SIP URI. Report on effects/costs of outages. Compare deployment-specific information to an anonymized report from other enterprises. Export relevant data reports and integrate into other enterprise-specific reports. |

The following examples illustrate some of the key features relating to the techniques and tools described herein for enhanced monitoring of performance of UC services.

Example 11: Cloud-Based Monitoring for Communication Service Availability

Cloud-hosted mechanisms are described for simulating end user real time communications to assess communication service availability or conditions. Resolution mechanisms for specific problems also are described.

Figure 12:
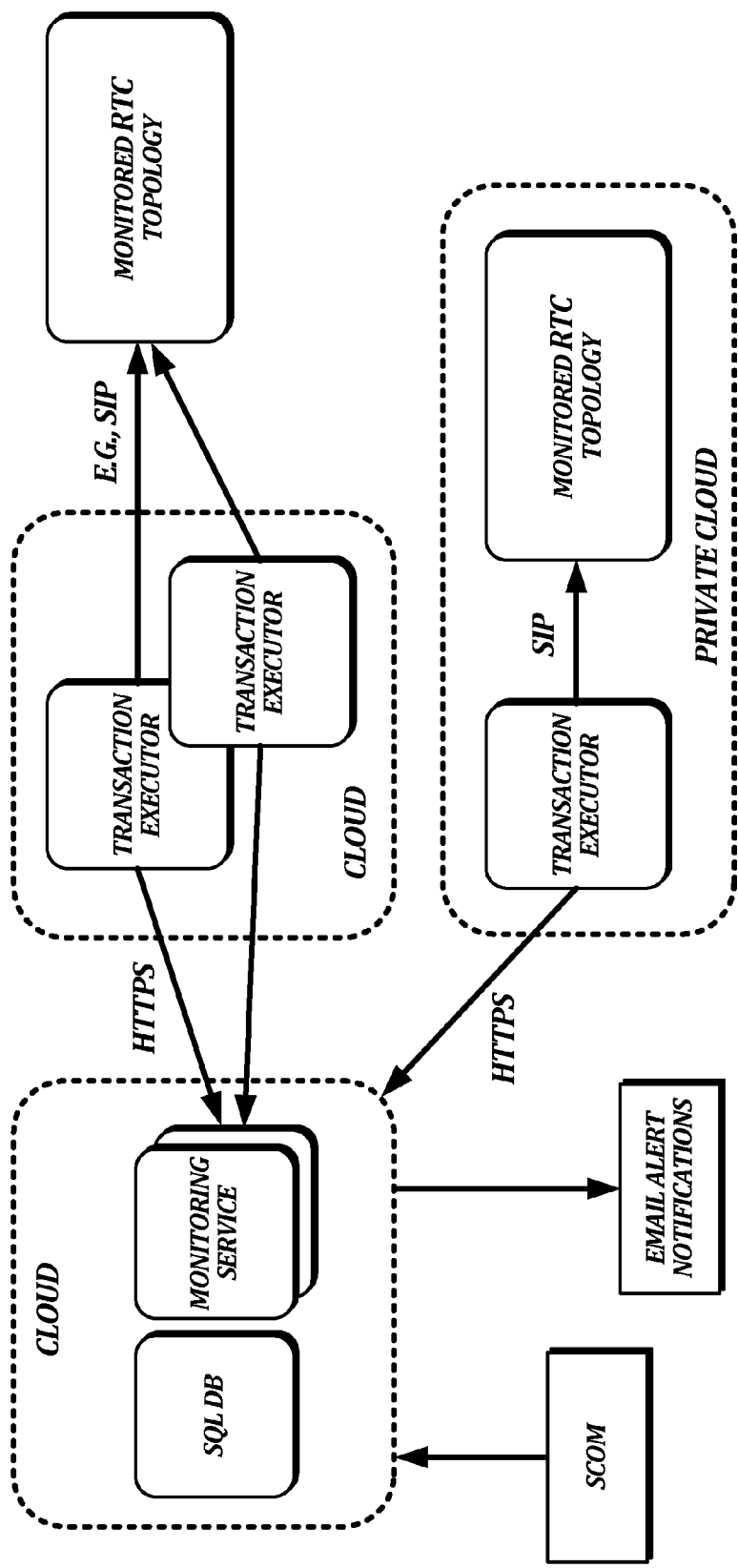
FIG. 12 illustrates a distributed real-time communications (RTC) monitoring system comprising a monitoring service, a cloud database, and transaction executors (agents)

In this example (illustrated in FIG. 12) a distributed real-time communications (RTC) monitoring system comprises a monitoring service, a cloud database (e.g., a SQL database), and transaction executors (agents). The system illustrated in FIG. 12 is highly scalable; there is no limitation on the number of monitoring service instances or the number of agents to be deployed. Agents can be deployed in various geographical locations (e.g. EMEA (Europe/Middle East/Africa), North America, APAC (Asia-Pacific)) so that real-life communication scenarios of a global organization can be appropriately represented. More agents can be deployed in a private cloud (illustrated in FIG. 12) of the organization and leverage additional synergies with their-real time communications system. The various components shown in FIG. 12 can communicate securely with one another (e.g., via HTTPS).

Each agent executes tasks (known as synthetic transactions) which mimic RTC end user behavior (e.g., conference dial-in). Synthetic transaction results are processed by the monitoring service and stored in the cloud database, and appropriate alerts are raised in case of failures. Alerts can include not only diagnostics related information, but also potential root causes and resolution steps, which are extracted from the knowledge base based on historical results.

Example 12: Algorithm for Distributing Tasks Among Geo-Distributed Agents

In this example, a scheduling algorithm is described that takes a rule schedule (e.g., rule every 15 minutes), puts it in a queue, and assigns it to an agent (also referred to as a transaction executor or TxExecutor) for execution, while considering associated load balancing and resource utilization patterns.

In at least one embodiment, to solve the task distribution problem a scheduling mechanism is configured to:
 periodically generate tasks at the defined intervals;
 make tasks available for geo-distributed agents;
 stay resilient to increased\decreased numbers of agents;
 balance workload between agents; and
 ensure parallel-executed RTC scenarios are not affecting each other or final results.

Conceptually, task scheduling and distribution can be broken into three parts (task scheduling, task distribution, and load balancing), which are discussed below in more detail:

a. Task Scheduling

In this example, the monitoring service generates tasks based on a rule definition (task template). Each task defines an end user RTC scenario executed in a specified geographical location. Tasks are generated periodically for each rule, with a defined scheduling interval (e.g., every N minutes). Newly generated tasks are added to a task queue.

b. Task Distribution

In this example, each agent is deployed in a particular geographical location in the cloud and is responsible for simulating end users in that region. After an agent is started, it executes a REGISTER operation and sends its configuration to the monitoring service. The configuration includes agent characteristics (e.g., deployment location) and capabilities (e.g., ability to execute certain tasks, maximum number of tasks to run in parallel, etc.). In response, the monitoring service sends a unique agent ID. The agent is then considered to be registered and can start executing tasks. The registered agent regularly polls the monitoring service for new tasks. The monitoring service, based on the agent's unique ID, looks up its characteristics and capabilities and sends back an appropriate task to be executed.

c. Load Balancing and Optimizations

Even if a number of agents can be scaled up and down, it is important to use resources wisely and try to distribute work load more or less equally over time. Time slots with the highest number of rules running in parallel will dictate requirements for computing resources.

In this example, a rule-load balancing algorithm is responsible for enforcing a "least maximum" of rules to be executed concurrently at the same time slot. Accordingly, in this example, when a new periodically executed rule is added to the system, the rule-load balancing algorithm does the following:

(a) for a rule which is executed every N minutes, select the set of time slots starting at minute 1;

(b) within this set, identify the time slot which has the highest number of concurrent rules;

(c) if the value of this slot is smaller than the "least maximum" which has been identified so far, then that value becomes the new "least maximum" and the set of time slots becomes the set having the "least maximum"; and (d) repeat steps (a)-(c) above until minute N−1.

Figure 13:
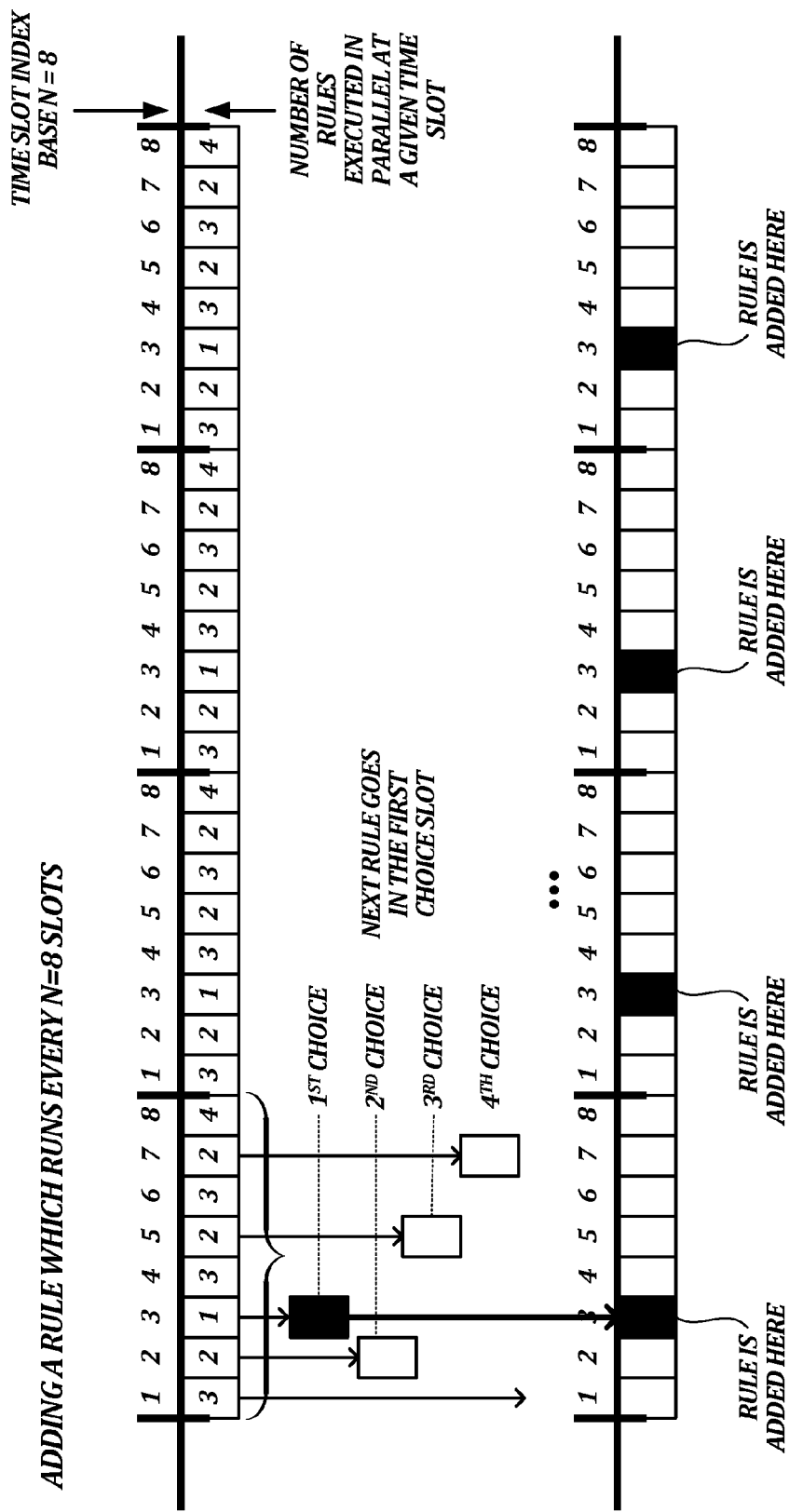
FIG. 13 illustrates a version of a rule-load balancing algorithm.

The new rule is added to the set of time slots, which has the least maximum number of rules executed at the same time. FIG. 13 illustrates a version of the algorithm in which a rule which runs every 8 slots (N=8) is added to time slot where only 1 rule is being executed, compared to other time slots in which two or more rules are executed in parallel. The 1-rule time slot (time slot index 3) is therefore indicated as being the "first choice" time slot. Time slots in which two rules are executed in parallel are indicated as being "second choice," "third choice," and "fourth choice," respectively. FIG. 13 also illustrates where the new rule is added in the sequence. In this example, the new rule is added at time slot index 3.

Additional constraints related to RTC specifics could be added to the algorithm. One of these is endpoint MPOP (multiple points of presence) prevention. Since the same RTC accounts could be used to simulate multiple end user behaviors, it is important that scenarios running at the same time are not interfering. An MPOP constraint makes sure that only one endpoint of a given account is running at the same time slot.

The check of accounts used in the rules at a given time slot could be performed before rule load balancing algorithm starts examining a current time slot set for a least maximum.

Example 13: Aggregation of "Peer" Data for Communications System Availability

In this example, benchmarking of availability information is described. Benchmarking can be based on statistical availability, and can be based on "peer group" or industry verticals.

For customers running similar scenarios on the same agents, historical information could be used for comparison and benchmarking of their RTC systems. Benchmarking of availability information, audio quality, etc., can be carried out. Benchmarking can be based on statistical availability (e.g., based on "peer group," industry verticals, etc.).

Figure 14:
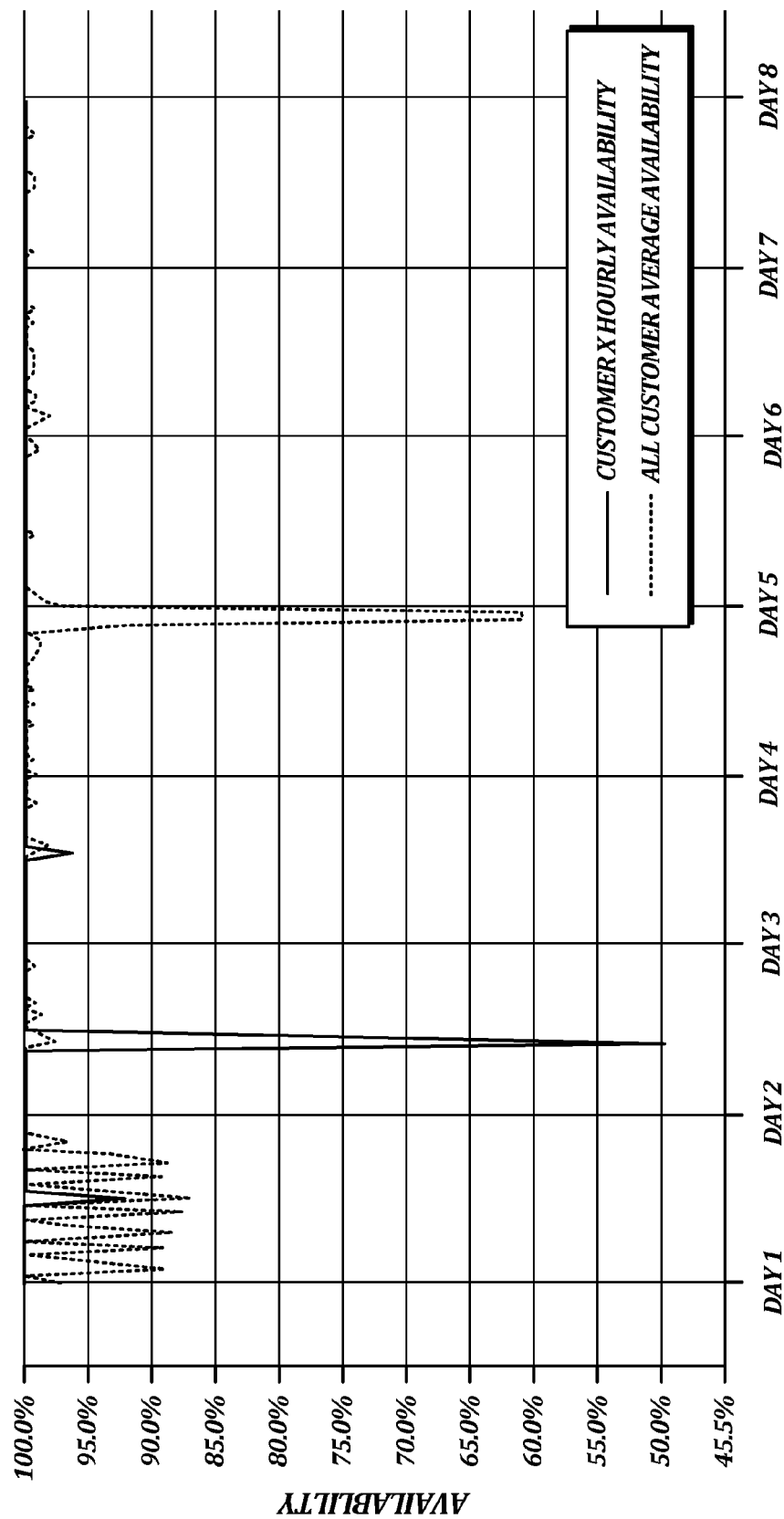
FIG. 14 is a graph that illustrates a customer's availability and an average availability for all customers.

For example, FIG. 14 illustrates a customer's availability ("Customer X") with a solid line and illustrates average availability for all customers with a dashed line. Comparison of these two lines can provide valuable information about Customer X's availability. For example, during Day 2 a slight drop in average availability (to about 98%) coincides with a very large drop in availability (to about 50%) for Customer X. On the other hand, Customer X's drop in availability (to about 60%) at the end of Day 4 is shown to be about the same as the average for all customers.

Example 14: Voice Quality Metrics Based on Synthetic Transactions

In this example, voice quality metrics (packet loss, jitter, latency, etc.) are collected for voice-related synthetic transactions (e.g., conference dial-in). This data can be used for raising immediate alerts or discovering audio quality degradation patterns while mining historical data.

For example, FIG. 15 shows an alert generated by a monitoring service ("PowerMon") for a low MOS score. The alert provides a date and time and a descriptive name for the event ("APAC—US Inbound: user07→user01"). The descriptive name includes information such as region ("APAC—US"), caller ("user07"), and callee ("user01"). The alert also provides details (including NMOS scores) for the caller and the callee. The alert also includes a table for reporting packet loss, jitter, latency, and degradation for inbound and outbound streams.

Example 15: Global Knowledge Base

In this example, a monitoring service maintains a global knowledge base with data related to RTC system availability disruption investigations. In this way, future RTC system availability issues can be solved faster because potential root causes and resolution steps are automatically provided.

In one scenario, after executing a task, an agent sends results to the monitoring service. In case of a task failure, the result contains multiple parameters (e.g., execution step, diagnostics code, exception type, SIP code, etc.) describing the failure. The monitoring service uses this set of parameters to classify given failures into buckets. Possible root causes and resolution steps can be entered into system and mapped to the set of parameters (e.g., a particular bucket) after issue investigation. This data immediately becomes available for the classification and investigation of future RTC system availability issues.

C. User Survey Service

In this section, a user survey service is described that can help an enterprise to obtain information directly from users. For example, the user survey service can be used to obtain information from users about the performance of UC services.

Detailed Overview of an Example User Survey Service

A user survey service as described herein can include one or more of the features described with reference to Example 16 below. In a broader UC context, a UC system with a comprehensive user survey service can provide at least the following functionality.

By contacting a user proactively through the UC system, the end user does not have to authenticate towards the system. Information is automatically collected within the context of a given user, without the need to have that user enter a password or visit a URL with a specific encoded access key.

A UC system can provide the user survey service the end user's presence information, and the user survey service can target users based on their availability. Therefore, users can be contacted specifically at a time when they are available, and not be disturbed while they are busy. This should increase the possibility of the user actually completing the survey, as opposed to surveys conducted by e-mail.

By reacting to presence information, the user survey service can reach users when they become available. To some users, an immediate request to complete a survey after becoming available may be seen as intrusive. The user survey service can be configured to wait for the duration of a "cooling off" period (e.g., a few minutes) after the user becomes available.

The user survey service can track how often individual users are contacted and asked to take a survey. The service can be configured to reduce or stop survey requests when certain conditions are present or certain thresholds are reached. For example, the service can be configured to request a user's participation a maximum of 10 times. As another example, once a user has taken a survey, the service does not contact the user again regarding that survey.

Utilizing instant messaging, an inherently stateful communication channel, it is possible for an end user to quit a survey without finishing it. The user survey service can recognize this and allow the user to automatically pick up where the user left off when contacting the user again in order to finish the survey.

Useful surveys can be completed in less than a minute, and in some cases, in as little as a few seconds. This can make users more likely to respond to surveys in the future, increasing the overall response rate (compared to lengthy and disruptive e-mail surveys).

The following examples illustrate some representative features of a user survey service, according one or more embodiments of the present disclosure.

Example 16: Using Presence Information to Survey Users

In this example, a user survey service provides an increased number and higher quality of responses to end user surveys by utilizing real-time communication information. After determining if a user is available (e.g., online and involved in a meeting or other activity) based on presence information, the user survey service initiates a survey at that time via a real-time communication mechanism (e.g., instant messaging). The real-time communication is typically more immediate than other communications (e.g., e-mail) and generally increases the chance that the user will respond to the survey.

Figure 16:
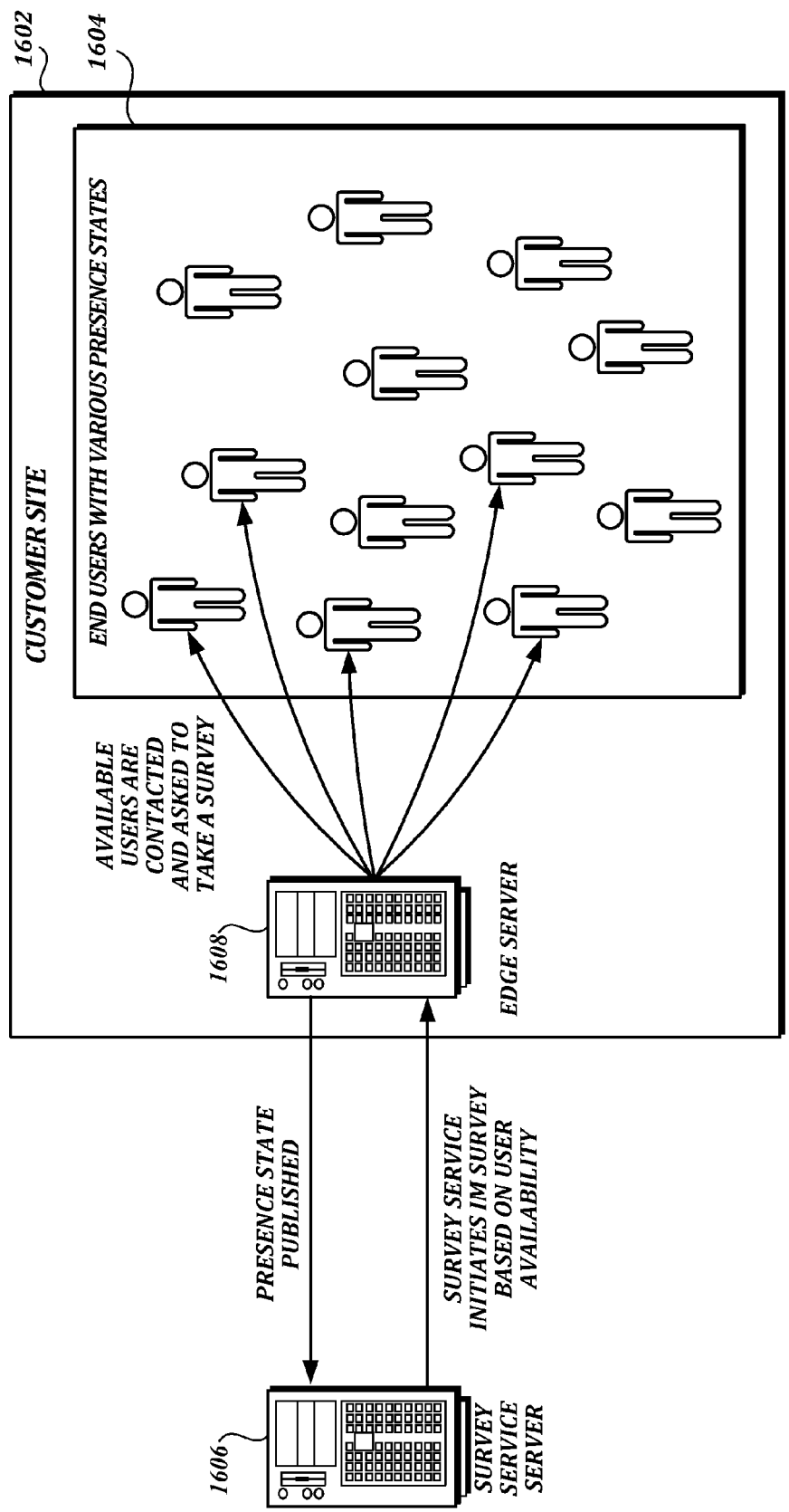
FIG. 16 is a diagram of a UC system that includes a user survey service.

FIG. 16 is a diagram of a UC system that includes a user survey service. As shown in FIG. 16, the UC system includes a survey service server 1606 that communicates with devices associated with a customer site 1602 (e.g., edge server 1608 and user devices associated with a set of end users 1604). (The users/devices that are shown as being within the box in FIG. 16 that represents the customer site 1602 need not be physically present at the customer site 1602, but may be connected to a network associated with the customer site 1602.) As shown in FIG. 16, the edge server 1608 (e.g., a Lync edge server) publishes presence information to the survey service server 1606, which initiates a survey (e.g., via instant messages (IMs)) via the edge server 1608 based on user availability as indicated by the presence information. The edge server 1608 is only one example of a possible deployment choice in a UC system; other servers with different functionality and configurations also may be used.

The survey service server can obtain presence information in different ways. For example, a user may be signed in to an application that is trusted by the UC system, or the user's presence can be detected and authenticated when the user signs in to a user account, even if the user is not currently using a trusted application.

In this example, users that are determined to be available (indicated by curved arrows) are contacted by IM and asked to complete a survey. Users that are determined to be unavailable (e.g., offline, online but busy, etc.) are not contacted by IM. Users that are not available can be excluded from the survey, or their participation can be requested in some other way (e.g., via e-mail).

Figure 17:
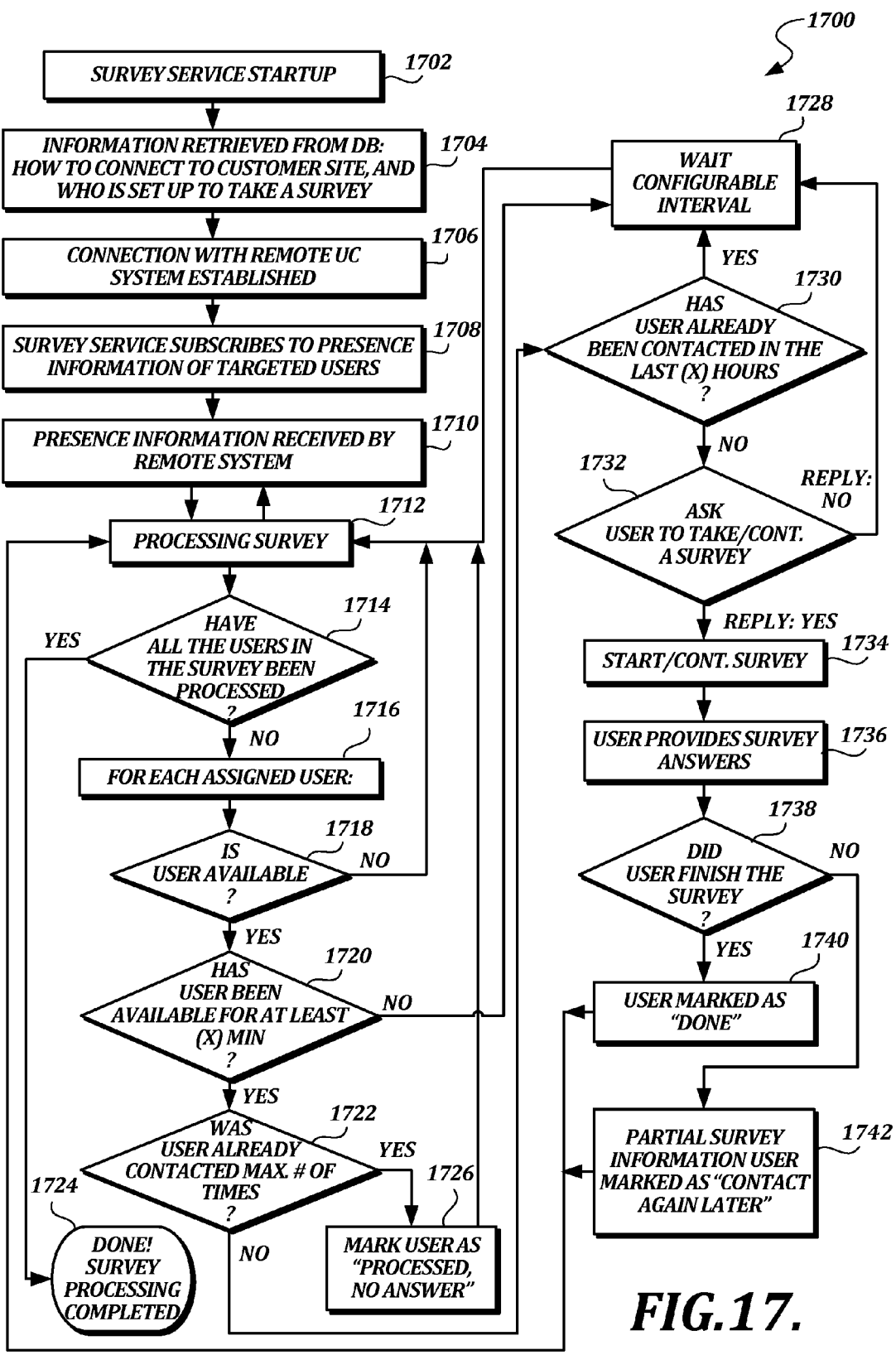
FIG. 17 is a flow chart that illustrates a survey technique that employs presence information.

FIG. 17 is a flow chart that illustrates a survey technique that employs presence information. The technique shown in FIG. 17 can be implemented by the system shown in FIG. 16, or by some other system. In step 1702, a survey service starts up. In step 1704, the service retrieves information (e.g., how to connect to a customer site, and which users associated with the customer site are configured to take surveys) from a database. The service establishes a connection with the remote UC system (e.g., a Lync system) at step 1706, and subscribes to presence information of targeted users in step 1708. The service receives the presence information in step 1710 and begins processing the survey in step 1712. As indicated in step 1714, the service continues processing the survey until all survey processing is completed (see step 1724). In step 1716, the service processes an assigned user. In step 1718, the service determines if the user is available, and returns to step 1714 if not. If the user is available, the service determines if the user has been available for a configurable number of minutes in step 1720, as a "cooling off" period to avoid disturbing a user that has just finished a call, for example. (The service can wait for the configurable interval to elapse in step 1728, if needed, and continue processing for other users, as appropriate.) If the user has been available for the required period of time, the service determines, in step 1722, if a threshold number of attempts to contact the user has been reached. If the threshold has been reached, the user is marked as "processed, no answer" in step 1726. If the threshold has not been reached, the service determines, in step 1730, whether the user has already been contacted within a configurable number of hours, to avoid pestering a user that has been recently contacted. (The service can wait for the configurable interval for this user to elapse in step 1728, if needed, and continue processing for other users, as appropriate.) If the user has not been contacted within the configurable number of hours, the service contacts the user (e.g., via IM) to ask the user to take a survey (or to continue a survey if the user has previously started a survey) in step 1732.

In this example, the user can reply positively (e.g., "yes" or some other positive response, such as "start survey") or negatively (e.g., "no" or some other negative response; a failure to reply within a given amount of time may be interpreted as a negative response). If the user's reply is negative, the service can wait for a configurable interval in step 1728 before attempting to contact the user again. Alternatively, the user may be given more options, such as "contact me later" or "do not contact me again." If the user chooses not to be contacted again, the service can skip step 1728 and process another user, as appropriate.

If the user's reply is positive, the service starts or continues the survey, as appropriate, in step 1734, and the user provides survey responses in step 1736. In step 1738, the service determines whether the survey has been completed. If so, the user is marked as "done" in step 1740, and processing of the survey continues with additional users, as appropriate. If the survey has not been completed, the service marks the user as "contact again later" in step 1742. (The service can wait for the configurable interval for this user to elapse in step 1728, if needed, and continue processing for other users in the meantime, as appropriate.)

Many alternatives to the technique shown in FIG. 17 are possible. Various processing steps can be omitted, or the steps shown in FIG. 17 can be supplemented or replaced with other steps. For example, a survey service can omit the "cooling off" period after a user becomes available. As another example, for an important survey that requires participation from a particular user, the service can omit the option of not contacting the user again after a threshold number of attempts have occurred, and instead continue to contact the user until the survey is completed.

II. Advanced Techniques and Tools for a Unified Communication Data Management and Analysis System In this example, various examples of advanced features that may be included in or associated with a UC data management and analysis system are described. The individual features described in this section may be implemented together, independently, or in various subsets, as may be appropriate for a particular application. The features described in this section may be implemented along with or independent of any of the features described in Section I, above.

A. Measuring Voice Quality and Reliability by Location

Examples in this section describe features of a UC system that measures voice quality and reliability for specific locations. As with other examples described herein, the examples in this section can be used with enterprise-level UC systems. A UC system with enhanced data capture, analysis, and reporting capabilities as described herein may include, for example, one or more of the features described in this section (e.g., with reference to Example 17, below), and may also include one or more of the features described in Section I.A, above (e.g., with reference to Examples 1-10).

Example 17: Voice Quality/Reliability Score by Location Based on Prior Usage UC services allow users to make and receive VoIP (voice over IP) or UC calls from endpoints in many different networks and locations, including traditional work environments, home, and public spaces (e.g., via public WiFi). The quality of these networks, whether privately owned (e.g., in a hotel, coffee shop, etc.) or publicly owned (e.g., in a public park), may vary in terms of attributes such as download speed, upload speed, and applicability for real-time communications. These networks may also offer limited bandwidth or may even throttle the bandwidth for users (e.g., where there are typically a large number of users using a shared network).

In this example, a process is described for obtaining location-based metrics such as aggregate call scores (e.g., voice quality or reliability scores) for geographic regions based on actual or observed characteristics of prior usage. In at least one embodiment, a UC system uses IP (internet protocol) address and/or subnet information to capture voice quality metrics (and potentially other data) based on an IP address and/or other geographic markers (e.g., a network identifier such as an SSID (service set identifier), etc.). IP address information may be obtained from an IP database, which may be an external database. Captured voice quality metrics can be used to compute aggregate metrics (e.g., packet loss, latency, etc.) based on geographic areas. The geographic areas may be relatively small (e.g., an office building, hotel, etc.) or larger (e.g., a city, state, region, etc.). This information can be used to proactively inform users of potential user experience issues, which may be represented in terms of statistics or probabilities of experiencing voice quality or reliability problems.

Using information such as an IP address (or a network identifier such as an SSID) of a UC endpoint and other databases or information sources (e.g., a mapping of IP address to location), it is possible to map a UC endpoint to a certain geographic region. Depending on the fidelity of the information (e.g., the fidelity of a look-up database and the look-up key, such as the IP address or SSID), the mapping could be made to a small area such as a particular floor in a hotel or a wider region such as a ZIP code area or a city.

A UC endpoint may also report information related to various usage scenarios. For example:
- A UC endpoint, when it fails to complete a call, may send up an error report to the server/back-end database.
- A UC endpoint may offer mid-call voice quality metrics or other data that relates to various factors affecting voice quality such as (but not limited to) jitter, packet loss, latency, MOS degradation, etc.
- A UC endpoint may send error information when adding modalities to an existing call. For example, a user may add desktop sharing or video to an already established audio call. If adding this extra modality causes quality degradation or functionality loss, the UC endpoint may send this information to the server.

The endpoint information (mid-call and/or pre- or post-call reports) may be used by a UC system to compute aggregate statistics of various regions. For example, a UC system may compute aggregate metrics, such as average packet loss or average latency, for a particular geographic area (such as a particular coffee shop located on 42nd street in New York). These aggregated metrics may be tuned, refined, and recomputed over time to establish metrics such as a baseline or steady state/long term/short term/trailing X days average, a median, a standard deviation, and other statistical metrics.

The metrics mentioned above can be used to compute voice quality and reliability scores for a particular location or geographic area. For example, a voice quality score for a particular location can be computed as a percentage of poor calls. In at least one embodiment, the UC system determines whether calls are to be classified as poor calls using characteristics such as jitter, packet loss, latency, or other factors. The UC system then computes an average poor call percentage for the location. The voice quality score for the location can be set as the average poor call percentage (e.g., over a period of time) for the location. In at least one embodiment, the voice quality score is not set until a predetermined minimum number of calls is reached. For example, if the minimum number of calls is 100, the voice quality score can be set after the completion of 100 calls.

A reliability score can be based on a number of errors. For example, if a call fails to connect, this event can be classified as an error and reported to a server. The reliability score for a particular location can be set as an average number of errors (e.g., over a period of time) for calls associated with (e.g., having an endpoint at) a given location.

Figure 18:
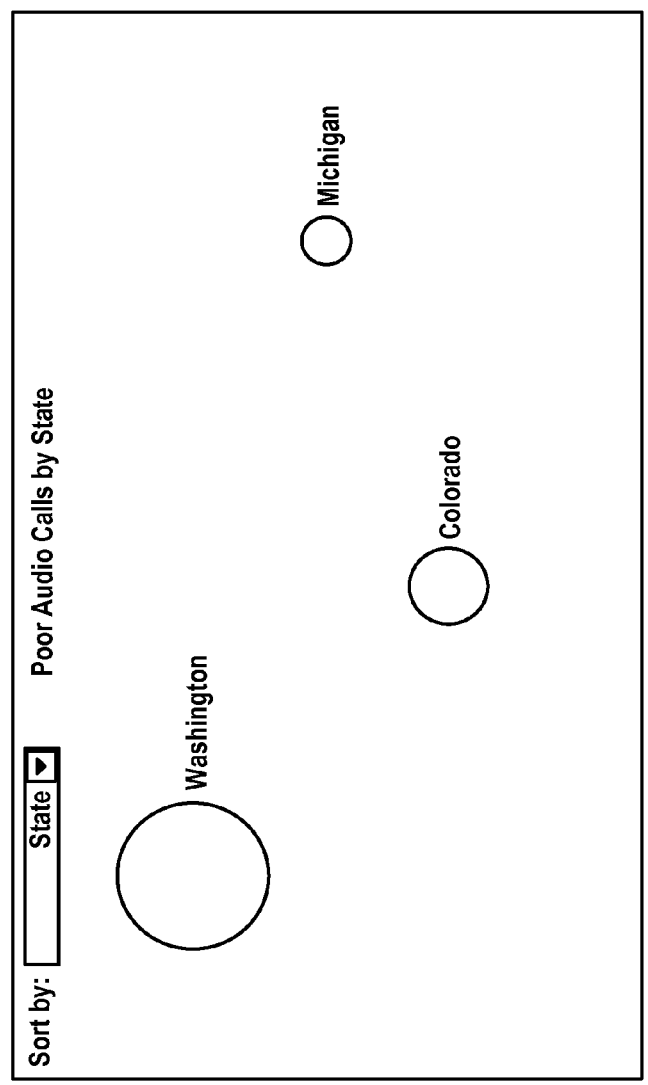
FIG. 18 depicts a graphical user interface comprising a map with indicators at relevant locations to indicate locations of poor quality calls.

Metrics and scores can be used, stored, and made available in various different ways. For example:

- When a UC user logs in to a network at a particular coffee shop, it is possible to let the user know, proactively, what the observed statistics or score for that particular location are. Based on this, the user (e.g., based on a recommendation from the UC system to the user) can determine the probable experience of a call or UC service in that location. The UC system can, for example, indicate to the user that the current location would likely not support desktop sharing (which has a higher requirement for network bandwidth than other tasks). The user in this case can make an informed judgment on whether to conduct a call with desktop sharing.
- The UC system can provide an enterprise with a view on the various voice quality scores and aggregate information for locations in which enterprise users have utilized UC services. These scores and aggregate information allow an enterprise to make optimization choices regarding, for example, network usage policies.
- A voice quality or reliability score can be anonymized and published to subscribers of such data.
- The UC system can use the aggregate information to compute heat maps of voice quality and/or reliability based on geographic factors such as geographic distance from office locations.
- The UC system can classify calls (e.g., as poor calls) based on the metrics and provide a visual map of where such calls are taking place. For example, FIG. 18 depicts a graphical user interface 1800 comprising a map with indicators (e.g., circles) at relevant locations. In the example shown in FIG. 18, the sizes of the circles indicate the relative frequency of calls classified as poor calls at those locations. Alternatively, other indicators, such as colors, graphs, other shapes, etc., can be used. The locations depicted in FIG. 18 are states, but it should be understood that similar maps can be generated (e.g., in response to user activation of the drop-down box labeled "Sort by") to compare cities, states, countries, or other locations. The graphical user interface 1800 also can include other information, such as map data (including political borders, roads, etc.), satellite images, etc.

In at least one embodiment, the following process is used to determine whether to notify users of voice quality or reliability issues associated with a particular location. At a specified interval (e.g., a number of days, a week, etc.), users are selected that meet one or more criteria, such as a threshold percentage (e.g., 20%) of calls involving voice quality or reliability issues, a call category (e.g., remote wireless), or the like. For each of the selected users, the most frequently occurring location (e.g., by IP address) is selected. Then, the users are notified (e.g., by e-mail or IM) if the selected location seems to be associated with voice quality or reliability issues. The decision to notify users may be preceded by a determination that the most frequently occurring location is involved in a threshold number or percentage of the user's calls. For example, if it is determined that the most frequently occurring location is only slightly more frequent than one or more other locations used by the user, the user may not be notified.

The notification may include recommended actions. For example, if a particular location is associated with poor voice quality, the notification may recommend checking the router, network bandwidth, number of concurrent users, local internet usage, or the like.

Figure 19:
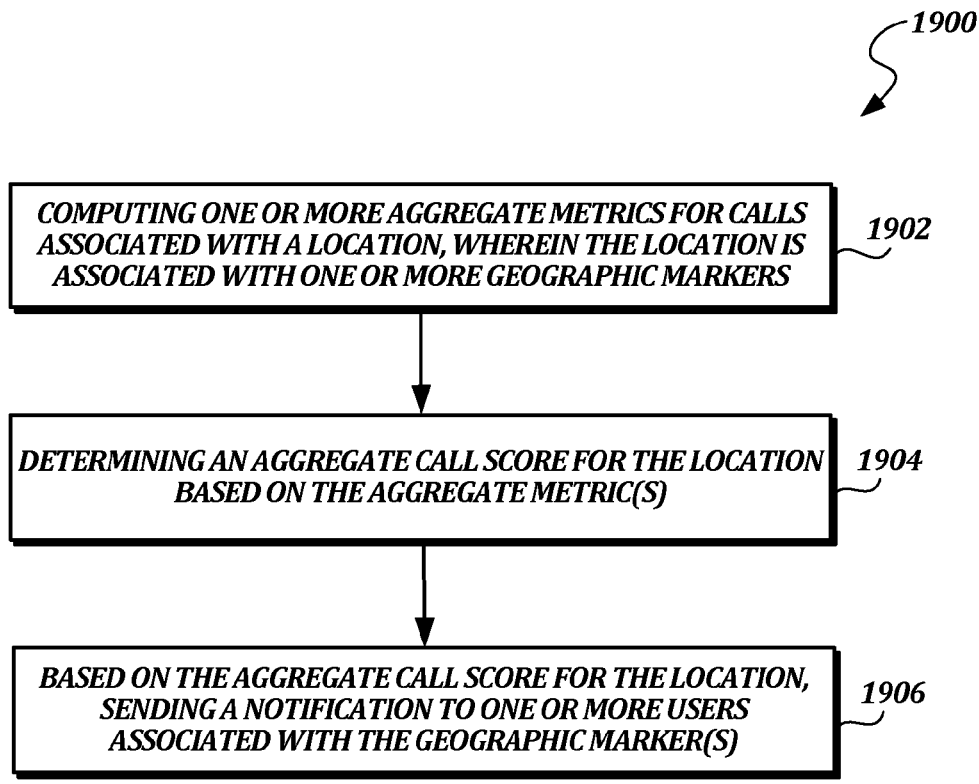
FIG. 19 is a flow chart of an illustrative process for determining location-based quality metrics.

FIG. 19 is a flow chart of an illustrative process 1900 for determining location-based metrics. At step 1902, one or more aggregate metrics (e.g., an average packet loss metric, an average latency metric, etc.) are computed for calls associated with a location. The location is associated with one or more geographic markers (e.g., an IP address, a network identifier, etc.). At step 1904, an aggregate call score is determined for the location based on the one or more aggregate metrics. At step 1906, based on the aggregate call score for the location, a notification is sent to one or more users associated with the one or more geographic markers. Alternatively, location-based metrics can be determined in some other way, in accordance with principles described herein.

B. Monitoring Service Actionability Framework

Examples in this section describe additional features of a monitoring service actionability framework. In particular, features are described that can be used to enable customers to easily and effectively discover prioritized and correct actions in response to events. As with other examples described herein, the examples in this section can be used with enterprise-level UC systems. A UC monitoring service as described herein may include, for example, one or more of the features described in this section (e.g., with reference to Examples 18-20, below), and may also include one or more of the features described in Section I.B, above (e.g., with reference to Examples 11-15).

As described herein, various features of the actionability framework may be used to achieve one or more of the following:

- prioritizing events (e.g., is it critical to address now, or is this something that can be addressed later);
- providing relevant different personas within an organization with the level of information they may require;
- presenting information at the right level of detail, such that actions resulting from that information can be determined; and/or
- aligning the monitoring service with existing enterprise processes, rather than requiring enterprise processes to change (e.g. network operation center (NOC) processes, escalation processes, etc.), with enterprises potentially including hundreds of sites being monitored, hundreds or thousands of rules, and potentially hundreds of monitoring alerts per day.

Example 18: Computing Service Availability

IT systems (such as UC and other similar IT services) are typically monitored by system, application, and performance monitoring solutions. These solutions can raise awareness of system downtime, performance, and availability issues (e.g., via notification mechanisms such as e-mail or SMS) and also can provide an operations console for an operations team. An operations console can highlight incidents and system alerts that require remediation and action. Such a console may have hundreds of open "incidents" or alert conditions that are active at any given time and require immediate action. These alert conditions may be related; a single underlying root cause may result in multiple redundant alerts. A constant stream of alerts can contribute to a "noisy" system of alerts, and it can be difficult to determine which alerts are critical, based on the impact to the end user.

In this example, a monitoring service may include a test suite with test rules for user workloads that may include, but are not limited to, peer-to-peer IM, outbound PSTN calls, inbound PSTN calls, conference dial-in, federation modalities, and various video, voice, data sharing, application sharing, and conference and collaboration modalities. The pattern of tests within a test suite can be chosen in such a way that each test is responsible for testing a particular workload. Together, a system of tests can be deployed to test components that provide an end-to-end UC service to end users.

A suitably configured test suite can comprehensively monitor the service availability of a UC system for various workloads and provide views for perspectives on the system availability. For example, using a suitably configured test suite, it is possible to compute:

a composite or aggregate service availability for an entire UC system;

service availability for a particular workload (e.g., service availability for peer-to-peer voice service or dial-in conferencing); and/or service availability for a "pool" or grouping of users, e.g., service availability for dial-in conferencing for North America users.

In this example, test rules are described that can test different types of functionality. A "run" of a test corresponds to a transaction that tests the functionality, performance, and/or availability of the system at a certain point in time. The availability of a system as computed by a test rule over a specific time period can be defined as the ratio (e.g., as a percentage) of the number of successful tests to the total number of tests that were run. According to this definition, if a test runs 100 times in a period of 10 minutes and the test result was successful 99 times out of the total of 100 test runs, then the availability as measured by that test over that period of 10 minutes is 99%. Alternatively, the availability of a system can be defined in some other way.

A test can have certain dependent characteristics or metadata associated with it that can help to define a relationship with certain parts of the UC system being monitored. For example, a test rule may be responsible for measuring the availability of inbound PSTN calling for a particular group of users (e.g., users in the U.S.). Another test rule may measure the availability of a similar workload (inbound PSTN calling) for users in Europe.

Traditional monitoring systems do not have a view of relative business impact, and tend to treat an outage or systemic problem as independent of the business impact. They tend to have static rules that determine criticality of an outage based on non-dynamic factors, and do not consider particular impacts on the user population. In this example, the monitoring service can provide relevant actionable alerts and allow administrators to prioritize remediation actions by factoring in the user impact and/or business impact of a systemic outage.

Test rules can be weighted depending on factors such as a number of impacted users. Consider an enterprise with 10,000 users in 3 main user populations: 5,000 users in the U.S., 3,000 users in Europe, and 2,000 users in Asia. A system failure impacting the users in the U.S. can be considered to have a higher impact to the business than a system failure impacting European users because there are more users impacted. Therefore, a failure on a test for the U.S. users can be given a much higher relative priority than a test failure for the European users, based on the user populations.

Various factors can be used to compute a weighted availability that can be used for assigning priority to failures. The factors may be static or dynamic. For example, the business impact of a particular workload (e.g., IM, voice, video, etc.) can be used, as well as other factors such as system components (e.g., gateways, servers, etc.), the user population served by a certain part of the system being tested, etc.

Rule types can be defined for corresponding workloads. A business impact for a workload can be represented with a business impact rating for the rule type. Business impact ratings can vary depending on the business impact of the workload being tested. As an example, consider a set of rule types in which a dial-in conference rule type is assigned a "critical" rating of 5; audio conference, inbound PSTN, and outbound PSTN rule types are assigned a "high" rating of 4, and a peer-to-peer audio rule type is assigned a "medium" rating of 3. (Alternatively, other ratings can be used, based on implementation and/or user choices.)

Consider a UC system for the enterprise described above, serving a total of 10,000 users, in the U.S., Europe, and Asia. A test suite for this enterprise may include 3 test rules to measure the availability of a particular service for the U.S. users, Europe users, and Asia users, respectively. As shown in Table 12, below, with 3 dial-in conference rules, one each for the respective regions, a weighted impact score can be computed based on a user impact rating and a business impact rating associated with the rule. A relative score also can be computed. The relative score can be used by the system to highlight availability downtime.

TABLE 12

Example computation of weighted impact and relative scores

| Test Rule Name | User Impact | Business Impact | Weighted Impact Score | Relative Score | Rule Type |
| --- | --- | --- | --- | --- | --- |
| USA Dial-in Conference | 5000 | 5 | 25000 | 50 | Dial-in Conference |
| Europe Dial-in Conference | 3000 | 5 | 15000 | 30 | Dial-in Conference |
| Asia Dial-in Conference | 2000 | 5 | 10000 | 20 | Dial-in Conference |

Referring to the example in Table 12, above, if all rules are succeeding (no rule has failed), the availability of the overall system is 100%. If the Asia Dial-in Conference test fails while the other two tests are succeeding, the availability of the overall system at this time is 80%, because the Asia Dial-in Conference rule accounts for a 20% impact on availability, as shown in the relative score for this rule. The effective business impact can take into account the effect of the failing rule, and can be calculated as 100%−20%=80%. Similarly, if the Europe Dial-in Conference test fails while the other two tests are succeeding, the availability of the overall system at this time is 70%, because the "Europe Dial-in Conference" rule accounts for a 30% impact on availability.

Figure 20:
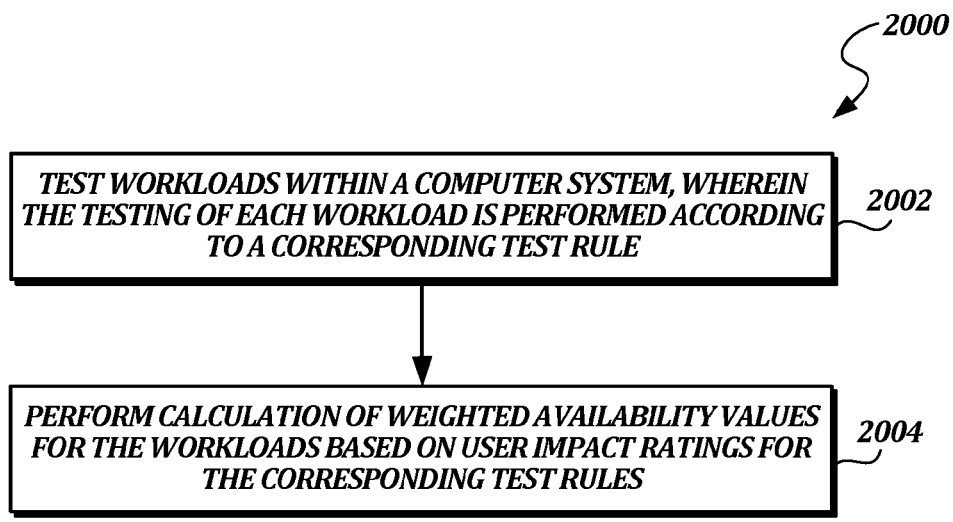
FIG. 20 is a flow chart of an illustrative process for calculating weighted availability in a computer system (e.g., a UC system)

FIG. 20 is a flow chart of an illustrative process 2000 for calculating weighted availability in a computer system (e.g., a UC system). At step 2002, workloads are tested within the computer system. The testing of each workload is performed according to a corresponding test rule. At step 2004, a calculation of weighted availability values is performed for the workloads based on user impact ratings for the corresponding test rules. The weighted availability values can be further based on business impact ratings for the corresponding test rules. A weighted impact score can be calculated (e.g., as an intermediate value in an availability calculation) based on user impact ratings and business impact ratings. An aggregate service availability value can be calculated for the system based on the weighted availability values for the workloads of the system. Alternatively, weighted availability can be determined in some other way, in accordance with principles described herein. For example, actual testing need not be performed, and various availability scenarios can be modeled based on projections of whether particular tests may fail. Such projections can allow useful availability information to be obtained without actual testing being performed.

Example 19: Classification of Failures

As described in Example 18, above, testing of workloads within a computing system can be performed by a test suite comprising test rules. The testing of each workload can be performed by a corresponding test rule in the test suite. In this example, techniques are described for classifying and prioritizing rule failures associated with test rules. For example, rule failures can be classified as sustained or intermittent, frequent or isolated (single), or classified in some other way. Priorities can be set for responding to rule failures based on classifications of the failures and/or on other factors, such as user settings that assigns a weighting to a rule, the length of time that has passed since the failure occurred, etc.

Administrators tasked with responding to failures can benefit from prioritized rule failures. Consider the following examples:
  A rule that covers a pool of 15,000 users and is failing will typically be more important than a rule that covers a branch office with 50 users that is also failing.
  A rule that has failed for the first time and then immediately succeeds will typically be less important to address than a rule with a history of failing intermittently.
  A failure caused by a specific server (e.g., an edge server) will typically be less important than a rule that is failing because SIP trunking is down.

Classification features described in this example can provide the advantage of prioritizing failures, which can help administrators with limited resources decide which failures to focus on first.

In this example, a run of a rule is referred to as a test. The outcome of a test can be failure or success. Failures can be classified as sustained or intermittent, depending on the nature of the failures. FIGS. 21 and 22 are diagrams that illustrate failures classified as sustained and intermittent according to at least one embodiment.

In FIG. 21, illustrative scenarios are shown in which the failure starts out as a sustained failure, with two consecutive failures (boxes labeled "F") at the beginning of each timeline. In this example, the two consecutive failures result in the failures being classified as sustained. Alternatively, the threshold number of consecutive failures can be increased, e.g., in response to user settings. In the timelines labeled "Sustained & Active," the most recent test is a failure, which toggles the sustained failure to an active state. In the timelines labeled "Sustained & Inactive," the most recent test is a success, which toggles the sustained failure to an inactive state.

In FIG. 22, illustrative scenarios are shown in which the failure starts as intermittent. In the timelines labeled "Intermittent & Inactive," the most recent test is a success, which toggles the intermittent failure to an inactive state. In the timeline labeled "Sustained & Active," two consecutive failures result in the failures being classified as sustained. Because the most recent test is a failure, the sustained failure is toggled to an active state. In at least one embodiment, once a failure has entered a sustained state, it does not move back to an intermittent state. Though not shown in FIG. 22, a failure also can be intermittent and active.

Sustained failures can indicate an issue that is currently impacting end-user functionality at scale. Sustained failures can be given higher priority for resolution than intermittent failures. In practical terms, this may mean that sustained failures may be reported with alerts that provide prescriptive guidance recommending resolution within a day with high-level staff resources, while intermittent failures may be reported with alerts that provide prescriptive guidance recommending no action, or action within a longer time frame (e.g., a week or a month) and/or with lower-level staff resources.

Intermittent failures can be further classified as frequent or infrequent. In at least one embodiment, an intermittent failure is classified as frequent if it occurs multiple times (e.g., 4 times) within a 24-hour period, or a greater number of times (e.g., 20 times) within a week. An intermittent failure can be classified as infrequent if it does not exceed thresholds associated with frequent intermittent failures. In at least one embodiment, an intermittent failure is classified as "single" if it is the first failure for a rule. For single intermittent failures, no particular action may be recommended. Frequent intermittent failures may be set at a higher priority than infrequent intermittent failures. The illustrative threshold values and time periods described above can vary depending on implementation or user settings.

Failures can be grouped together to facilitate resolution of underlying problems. As used herein, an incident refers to a group of related failures (e.g., failures related to the same rule). The classifications of failures described above can be similarly applied to incidents. For example, incidents can be classified as active, in which the last test associated with incident failed, or inactive, in which the last test succeeded. Incidents can be classified as open, in which one or more failures require investigation, or closed, in which no failure requires investigation. Open incidents can be closed automatically (e.g., after a predetermined period of time (e.g., 30 days) without failures) or by a user (e.g., where an administrator has determined that the failure has been resolved). Related incidents can be grouped together to allow an investigation to focus on a particular area of concern. Incidents can be prioritized based on classification, user-specified weighting, the length of time over which the incident has occurred, and/or other factors.

Priorities can be set based on classifications of failures and incidents and/or on other factors. For example, priorities can be set based on the time of a failure (e.g., present failures may be given a higher priority than recent failures, more recent failures may be given a higher priority than less recent failures, etc.). As another example, priorities can be set by administrators to give them the flexibility to weight particular failures based on, for example, business impact, impact on users, components involved, or other aspects associated with particular rules.

If prioritization is not customizable, it may not address the needs of all users. For example, a user may want to specify that a sustained failure in a branch office is not as important as a sustained failure in a data center. On the other hand, if a branch office is critically important to the functioning of the business, a user may want to raise the priority of failures at that branch office. Accordingly, features are disclosed herein that allow entities to influence the priority of rules and alerts for their own needs. For example, one or more of the following features may be provided:

- the ability to specify which rules are more important than another (e.g., grouping and stack ranking of rules);
- the ability to identify which components are more important than others (e.g., front-end server failures may be more important than edge server failures); and
- the ability to modify and/or expand previously established criteria for setting custom priorities.

Various alerting mechanisms can be used (e.g., in the form of a control panel, an email or IM, etc.) to ensure that prioritized incidents are simple to identify compared to lower priority incidents. For example, a control panel may include a dashboard or a sliding scale of time displayed, to allow for showing priority of any failures that are occurring now, and additional views of incidents that have occurred recently (e.g., two weeks). A user can switch between views, as desired. Priorities can be signaled with appropriate colors (e.g., red (high priority), yellow (medium priority), green (low priority)) or other visual features in graphics, text, etc. Alert messages can be delivered with a frequency and urgency that is appropriate for the priority level. Messages can include descriptions of the failures and recommendations for action.

To help improve the ability for alerts (e.g., e-mail alerts), dashboards, and other alerting mechanisms to give better guidance on actions, an automatic re-test feature can be provided. For example, if a rule fails, the test can be repeated immediately to determine if it fails again. This can be useful for determining whether a failure is intermittent or sustained. This additional information can help alerting mechanisms to provide better descriptions of the failures and better recommendations for taking action.

For example, a re-test can proceed as follows:
- Only repeat the failing part of a task (e.g., registration, create conference, join conference, start outbound call, etc.), and not the full task behavior. This is partly to save time in producing the alert, but also to help isolate the problem.
- If a re-test fails, then the failure type can be classified as sustained.
- If a re-test succeeds, then the failure type can be classified as intermittent.

As part of the re-test, alerts can be provided. For example, alerting features associated with a re-test may include the following:
- Intermittent or sustained alerts can be sent. When a confirmed sustained failure occurs (e.g., two failures in a re-test), a corresponding alert can be sent. However, if a failure is followed in a quick re-test that succeeds, an intermittent alert can be sent.
- The subject line or body of an alert can specify the classification of the alert (e.g., sustained or intermittent).
- Identifying the alert as intermittent may help identify it as an update to an existing issue that has been investigated, but additional information may be useful. Accordingly, the subject line or body of the alert can include additional identifiers such as "New" if it relates to a new problem or "Update" if it relates to an existing problem.

A list of illustrative subject lines relating to a dial-in conference test is provided below:
- "New Intermittent Failure: [Avail: 77.8%]—AV MCU Dial-in Conference Test—[Location] Toll Call on [Date/Time]"
- "Update Intermittent Failure: [Avail: 77.8%]—AV MCU Dial-in Conference Test—[Location] Toll Call on [Date/Time]"
- "Sustained Failure (Update): [Avail: 77.8%]—AV MCU Dial-in Conference Test—[Location] Toll Call on [Date/Time]"
- "Sustained Success: [Avail: 77.8%]—AV MCU Dial-in Conference Test—[Location] Toll Call on [Date/Time]"
- "Failure—Ticket ID assigned, Ticket #123: [Avail: 77.8%]—AV MCU Dial-in Conference Test—[Location] Toll Call on [Date/Time]"

An incident summary also may be provided (e.g., after a subject line). The incident summary may include, for example, a description of the incident, an incident ID, time and date, a count of a number of failures in the incident, and a ticket status (if a ticket has been assigned).

Figure 23:
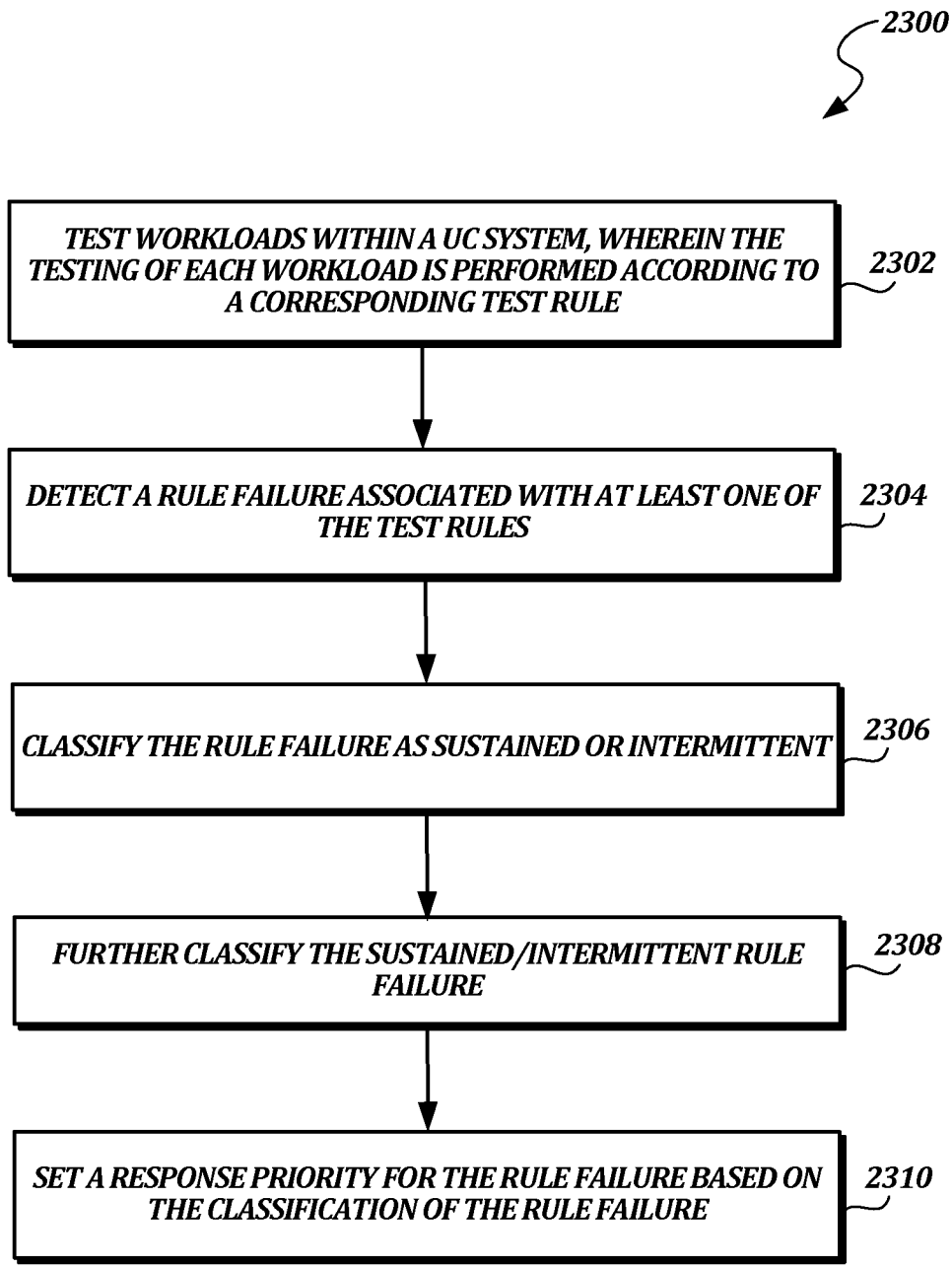
FIG. 23 is a flow chart showing an illustrative process for setting a response priority for a rule failure based on classification of the failure.

FIG. 23 is a flow chart showing an illustrative process 2300 for setting a response priority for a rule failure based on classification of the failure. At step 2302, workloads are tested within a UC system. The testing of each workload is performed according to a corresponding test rule. At step 2304, a rule failure is detected. The rule failure is associated with at least one of the test rules. At step 2306, the rule failure is classified as sustained or intermittent. At step 2308, the sustained/intermittent rule failure is further classified (e.g., based on whether the failure is frequent or isolated, based on user impact, etc.). At step 2310, a response priority is set for the rule failure based on the classification of the rule failure. Alternatively, rule failures can be classified and/or prioritized in some other way, in accordance with principles described herein.

Example 20: Automatic Inspection of Topology to Generate Rule Sets

In this example, automatic inspection of a UC topology is described. The automatic inspection can be used to determine a set of usage scenarios within the UC topology. A set of test rules can then be generated to test workloads corresponding to the set of usage scenarios. Illustrative test rules, testing procedures, and other related concepts are described in further detail in Examples 18 and 19, above.

Some advantages of features described in this example may include:
- the ability to automatically provide a comprehensive rule set that can capture important usage scenarios and can be used in computing business service availability, weighted service availability, and other useful measurements;
- the ability to automatically provide a comprehensive rule set that grows linearly with increased numbers of components and is easy for an enterprise (and administrators) to manage and operate;
- the ability to use a small number of test accounts for testing;
- the ability to provide a rule set that allows clear and efficient prioritization of issues (e.g., based on user impacts, business impacts, etc.) and systematic action plans (e.g., through alerting mechanisms such as alerts, dashboards, and the like); and the ability to generate the rule set with the use of an application such as a test suite wizard that allows user input into the rule generation process.

Figure 24:
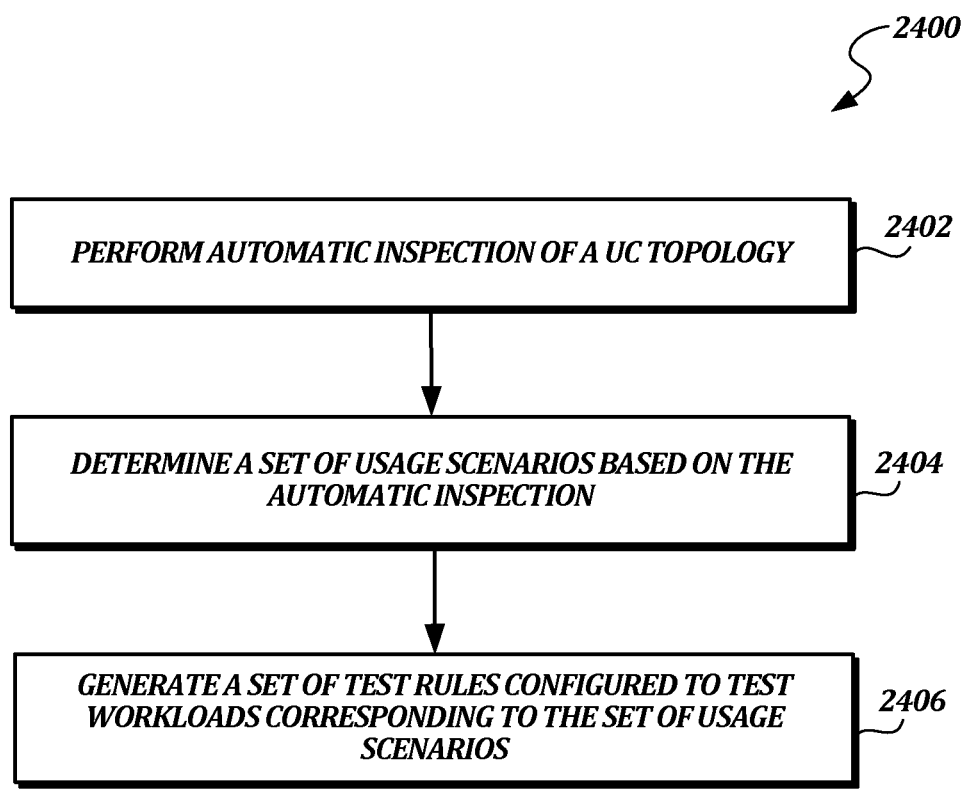
FIG. 24 is a flow chart of an illustrative process for generating a set of test rules based on automatic inspection of a UC topology.

FIG. 24 is a flow chart of an illustrative process 2400 for generating a set of test rules based on automatic inspection of a UC topology. At step 2402, an automatic inspection of a UC topology is performed. At step 2404, a set of usage scenarios is determined based on the automatic inspection. At step 2406, a set of test rules is generated. The test rules are configured to test workloads corresponding to the set of usage scenarios. The workloads can be tested according to the corresponding test rules. The test rules may be associated with metrics such as user impact ratings or business impact ratings. Test rules that may be generated in this way include, for example, audio conference test rules, dial-in conference test rules, outbound call test rules, inbound call test rules, and peer-to-peer audio call test rules.

For example, in at least one embodiment, for each UC server (e.g., a Lync pool) an audio conference test rule (e.g., an AV MCU test rule) is set with two test accounts on the same UC server. A dial-in conference test is set with two test accounts on the same UC server for each dial-in conference number. For each gateway or SIP trunk, a PSTN outbound test is set with a test account and a landing number (e.g., a landing number provided by a UC monitoring service), and a PSTN inbound test is set using two test accounts. Similarly, for each UC server providing branch or site capability (e.g., a Lync SBA or SBS), a PSTN outbound test is set with a test account and a landing number (e.g., a landing number provided by a UC monitoring service), and a PSTN inbound test is set using two test accounts. For each central UC server (a "core" or primary server), a peer-to-peer audio rule (from the central server to a non-central UC server) is set. In a Lync system, the central UC server may be a CMS server.

C. Advanced Techniques and Tools for a User Survey Service

Examples in this section describe features of advanced techniques and tools for a user survey service. As with other examples described herein, the examples in this section can be used with enterprise-level UC systems. A user survey service as described herein may include, for example, one or more of the features described in this section (e.g., with reference to Examples 21-22, below), and may also include one or more of the features described in Section I.C, above (e.g., with reference to Example 16).

Example 21: Survey Question Creation Tool

In any survey described herein (such as a long-running survey, as described below), survey questions can be created and added to surveys using the tool described in this example. Alternatively, survey questions can be created and added to surveys in some other way.

FIG. 25 is a screenshot of a graphical user interface 2500 that provides a survey question creation dialog. In the example shown in FIG. 25, an element labeled "Creating New Survey" includes a "Survey Details" tab, a "Users" tab, and a "Survey Instances" tab. In the Survey Details tab, several options are shown for creating the survey, including a "Survey Template" drop-down box, a "Survey Language" drop-down box, a check box labeled "Anonymous" for making the survey anonymous, and text boxes for specifying possible answers (e.g., "Positive Answers," "Negative Answers"), an initial or introductory question, a satisfaction (e.g., net satisfaction, or NSAT) question, a request for comment, a comment prompt, and a conclusion statement. The survey can be saved or canceled using the buttons labeled "Save" and "Cancel," respectively.

In the example shown in FIG. 25, the survey template drop-down box has been set to "No Template" and the Survey Language drop-down box has been set to "English." The Anonymous check box is unchecked, indicating that this survey will not be anonymous. The Positive Answers and Negative Answers text boxes include some possible examples of such answers for the selected survey language. The text boxes labeled "Initial Question," "NSAT Question," "Leave Comment," "Comment Prompt," and "Final Statement" include illustrative questions, prompts, and statements that may be used in a survey. All of these text boxes can be editable to allow a survey administrator to adapt the survey according to, for example, the target audience and/or the information being sought.

Example 22: Long-Running Surveys

In this example, a long-running survey feature is described that may be implemented in a user survey service. As described in this example, a long-running survey tool provides a mechanism to allow a survey administrator to select various options that cause the user survey service to adjust the number of users to be surveyed based on the selected options. The user survey service also can adjust the number and/or identity of users to be surveyed based on prior behaviors (e.g., whether a user has opted out of surveys, whether a user has previously responded to a survey, etc.). Although various techniques and tools are described in this example in the context of a long-running survey, it should be understood that such techniques and tools also can be used for other surveys, such as surveys consisting of a single survey instance conducted over a short period of time, that are not long-running surveys.

As used herein, the term "user assignment" refers to a process of selecting a set of users to be targeted for survey responses from a population of users. The selected users can be referred to as "survey candidates." In this example, the user survey service allows the administrator to define one or more filters that can be applied to the user population to obtain a smaller filtered population from which a set of survey candidates can be selected. The filters allow for better targeting of the survey without requiring the administrator to perform the laborious task of selecting all of the individual users for the survey.

A set of survey candidates can be selected from a population of users based on prioritized conditions. Prioritized conditions can allow the user survey service to optimize selection of survey candidates to gain a better understanding of a broader user population. For example, if a user was identified as a survey candidate for a prior survey instance but did not respond to the survey, the user can be identified as a higher priority candidate for the next survey instance. The higher priority can reflect the possible benefit of obtaining survey responses from users that have not previously responded, in order to gain a better understanding of the overall user population. As another example, if the same user repeatedly fails to respond to survey instances (e.g., up to a predetermined number of failures to respond), the user can be made a lower priority candidate due to the likelihood that the user will fail to respond to future survey instances in view of a prior pattern of user behavior.

In at least one embodiment, illustrative user assignment and survey scheduling features described below with reference to FIGS. 26-29 can be used in the context of long-running surveys. However, the details of such features can vary depending on implementation.

Figure 26:
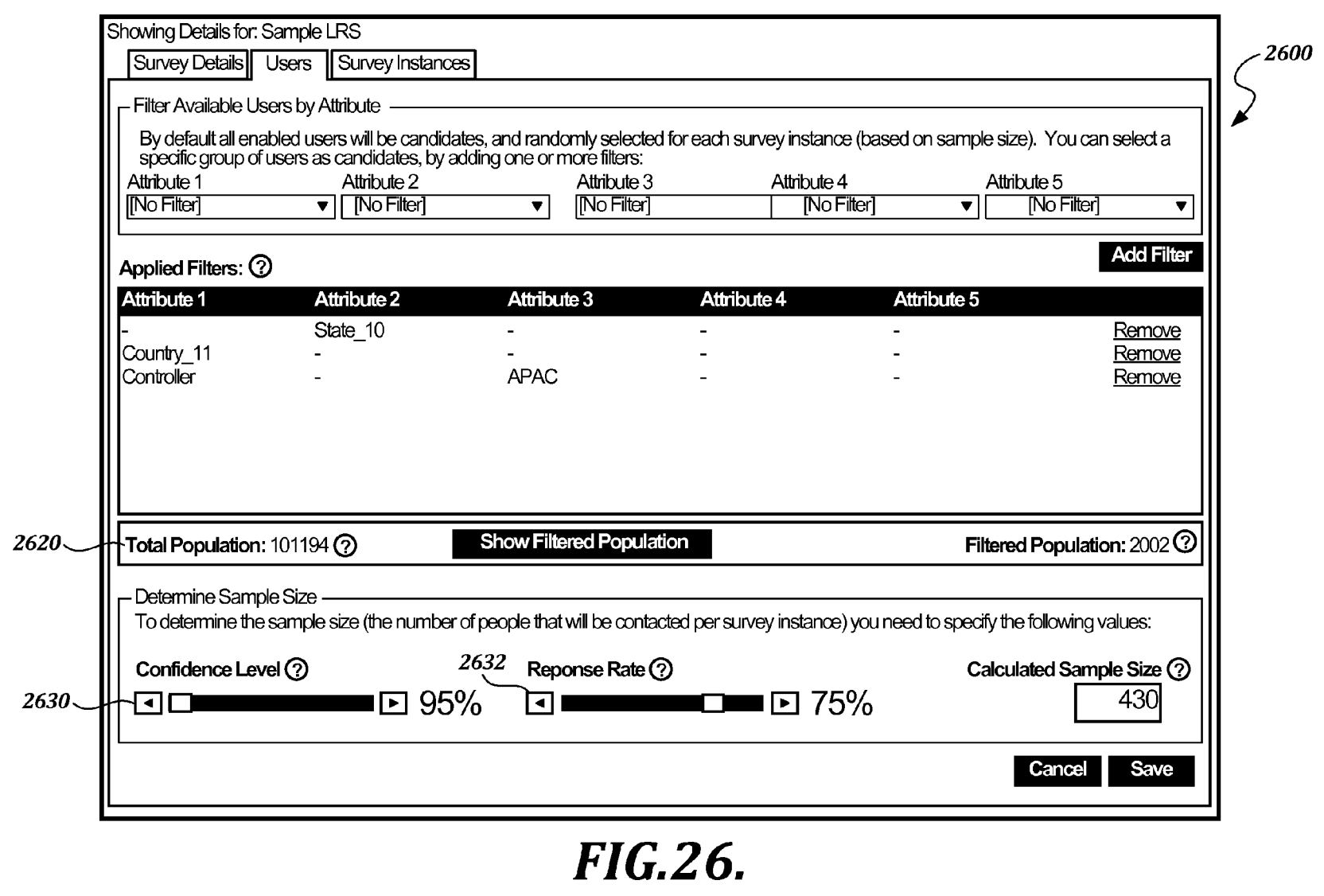

FIG. 26 is a screenshot of a graphical user interface 2600 that provides a tool for selecting filters to be applied to a user population to obtain a filtered population. Drop down boxes for attributes (e.g., "Attribute 1," "Attribute 2," etc.) are shown in the box labeled "Filter Available Users by Attribute." Enabled users in a user population can be candidates by default and can be randomly selected for each survey instance based on a sample size. (Sample sizes and related tools are described in further detail below.) However, filters allow an administrator to target a more specific group of users as candidates.

In the example shown in FIG. 26, the size of the overall user base is represented in "Total Population" value, and the following groups of users in the total population are placed in the filtered population:

Every user with Attribute2="State_10";
Every user with Attribute1="Country_11"; and
Every user with (Attribute1="Controller" AND Attribute3="APAC").

As can be seen in the box 2620 below the "Applied Filters" section, applying the filters as shown in FIG. 26 reduces the target audience from 101194 ("Total Population") down to 2002 ("Filtered Population"). Filters that have been previously added can be removed (e.g., via the links labeled "Remove" in the box labeled "Applied Filters") and/or supplemented with or replaced by other filters (e.g., via the drop-down boxes for Attributes 1-5 and the "Add Filter" button).

The graphical user interface 2600 also provides tools for calculating an appropriate sample size for a survey. For example, after the number of users is reduced to a more manageable subset via application of filters, the user survey service can help obtain a representative survey result by applying a sample size calculation as an aid towards determining how large a set of survey candidates should be. In this example, the user survey service calculates a sample size in view of a desired confidence level (which may be expressed as a percentage) as to the accuracy of the survey data. The higher the confidence level, the larger the calculated sample size will be. Typically, a high confidence level (e.g., 90% or more) is desirable. In at least one embodiment, the confidence level can be set within a range of 95-99%, inclusive. In the example shown in FIG. 26, the administrator can set the desired confidence level with the slider 2630, which may be set to 95% as an initial default value.

A sample size calculation also can be based on other factors in addition to a confidence level. For example, although setting a confidence level is sufficient to calculate a sample size, an estimate of the number of percentage of candidates that will respond to a survey also can be used to help ensure that the sample size is large enough to get a desired number of survey results. This estimate can be referred to as an expected response rate.

In the example shown in FIG. 26, the graphical user interface 2600 includes a slider 2632 that allows an administrator to set an expected response rate. As shown, the expected response rate is set at 75% to indicate that the survey administrator expects about 75% of candidates to respond to the survey. The expected response rate may be adjustable within a wide range with a low end of the range at, e.g., 1%, 5%, 10%, or the like, and a high end of the range at, e.g., 99%, 95%, 90%, or the like. Alternatively, the expected response rate can be set in some other way, e.g., automatically based on response rates for previous surveys. The expected response rate may vary widely for different survey topics, different user populations, etc.

A sample size that is initially calculated based on confidence level can be adjusted based on the expected response rate to get to the actual calculated sample size. In the example shown in FIG. 26, the sample size is calculated to be 430 based on a confidence level of 95% and an expected response rate of 75%. This sample size represents a recommended number of survey candidates in view of the desired confidence level and the expected response rate. In this example, the sample size (430) is smaller than the filtered population (2002). Thus, in this example, the recommended number of survey candidates can be obtained entirely from the filtered population. If the sample size exceeds the filtered population, parameters such as confidence level, expected response rate, and/or the filters to be applied can be adjusted accordingly until the sample size is less than or equal to the filtered population. Survey candidates also can be selected from outside the filtered population, if needed. Alternatively, other techniques can be used to select survey candidates.

Figure 27:
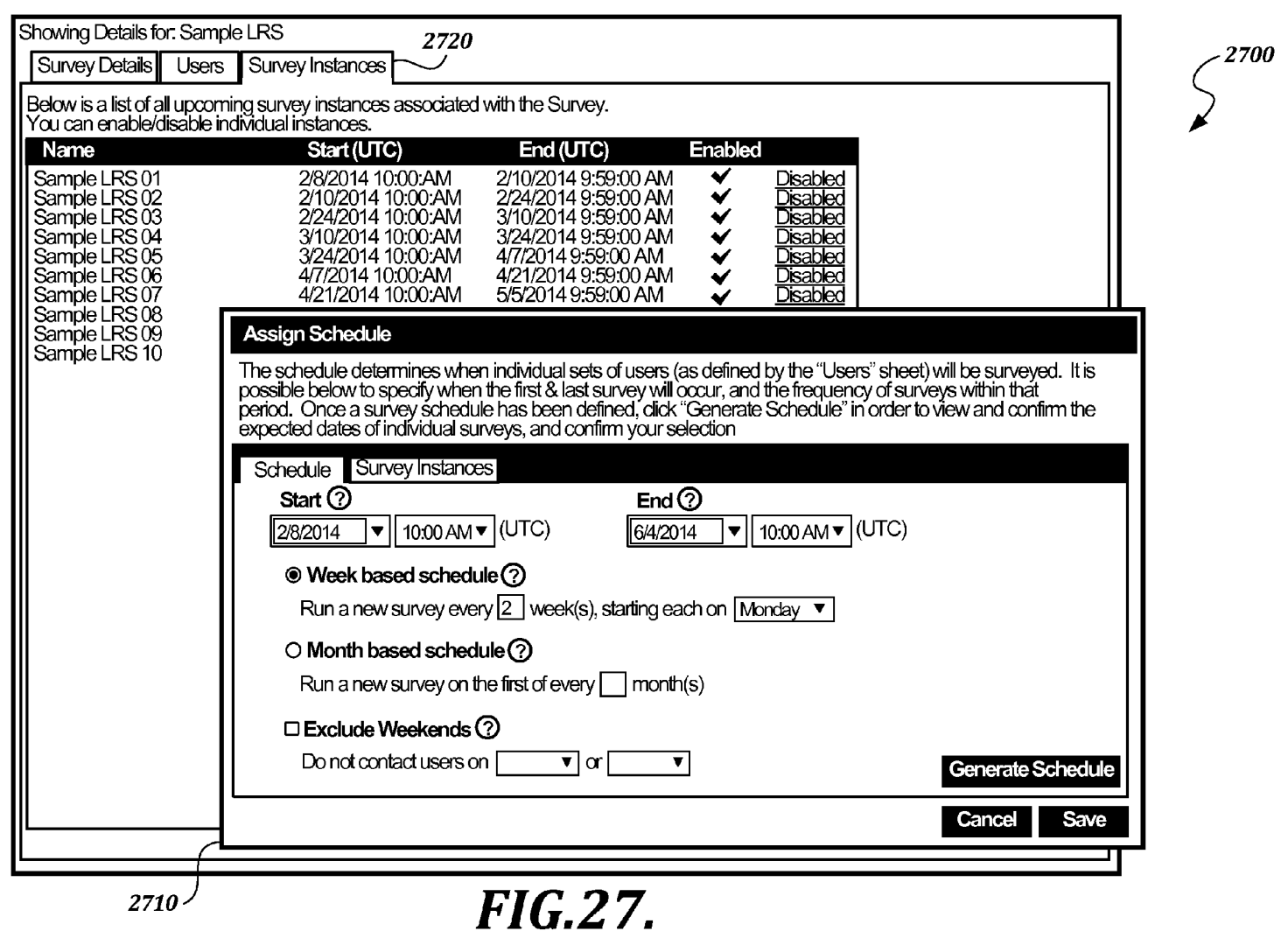

FIG. 27 is a screenshot of a graphical user interface 2700 that provides an editor tool for assigning a schedule to a survey instance. The illustrative techniques and tools described with reference to FIG. 27 can be helpful for scheduling a long-running survey to obtain feedback on a survey topic over a longer period of time.

In this example, the editor tool includes a box 2710 labeled "Assign Schedule" that is shown floating over information in a tab 2720 labeled "Survey Instances." The box 2710 can be displayed in response to activation of a user interface element such as a corresponding button (not shown) in the "Survey Instances" tab. The box 2710 includes a "Schedule" tab with user interface elements such as drop-down boxes for entering a start date and time (e.g., Feb. 8, 2014, 10:00 a.m.) and an end date and time (e.g., Jun. 4, 2014, 10:00 a.m.), and radio buttons to select a schedule type (e.g., week-based or month-based). The box 2710 provides options for each schedule type (e.g., a day of the week or month to start the survey, a number of weeks between surveys). The box 2710 also includes elements for setting options to exclude certain days (e.g., a check box to exclude weekends) for contacting users. A button labeled "Generate Schedule" is provided to assign the desired schedule to one or more survey instances.

In the tab 2720, a schedule of when the survey will be executed is shown. This schedule can be populated in response to changes made in the "Assign Schedule" box. The tab 2720 also includes elements (e.g., links labeled "Disable") that can be used to disable individual survey instances, as desired (e.g., during a holiday week).

Once a survey is created (e.g., questions are set, users are assigned, a schedule is determined), a user survey service can execute a survey. In at least one embodiment, a user survey service executes a survey according to a process 2800 shown in FIG. 28A. At step 2802, a set of survey candidates is identified for a scheduled survey instance. At step 2804, the current survey instance is executed (e.g., until all survey candidates have replied or a scheduled end of the survey instance is reached). At step 2806, if the end of the survey has been reached (e.g., all survey instances are complete or a scheduled end of the survey has been reached), the process ends at step 2808. Otherwise, further survey instances can be executed.

Figure 28A:
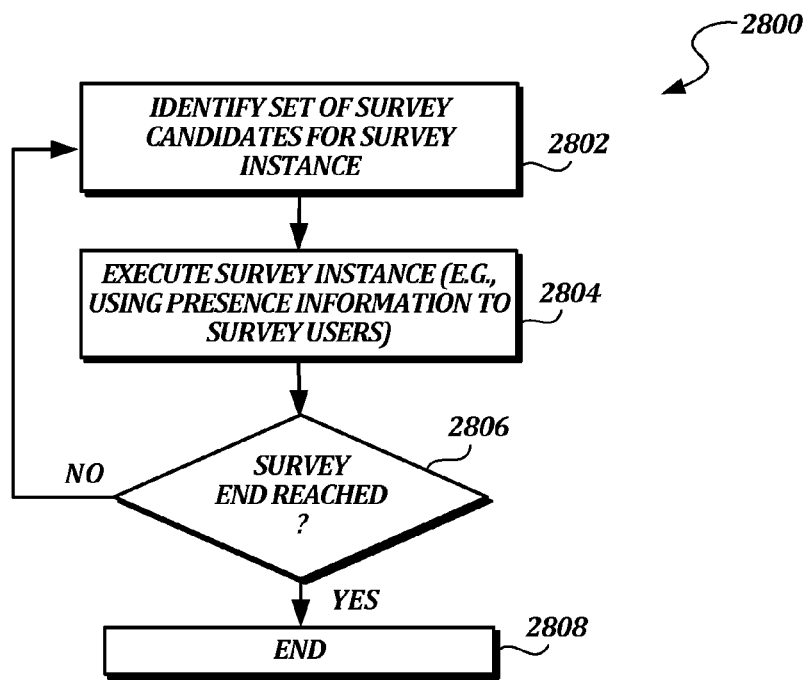
FIG. 28A-B are flow charts of an illustrative process for executing a survey.
Figure 28B:
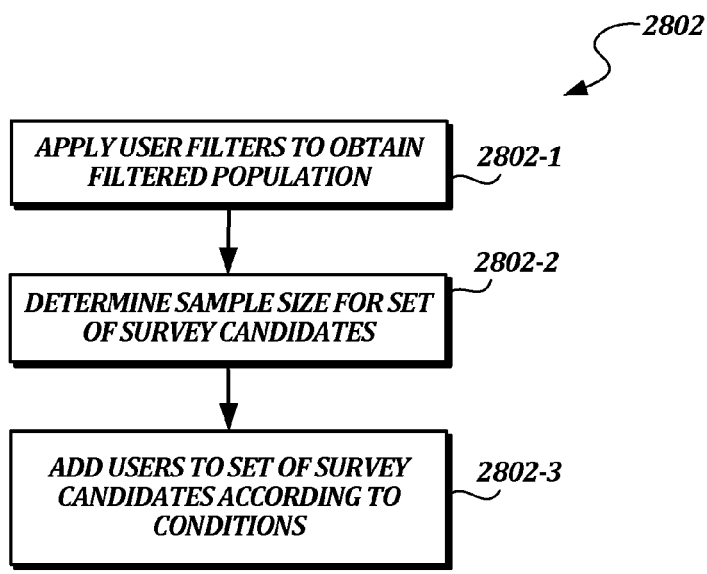

FIG. 28B is a flow chart depicting an example of how the identifying step 2802 of the process 2800 shown in FIG. 28A may be carried out. At step 2802-1, user filters are applied to obtain a filtered population. At step 2802-2, a sample size is determined for the set of survey candidates. At step 2802-3, users are added to the set of candidates according to predetermined conditions to fill the number of slots indicated by the sample size. For example, slots in the sample size can be filled for the survey instance according to prioritized conditions. For example, as a first condition, users that have explicitly opted out of receiving the survey (or all surveys) can be excluded. As a second condition, priority can be given to users that have not been selected to participate in this survey in the past. As a third condition, users can be added that have taken this survey in the past, with priority being given to users that have taken the survey less frequently. In this way, users that have been surveyed less will be more likely to be included in the current instance.

Figure 29:
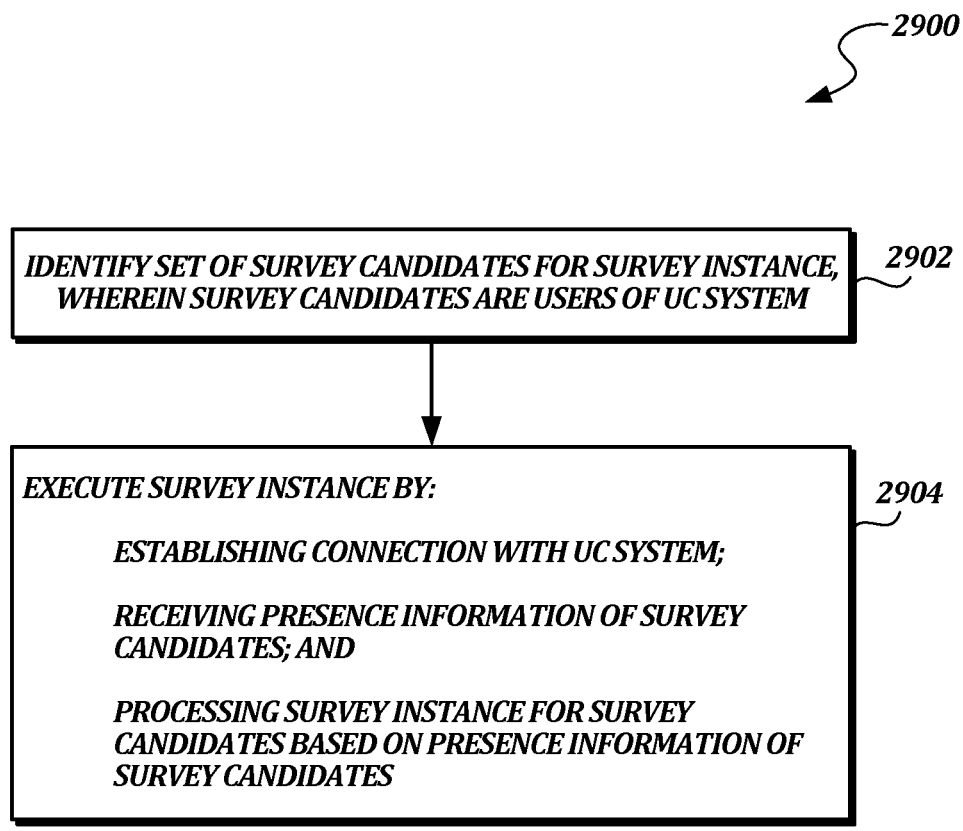
FIG. 29 is a flow chart depicting an illustrative process for executing a survey instance for users of a UC system based on presence information.

FIG. 29 is a flow chart depicting an illustrative process for executing a survey instance for users of a UC system based on presence information. At step 2902, a set of survey candidates is identified for a survey instance. The survey candidates are users of the UC system. At step 2904, the survey instance is executed by establishing a connection with the UC system, receiving presence information of the survey candidates, and processing the survey instance for the survey candidates based on the presence information. (Presence information is described in further detail in Section I.C, above, along with techniques for using such information in a survey context (e.g., with reference to Example 16).)

III. Operating Environment

Unless otherwise specified in the context of specific examples, described techniques and tools may be implemented by any suitable computing devices, including, but not limited to, laptop computers, desktop computers, smart phones, tablet computers, and/or the like.

Some of the functionality described herein may be implemented in the context of a client-server relationship. In this context, server devices may include suitable computing devices configured to provide information and/or services described herein. Server devices may include any suitable computing devices, such as dedicated server devices. Server functionality provided by server devices may, in some cases, be provided by software (e.g., virtualized computing instances or application objects) executing on a computing device that is not a dedicated server device. The term "client" can be used to refer to a computing device that obtains information and/or accesses services provided by a server over a communication link. However, the designation of a particular device as a client device does not necessarily require the presence of a server. At various times, a single device may act as a server, a client, or both a server and a client, depending on context and configuration. Actual physical locations of clients and servers are not necessarily important, but the locations can be described as "local" for a client and "remote" for a server to illustrate a common usage scenario in which a client is receiving information provided by a server at a remote location.

Figure 30:
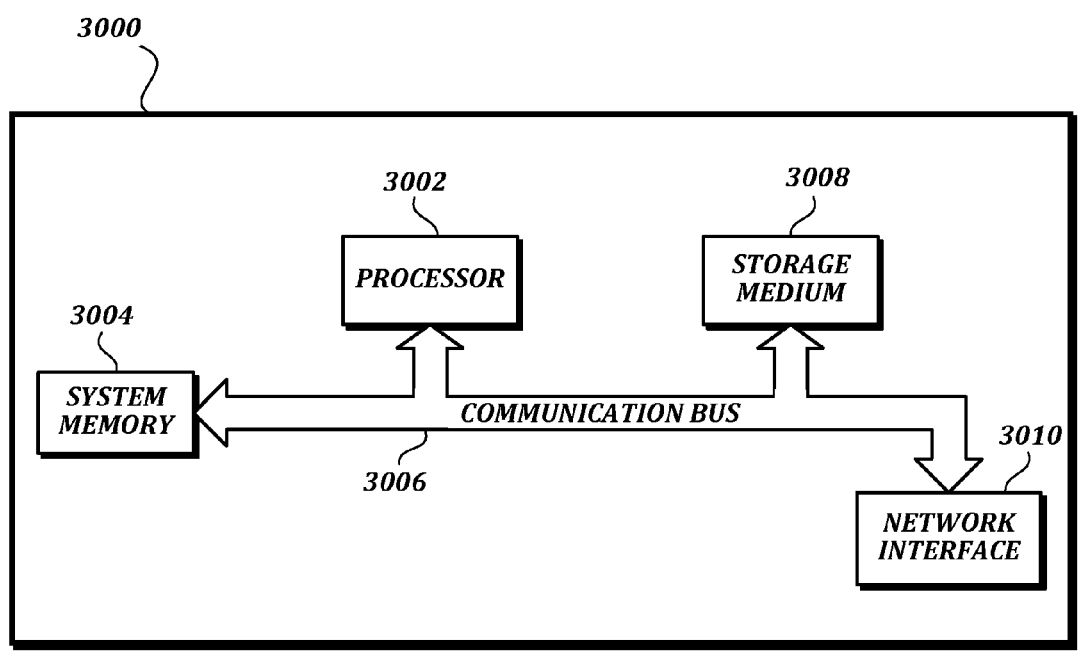
FIG. 30 is a block diagram that illustrates aspects of an exemplary computing device appropriate for use in accordance with embodiments of the present disclosure.

FIG. 30 is a block diagram that illustrates aspects of an illustrative computing device 3000 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 3000 includes at least one processor 3002 and a system memory 3004 connected by a communication bus 3006. Depending on the exact configuration and type of device, the system memory 3004 may be volatile or nonvolatile memory, such as read only memory ("ROM"), random access memory ("RAM"), EEPROM, flash memory, or other memory technology. Those of ordinary skill in the art and others will recognize that system memory 3004 typically stores data and/or program modules that are immediately accessible to and/or currently being operated on by the processor 3002. In this regard, the processor 3002 may serve as a computational center of the computing device 3000 by supporting the execution of instructions.

As further illustrated in FIG. 30, the computing device 3000 may include a network interface 3010 comprising one or more components for communicating with other devices over a network. Embodiments of the present disclosure may access basic services that utilize the network interface 3010 to perform communications using common network protocols. The network interface 3010 may also include a wireless network interface configured to communicate via one or more wireless communication protocols, such as WiFi, 2G, 3G, 4G, LTE, WiMAX, Bluetooth, and/or the like.

In the illustrative embodiment depicted in FIG. 30, the computing device 3000 also includes a storage medium 3008. However, services may be accessed using a computing device that does not include means for persisting data to a local storage medium. Therefore, the storage medium 3008 depicted in FIG. 30 is optional. In any event, the storage medium 3008 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like.

As used herein, the term "computer-readable medium" includes volatile and nonvolatile and removable and nonremovable media implemented in any method or technology capable of storing information, such as computer-readable instructions, data structures, program modules, or other data. In this regard, the system memory 3004 and storage medium 3008 depicted in FIG. 30 are examples of computer-readable media.

For ease of illustration and because it is not important for an understanding of the claimed subject matter, FIG. 30 does not show some of the typical components of many computing devices. In this regard, the computing device 3000 may include input devices, such as a keyboard, keypad, mouse, trackball, microphone, video camera, touchpad, touchscreen, electronic pen, stylus, and/or the like. Such input devices may be coupled to the computing device 3000 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 3000 (e.g., a client device), or can be integral components of the computing device 3000. In some embodiments, multiple input devices may be combined into a single, multifunction input device (e.g., a video camera with an integrated microphone). Any suitable input device either currently known or developed in the future may be used with systems described herein.

The computing device 3000 may also include output devices such as a display, speakers, printer, etc. The output devices may include video output devices such as a display or touchscreen. The output devices also may include audio output devices such as external speakers or earphones. The output devices can be separate from and communicatively coupled to the computing device 3000, or can be integral components of the computing device 3000. In some embodiments, multiple output devices may be combined into a single device (e.g., a display with built-in speakers). Further, some devices (e.g., touchscreens) may include both input and output functionality integrated into the same input/output device. Any suitable output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

IV. Extensions and Alternatives

Many alternatives to the described systems are possible. For example, the described systems can comprise multiple client devices and administrator devices, which can interact with the system one at a time or simultaneously.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

Many alternatives to the user interfaces described herein are possible. In practice, the user interfaces described herein may be implemented as separate user interfaces or as different states of the same user interface, and the different states can be presented in response to different events, e.g., user input events. The elements shown in the user interfaces can be modified, supplemented, or replaced with other elements in various possible implementations.

V. Illustrative Embodiments

The present disclosure includes descriptions of various aspects of unified communication (UC) systems, including UC management and analysis systems and related tools and techniques. Described systems, tools, and techniques are adapted for enhanced UC data capture, analysis, and reporting; enhanced UC monitoring services; and a user survey service that can be used for conducting user surveys related to UC services.

Embodiments disclosed herein include:
A computer-implemented method for performing one or more of the above-described techniques.
A server computer comprising a processing unit and computer-readable storage media having stored thereon computer-executable instructions configured to cause the server computer to perform one or more of the above-described techniques.
A computer-readable storage medium having stored thereon computer-executable instructions configured to cause a computing device to perform one or more of the above-described techniques.
A computer system comprising a server that provides one or more of the above-described unified communication services. The computer system may further comprise plural client computing devices and an administrator computing service.
An administrator computing device in communication with a server that provides one or more of the above-described unified communication services, the administrator computing device comprising a processing unit and computer-readable storage media having stored thereon computer-executable instructions configured to cause the administrator computing device to perform one or more of the above-described techniques.
A client computing device in communication with a server that provides one or more of the above-described unified communication services, the client computing device comprising a processing unit and computer-readable storage media having stored thereon computer-executable instructions configured to cause the client computing device to perform one or more of the above-described techniques.

While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. In a computer system comprising a server configured to execute a monitoring service, a method comprising, by the monitoring service:
   testing a user communication service workload within a unified communication system, wherein the testing of the user communication service workload is performed according to a corresponding test rule, and wherein the user communication service workload is selected from the group consisting of instant messaging, voice calls, public switched telephone network (PSTN) calls, conference calls, federated user communications, video calls, desktop sharing, and application sharing;
   detecting a rule failure associated with the testing of the user communication service workload within the unified communication system according to the test rule;
   performing an automatic re-test on the test rule in response to the detected rule failure;
   classifying the rule failure as sustained or intermittent based on a result of the automatic re-test;
   setting a response priority for responding to the rule failure, wherein the response priority is based on the classification of the rule failure;
   detecting an additional rule failure associated with the test rule;
   grouping the rule failures as an incident;
   classifying the incident as sustained or intermittent; and
   further classifying the incident as active or inactive.

2. The method of claim 1, further comprising further classifying the rule failure based on a number of users impacted by the rule failure.

3. The method of claim 1, further comprising further classifying the rule failure as frequent or isolated.

4. The method of claim 1, further comprising transmitting an alert associated with the rule failure.

5. The method of claim 1, further comprising transmitting an alert associated with the incident.

6. The method of claim 1, wherein the response priority is further based on timing of the rule failure.

7. A computer system comprising one or more computing devices programmed to:
   test a user communication service workload within a unified communication system, wherein the testing of the user communication service workload is performed according to a corresponding test rule, and wherein the user communication service workload is selected from the group consisting of instant messaging, voice calls, public switched telephone network (PSTN) calls, conference calls, federated user communications, video calls, desktop sharing, and application sharing;
   detect a rule failure associated with the testing of the user communication service workload within the unified communication system according to the test rule;
   perform an automatic re-test on the test rule in response to the detected rule failure;
   classify the rule failure as sustained or intermittent based on a result of the automatic re-test;
   set a response priority for responding to the rule failure, wherein the response priority is based on the classification of the rule failure;
   detect an additional rule failure associated with the test rule;
   group the rule failures as an incident;
   classify the incident as sustained or intermittent; and
   further classify the incident as active or inactive.

8. The computer system of claim 7, wherein the one or more computing devices are further programmed to further classify the rule failure based on a number of users impacted by the rule failure.

9. The computer system of claim 7, wherein the one or more computing devices are further programmed to further classify the rule failure as frequent or isolated.

10. The computer system of claim 7, wherein the one or more computing devices are further programmed to transmit an alert associated with the rule failure.

11. The computer system of claim 7, wherein the one or more computing devices are further programmed to transmit an alert associated with the incident.

12. The computer system of claim 7, wherein the response priority is further based on timing of the rule failure.

13. A non-transitory computer-readable medium having stored thereon computer-executable instructions configured to cause one or more computing devices to:
   test a user communication service workload within a unified communication system, wherein the testing of the user communication service workload is performed according to a corresponding test rule, and wherein the user communication service workload is selected from the group consisting of instant messaging, voice calls, public switched telephone network (PSTN) calls, conference calls, federated user communications, video calls, desktop sharing, and application sharing;
   detect a rule failure associated with the testing of the user communication service workload within the unified communication system according to the test rule;
   perform an automatic re-test on the test rule in response to the detected rule failure;
   classify the rule failure as sustained or intermittent based on a result of the automatic re-test;
   set a response priority for responding to the rule failure, wherein the response priority is based on the classification of the rule failure;
   detect an additional rule failure associated with the test rule;
   group the rule failures as an incident;
   classify the incident as sustained or intermittent; and
   further classify the incident as active or inactive.

14. The computer-readable medium of claim 13, wherein the computer-executable instructions are further configured to cause one or more computing devices to further classify the rule failure based on a number of users impacted by the rule failure.

15. The computer-readable medium of claim 13, wherein the computer-executable instructions are further configured to cause one or more computing devices to further classify the rule failure as frequent or isolated.

16. The computer-readable medium of claim 13, wherein the computer-executable instructions are further configured to cause one or more computing devices to transmit an alert associated with the rule failure.

17. The computer-readable medium of claim 13, wherein the computer-executable instructions are further configured to cause one or more computing devices to transmit an alert associated with the incident.

18. The computer-readable medium of claim 13, wherein the response priority is further based on timing of the rule failure.

19. The computer-readable medium of claim 13, wherein the automatic re-test comprises immediate repetition of a failing part of a task in the user communication service workload in response to the detected rule failure and omitting automatic re-test of a part of the task that is not failing.

20. The method of claim 1, wherein performing the automatic re-test comprises immediately repeating a failing part of a task in the user communication service workload in response to the detected rule failure and omitting automatic re-test of a part of the task that is not failing.

21. The computer system of claim 7, wherein the automatic re-test comprises immediate repetition of a failing part of a task in the user communication service workload in response to the detected rule failure and omitting automatic re-test of a part of the task that is not failing.

* * * * *